US009269022B2

(12) United States Patent
Rhoads et al.

(10) Patent No.: US 9,269,022 B2
(45) Date of Patent: Feb. 23, 2016

(54) METHODS FOR OBJECT RECOGNITION AND RELATED ARRANGEMENTS

(71) Applicant: Digimarc Corporation, Beaverton, OR (US)

(72) Inventors: Geoffrey B. Rhoads, West Linn, OR (US); Yang Bai, Beaverton, OR (US); Tony F. Rodriguez, Portland, OR (US); Eliot Rogers, Beaverton, OR (US); Ravi K. Sharma, Portland, OR (US); John D. Lord, West Linn, OR (US); Scott Long, Portland, OR (US); Brian T. MacIntosh, Lake Oswego, OR (US); Kurt M. Eaton, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 14/251,229

(22) Filed: Apr. 11, 2014

(65) Prior Publication Data

US 2015/0016712 A1    Jan. 15, 2015

Related U.S. Application Data

(60) Provisional application No. 61/811,049, filed on Apr. 11, 2013, provisional application No. 61/815,172, filed on Apr. 23, 2013, provisional application No. 61/815,994, filed on Apr. 25, 2013, provisional application No. 61/838,165, filed on Jun. 21, 2013.

(51) Int. Cl.
*G06K 9/00* (2006.01)
*G06K 9/62* (2006.01)
(Continued)

(52) U.S. Cl.
CPC ........ *G06K 9/6202* (2013.01); *G06F 17/30247* (2013.01); *G06K 9/00208* (2013.01); *G06K 9/4671* (2013.01); *G06K 9/6255* (2013.01); *G06T 17/00* (2013.01); *G06K 9/00* (2013.01)

(58) Field of Classification Search
CPC ............... G06T 17/00; G06T 2200/04; G06T 2207/10028; G06T 9/001; G06T 15/00; G06K 9/00201; G06K 9/00214; G06K 9/00664; H04N 13/0459; H04N 13/0066; H04N 21/8146; G06F 8/315; G06F 3/0346; G06F 3/0484; G06F 17/30247; G06Q 50/24; G01B 11/002; G01B 11/03; G02B 5/1828; A61B 5/1176; G09G 3/002
USPC ................. 382/103, 154, 170, 191, 219, 305; 345/415, 420; 348/125, 156
See application file for complete search history.

(56) References Cited

U.S. PATENT DOCUMENTS 5,988,862 A * 11/1999 Kacyra ................. G01B 11/002
                                                                          382/195
6,064,759 A *  5/2000 Buckley et al. ............... 382/154
(Continued)

FOREIGN PATENT DOCUMENTS

JP      2003271929      9/2003
JP      2003296707     10/2003

OTHER PUBLICATIONS

Bernardini, et al, The 3D Model Acquisition Pipeline, Computer Graphics Forum, vol. 21, No. 2, pp. 149-172, 2002.
(Continued)

*Primary Examiner* — Vu Le
*Assistant Examiner* — Aklilu Woldemariam
(74) *Attorney, Agent, or Firm* — Digimarc Corporation

(57) ABSTRACT

Methods and arrangements involving portable user devices such smartphones and wearable electronic devices are disclosed, as well as other devices and sensors distributed within an ambient environment. Some arrangements enable a user to perform an object recognition process in a computationally- and time-efficient manner. Other arrangements enable users and other entities to, either individually or cooperatively, register or enroll physical objects into one or more object registries on which an object recognition process can be performed. Still other arrangements enable users and other entities to, either individually or cooperatively, associate registered or enrolled objects with one or more items of metadata. A great variety of other features and arrangements are also detailed.

32 Claims, 8 Drawing Sheets

(51) Int. Cl.
*G06F 17/30* (2006.01)
*G06T 17/00* (2006.01)
*G06K 9/46* (2006.01)

(56) References Cited

U.S. PATENT DOCUMENTS

| | | | |
|---|---|---|---|
| 6,173,070 B1* | 1/2001 | Michael et al. | 382/145 |
| 6,711,293 B1 | 3/2004 | Lowe | |
| 6,990,453 B2 | 1/2006 | Wang | |
| 7,194,752 B1 | 3/2007 | Kenyon | |
| 7,627,477 B2 | 12/2009 | Wang et al. | |
| 7,787,697 B2 | 8/2010 | Ritzau et al. | |
| 7,817,167 B2* | 10/2010 | Suzuki | G06T 9/006 345/619 |
| 8,004,576 B2 | 8/2011 | Sharma | |
| 8,078,357 B1* | 12/2011 | Trytten et al. | 701/36 |
| 8,363,926 B2 | 1/2013 | Khan et al. | |
| 8,374,437 B2* | 2/2013 | Nakamura | G06K 9/6211 345/419 |
| 8,379,014 B2 | 2/2013 | Wiedemann et al. | |
| 8,422,782 B1 | 4/2013 | Dhua et al. | |
| 8,447,107 B1 | 5/2013 | Dhua et al. | |
| 8,463,036 B1 | 6/2013 | Ramesh et al. | |
| 8,560,517 B2 | 10/2013 | Yang et al. | |
| 8,565,815 B2 | 10/2013 | Rhoads et al. | |
| 8,577,150 B2 | 11/2013 | Garg | |
| 8,713,068 B2 | 4/2014 | Seet et al. | |
| 8,718,369 B1 | 5/2014 | Tompkins et al. | |
| 8,831,279 B2 | 9/2014 | Rodriguez et al. | |
| 8,867,786 B2* | 10/2014 | Craig | 382/103 |
| 8,970,590 B1* | 3/2015 | Brennan | G06T 17/20 345/419 |
| 2002/0024517 A1* | 2/2002 | Yamaguchi | A63F 13/10 345/424 |
| 2002/0106135 A1 | 8/2002 | Iwane | |
| 2004/0247174 A1* | 12/2004 | Lyons et al. | 382/154 |
| 2006/0173660 A1* | 8/2006 | Itoh | G06F 17/5018 703/2 |
| 2008/0123559 A1* | 5/2008 | Haviv | G06F 8/61 370/255 |
| 2009/0033663 A1* | 2/2009 | Murrah et al. | 345/426 |
| 2010/0020068 A1* | 1/2010 | House | 345/419 |
| 2010/0226535 A1* | 9/2010 | Kimchi | G06F 3/013 382/103 |
| 2010/0302247 A1* | 12/2010 | Perez et al. | 345/440 |
| 2011/0058733 A1 | 3/2011 | Inoue et al. | |
| 2011/0161076 A1 | 6/2011 | Davis et al. | |
| 2011/0212717 A1 | 9/2011 | Rhoads et al. | |
| 2012/0230543 A1 | 9/2012 | Boncyk et al. | |
| 2013/0124148 A1* | 5/2013 | Jin et al. | 703/1 |
| 2013/0223673 A1 | 8/2013 | Davis et al. | |
| 2013/0286004 A1* | 10/2013 | McCulloch et al. | 345/419 |
| 2014/0029856 A1 | 1/2014 | Cai et al. | |
| 2014/0304122 A1 | 10/2014 | Rhoads et al. | |

OTHER PUBLICATIONS

Bustos, et al, Feature-Based Similarity Search in 3D Object Databases, ACM Computing Surveys, vol. 37, No. 4, pp. 345-387, 2005.
Chen, et al, On Visual Similarity Based 3D Model Retrieval, Computer Graphics Forum, vol. 22, No. 3, pp. 223-232, 2003.
Delamarre, et al, 3D Articulated Models and Multi-View Tracking with Silhouettes, Proc. 7$^{th}$ IEEE Int'l Conf. on Computer Vision, 1999.
Grauman, et al, Inferring 3D Structure with a Statistical Image-Based Shape Model, MIT Artificial Intelligence Laboratory, Memo 2003-008, Apr. 2003.
Tangelder, et al, A Survey of Content Based 3D Shape Retrieval Methods, Multimedia Tools and Applications vol. 39, No. 3, pp. 441-471, 2008.
Vlasic, et al, Dynamic Shape Capture Using Multi-View Photometric Stereo, ACM Transactions on Graphics, vol. 28, No. 5, Article 174, 2009.
Search Report and Written Opinion dated Aug. 26, 2014 in PCT/US2014/033849.
Lobo et al., "Relative Pose Calibration Between Visual and Inertial Sensors", The International Journal of Robotics Research, vol. 26, No. 6, Jun. 2007, pp. 561-575.
Chen et al., "Structure and Motion by Fusion of Inertial and Vision-Based Tracking", Proceedings of the 28$^{th}$ OAGM/AAPR Conference, vol. 179 of Schriftenreihe, pp. 55-62, OCG, 2004.
Osadchy et al., "Using Specularities for Recognition", Proceedings of the Ninth IEEE International Conference on Computer Vision, 2003.
Yang et al, "Real-time Specular Highlight Removal Using Bilateral Filtering", Computer Vision-ECCV 2010. Springer Berlin Heidelberg, pp. 87-100, 2010.
Mallick et al, "Beyond Lambert: Reconstructing Specular Surfaces Using Color," Computer Vision and Pattern Recognition, 2005. CVPR 2005. IEEE Computer Society Conference on. vol. 2. IEEE, 2005.
Feris et al, "Specular Reflection Reduction with Multi-Flash Imaging" (2004).
Artusi et al, "A Survey of Specularity Removal Methods", Computer Graphics Forum, vol. 30, No. 8, pp. 2208-2230, 2011.
Bajcsy et al, "Detection of Diffuse and Specular Interface Reflections and Inter-Reflections by Color Image Segmentation", International Journal of Computer Vision 17(3), 241-272, 1996.
Wang Ao-yo et al, "A survey of silhouette detection techniques for non-photorealistic rendering", Proceedings of the Third International Conference on Image and Graphics, IEEE, 2004.
Sun et al, "Triangle Mesh-Based Edge Detection and Its Application to Surface Segmentation and Adaptive Surface Smoothing", IEEE ICIP 2002.
Choi et al, "RGB-D Edge Detection and Edge-Based Registration," Intelligent Robots and Systems (IROS), 2013 IEEE/RSJ International Conference on. IEEE, Nov. 2013.
Belongie, et al, Shape matching and object recognition using shape contexts, IEEE Trans. On Pattern Analysis and Machine Intelligence, 24.4 (2002): 509- 522.
Brusco, et al, 3D registration by textured spin-images, Fifth Int'l IEEE Conf. On 3-D Digital Imaging and Modeling, 2005.
Bustos, et al, Feature-based similarity search in 3D object databases, ACM Computing Surveys (CSUR) 37.4 (2005): 345-387.
Chen, et al, Object modeling by registration of multiple range images, 1991 IEEE Int'l Conf. on Robotics and Automation.
Esteban, et al, Silhouette and stereo fusion for 3D object modeling, Computer Vision and Image Understanding 96.3 (2004): 367-392.
Fitzgibbon, et al, Automatic 3D model construction for turn-table sequences, 3D Structure from Multiple Images of Large-Scale Environments, Springer Berlin Heidelberg, 1998. 155-170.
Johnson, et al, Using spin images for efficient object recognition in cluttered 3D scenes, IEEE Trans. On Pattern Analysis and Machine Intelligence, 21.5 (1999): 433-449.
Mülayim, et al, Silhouette-based 3-D model reconstruction from multiple images, IEEE Trans. on Systems, Man, and Cybernetics, Part B, 33.4 (2003): 582-591.
Tangelder, et al, A survey of content based 3D shape retrieval methods, Multimedia Tools and Applications 39.3 (2008): 441-471.
Tarr, Visual Object Recognition: Can a Single Mechanism Suffice? 1998.
Ullman, Three-dimensional object recognition based on the combination of views, Cognition 67.1 (1998): 21-44.
Weiss, Geometric invariants and object recognition, International Journal of Computer Vision 10.3 (1993): 207-231.

* cited by examiner

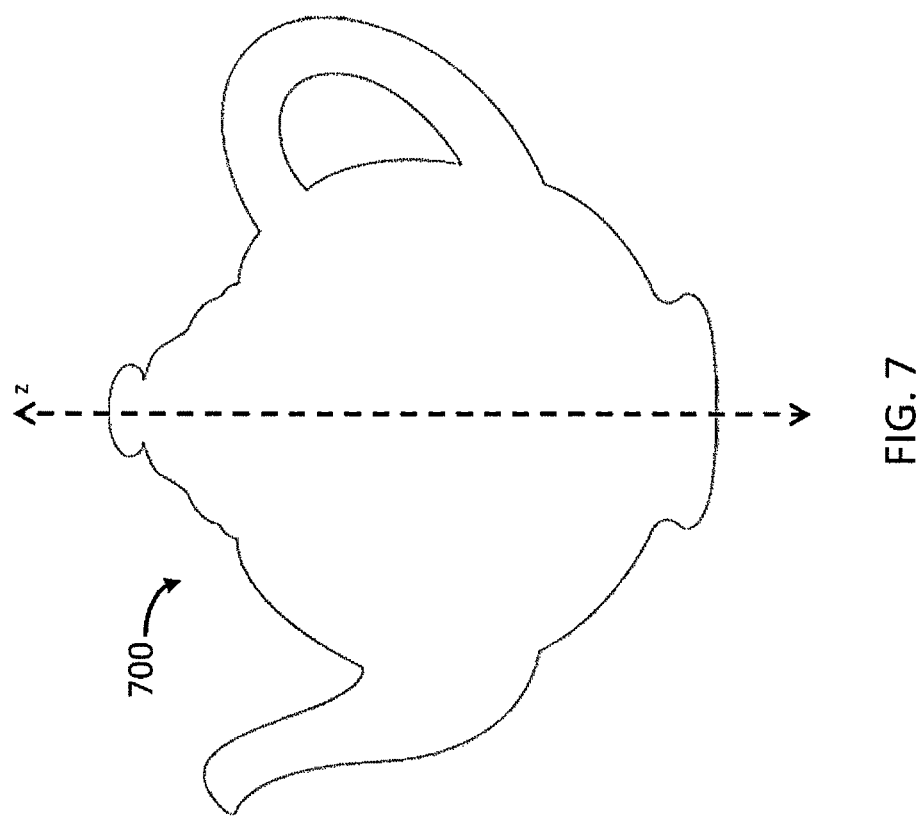

METHODS FOR OBJECT RECOGNITION AND RELATED ARRANGEMENTS

CROSS-REFERENCE TO RELATED APPLICATIONS

This application claims the benefit of U.S. Provisional Application No. 61/811,049, filed Apr. 11, 2013, U.S. Provisional Application No. 61/815,172, filed Apr. 23, 2013, U.S. Provisional Application No. 61/815,994, filed Apr. 25, 2013 and U.S. Provisional Application No. 61/838,165, filed Jun. 21, 2013, each of which is herein incorporated by reference.

TECHNICAL FIELD

The present technology generally concerns object recognition techniques, search space reduction techniques, processing techniques that may be described as contextual, anticipatory or intuitive, techniques for implementing location-based services, ubiquitous or crowd-sourced capture of imagery, sound or other data to support the above-mentioned techniques, and many other technologies.

BACKGROUND AND SUMMARY

Image fingerprinting (aka image signature technology) commonly involves deriving a set of 2D feature points from imagery, and then searching a set of reference image feature points for a closest match, to thereby identify a corresponding reference image. The SIFT, SURF, and ORB algorithms are commonly employed. (See the section entitled Feature Extraction below.)

Such arrangements work well for identifying 2D images (and 2D objects). But they break down when trying identifying 3D objects.

Consider a box of breakfast cereal. If the box is imaged in a plan frontal view, existing image fingerprinting can suffice to identify the front panel image, and thereby identify the object. But if the camera view is oblique, as in FIG. 1, conventional fingerprinting starts having difficulty.

The FIG. 1 image depicts both the left and front panels of a cereal box. The former appears tilted away from the camera to the left, fore-shortening its left-most edge. The latter appears oppositely tilted to the right, fore-shortening its right-most edge. Even if a reference fingerprint (e.g., SIFT) was available for the entire package (e.g., in a flat configuration, before the box was glued into its 3D configuration), this reference fingerprint will be difficult to match with the FIG. 1, given its projective distortions in two opposing directions.

Still more difficult are objects that cannot readily be fingerprinted in a "flat" state (e.g., before a box is glued). Consider an egg carton. Or a tea pot. Or a parking meter. What does a fingerprint mean in these contexts?

Much has been written about the Internet of Things. Early realizations have relied on RFID chips to identify objects. But if a broader version of this vision is to be achieved, it will rest on a broader ID of Things foundation. The present technology provides such a foundation.

In accordance with one embodiment of the present technology, object recognition systems are advanced to accommodate viewpoint variability of 3D objects.

More particularly, the disclosed technology (including the materials incorporated by reference) delves into illustrative implementations employing some of the following themes:

1. If probabilistic object recognition using mobile personal devices is to make the next significant leap in approaching fast 100% detection and approaching 0% false positives, object signatures need to incorporate three dimensional information about the object, and matching algorithms may make decisions (e.g., an ending operation in a multi-stage method) based on projective transformations (i.e., certain geometric transformations preserving collinearity and cross-ratio, but not parallelism) rather than 2D affine/warping (i.e., certain geometric transformations preserving parallelism). Mass implementations of this capability will often require three or more stage candidate filtering approaches, which include more sophisticated device, local-server and global-server divisions of labor and their associated packet exchanges.

2. Object Signature Collection, Registration, Fast-Search Processing and Matching-Database Proliferation There are many diverse approaches to gathering three dimensional information on objects, from simple stereo pair extraction and Wave-at-it, to Gladson/Itemaster and the over-the-top Optical Lab (all detailed below). Other depth sensing camera technology can also be employed. The result is usually 3 dimensional "draped meshes," with cost and quality of information being a function of the empirical approach used. Supplying fast early stage filtering algorithms with sampled-steradian 2D views of an object also occurs during object/thing registration. These sampled views have explicit Profile Masks associated with them.

3. Personal Devices Recognizing Things: First stage filtering will often involve current art 2D fast searching, trying to get reasonable matches to one of the steradian views/masks. Known-profile masking will be employed (not using image data behind masks), and pass-thresholds will be significantly lowered. Second stage filtering will be done primarily using Profile and Morphological features, with some Image features (P, M and I features, respectively), honing the projective viewpoint angle and distance parameters from coarse and canned steradian view defaults. Thresholds remain modestly low. Third stage processing may bring back all classic 2D features (I features) as well as the P and M features, performing projections which enable false positive rejection to reach application-defined degrees (e.g., 99.999 . . . %), through empirically calibrated thresholding.

4. Device, Local-Server, Global-Server Dynamics: Many retail, in-store applications will push key reference features directly onto the user's device, allowing fast device-side execution of object recognition, constrained by power consumption, memory and channel usage. Fluidity of "where" various recognition stages are actually executed provides a welcome design flexibility in the device-local-global continuum.

The foregoing and other aspects of the present technology will be more readily apparent from the following detailed description, which proceeds with reference to the accompanying drawings.

BRIEF DESCRIPTION OF THE DRAWINGS

FIG. 7 illustrates a P-feature associated with the teapot shown in FIG. 2.

DETAILED DESCRIPTION

Figure 2:
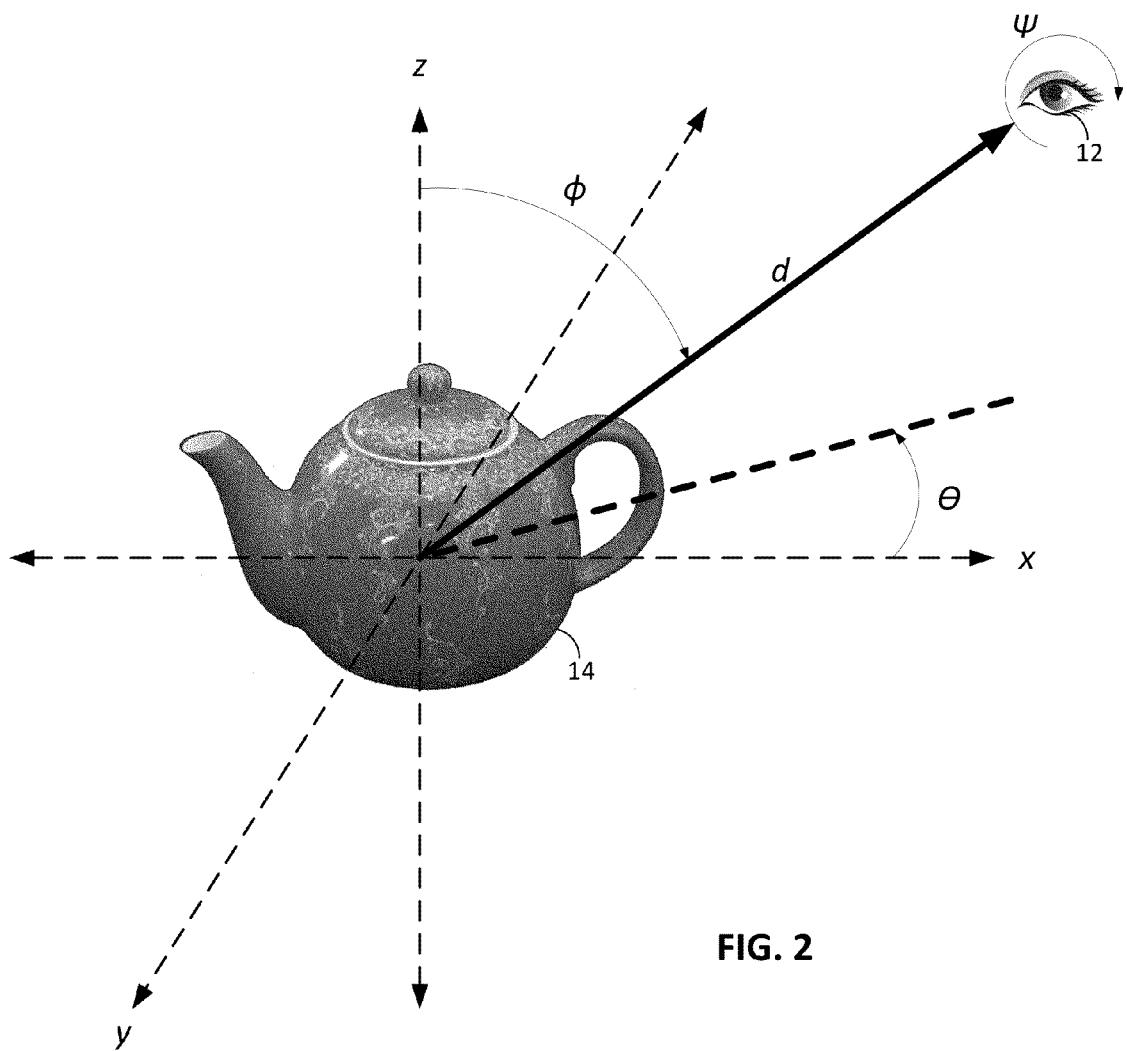
FIG. 2 schematically illustrates various parameters for describing a viewpoint onto an object.

FIG. 2 shows that there are essentially four free parameters at play when a camera at a viewpoint 12 is pointed towards an object 14. These are two angles θ and Φ, which characterize the view direction of a vector that points from the viewpoint 12 towards the center of the object (the former being an azimuth angle—in the X-Y plane, and the latter being an elevation angle—shown as measured down from the Z-axis); a distance d of the vector; and an angle Ψ characterizing the rotation of the camera from a normal orientation (e.g., an orientation in which the bottom of the camera's image sensor is parallel to an equatorial plane through the object).

There are two further parameters that describe the offset of the "center" of the object as imaged onto the image sensor, from the center of the image sensor. (The "center" is in quotations because even this notion is somewhat equivocated when speaking of arbitrary 3 dimensional objects.)

It can be appreciated then that for some arbitrary object, a captured image of that object will have a 2-dimensional projected "fingerprint" or "signature" dependent on the four initial parameters. This projected signature then might be found anywhere on the sensor, giving the need for 6 numbers to be known before a classic matching operation can be performed between a captured image of an object and a stored 2D fingerprint of that object.

Ideally, stored 2D fingerprints would be needed for all view directions, all distances and all rotations. This situation is easy to describe mathematically but completely impractical in any form of scaled visual identification system.

For objects such as common cereal boxes or other kinds of "boxes" of all types, existing art approaches have been developed whereby a planar view signature is made of the object, then affine-transformed versions of either an image of an object, or the affine transform of the signature of the object itself, is used to perform image-signature matching. An example is the Wheaties box of FIG. 1, viewed at some angle, then a similarly angled signature is matched to the image. These approaches have proven to work for such boxlike objects, bearing in mind that the definition of "work" needs to be rather liberally defined. The practical issue always gets back to positive detection rates and resistance to false positives. In a nutshell, despite the wonderful progress such affine-matching approaches using fully traditional 2D fingerprinting have made, a better way needs to be found.

For general objects, obviously including boxlike objects, the coined notion of AngleRegistering the object, or the more partial notion of ReliefRegistering an object (each generically referred herein as "registering"), is here introduced. One way of looking at these notions is to say that multiple viewpoints of the object need to be a part of the creation of signatures for these objects.

AngleRegistering an object is more than simply taking many images of it as it is rotated (or as a camera is arced around it). But this is a core data gathering act. Another aspect of AngleRegistering is the creation of 3 dimensional estimates of the shape and surface areas of the object in the process. Such estimations may be derived from the multiple images themselves, or from information obtained otherwise, such as from a database containing the height, width and depth of a Wheaties box (such as is available from vendors such as Gladson, LLC, and ItemMaster, LLC). The form of this 3D estimate can be called a "model" and might have a "mesh" form, or perhaps connected triangles, or even so-called point-clouds or even other forms.

The "Relief" form of registration indicates a partial angular sweep, where something akin to a facial mask or relief sculpture is the resultant form in 3 dimensions. In a ReliefRegistration, one presumably cannot find a way, nor perhaps need to find a way, to capture the full surround of an object.

There are numerous advantages to recording multiple viewpoints of an object and yet synthesizing a singular signature for that object. Its "Thingerprint" is truly an awful term but for better or for worse, quite concise and to the point. An informational foundation for a Thingerprint, a way it can be stored as a signature structure for later matching to arbitrary images of things, is as an image-draped 3D model. The "image-draping" in question can be as simple as a luminance map (black and white), or an RGB surface reflection map, all the way to the exceedingly precise bi-directional reflectance function including the spectral component as a functional parameter.

Practicalities will determine how fancy and precise a Thingerprint needs to be, but the act of taking multiple views of an object remains important to the creation of a stored signature of that object. (Purely industrial designed packages replete with data on all artwork applied to the surface of that object can of course by-pass this physical-world imaging of an object by simply storing the known image-draped model of such a package). Again, that stored signature can be encoded as an image-draped 3D model, in the round or as a relief.

Recognition of an unknown object as matched against a stored Thingerprint can comprise simply matching an image captured by a camera against projected views onto the model, as opposed to the current art approach of matching against an affine transform of a frontal view. Otherwise nasty effects such as object-edge features becoming "noise" in the frontal-affine approach now become "signal," or new robust image feature points, in the Thingerprint approach. Likewise, the very outline of the object itself becomes a signal rather than noise in the Thingerprint approach. Edges and other discernible 3 dimensional features on the object causing photometric variation for viewpoints, as well as the outlines of the object itself, all add up to a higher reliability capture-image to template-signature matching operation, and better separations of true matches from false positives.

One might object that often it will be difficult to generate high quality image-draped 3D models of objects. If you sweep a camera around a bald man, are you sure there is not a tuft of hair on top? But the point of this technology is that even with the crudest of crude models—e.g., generated from only two images—this alone is an improvement over frontal-affine matching. Again, the new photometric effects produced by 3D edges and the edges of objects themselves already begin to move from noise to signal even with just two captured images of an object driving the registration process. (This makes sense if one considers classic stereo photography). The conclusion is that there is no requirement to produce perfect 3D draped-image models; even a crude initial relief will be better than a flat-plane-assumption in general.

When a camera seeking to identify an object moves around that object, object points closer to the camera will shift their relative positions relative to object points further away, as is very well known in parallax theory. What this means for 2D fingerprinting templates is that those robust image features actually change as a function of viewing angle. A 3D object is not a 2D flat plane image. The objection that such effects are very small rings hollow when considering that the practical goal of fingerprint-based identification is to move detection rates from 90% to 99% to 99.9%, and false positive rates from 10% to 1% to 0.1%, etc. One person's barely measurable shift in a signature might be another person's order of magnitude improvement in identification precision (true detection vs. false positives).

This attention to detail also applies to projected edges of objects. The flat plane front of the Wheaties box may nicely remain an edge across near-frontal views, and hence offer up good SIFT/SURF robust point fodder for matching algorithms, but as the side edges (panels) of the Wheaties box begin to show up, the Thingerprint approach will see these as powerful new robust points while 2D affine methods will struggle to filter these out as noise. The properly aligned edge-profile of an object, turned into SIFT/SURF points, increases the true/false ID separation.

An additional benefit of a Thingerprint, multiple view signature gathering of objects, is that the lovely feature of "scale invariance" contained in classic 2D fingerprinting does not precisely map to "distance from an object." Here again, closer points on an arbitrary object outright change their relative relationship to more distant points, as Parallax 101 teaches us. In scale invariance for 2D images, the image stays the same as it scales up and down; in moving in and out relative to a 3D object, this is not the case. The effect on exact robust SIFT/SURF points may again be small, but that is the game when pushing detection rates up relative to necessarily low false positive thresholds.

Another important area where Thingerprinting is strictly additive in benefits—relative to classic 2D fingerprinting—is in the powerful use of scale- and rotation-invariant search culling. By all means use classic Fourier-Mellin methods to cull out 10's of millions of candidate objects from candidate objects, as searches usually do. The deeper issue is that these methods can actually be refined if a more 3 dimensional model-derived template approach is utilized. Even in these classic approaches, thresholds need to be set, and often those thresholds trap "true objects" in the process, and hence unwittingly lower detection rates. By expanding the set of template views of an object from merely the frontal view to ten views or a hundred views, yes more false positive objects will make it through first stage search culling but so too will actual true objects make it through. Later refined stages of template matching honing in on exact view angles, driven by a feedback loop between the viewed object and the stored object-model, will drive out the false positive objects. This "honing in" can be accomplished through an ability to vary the virtual viewpoint, the virtual projection, onto the 3D model of an object, allowing a matching optimization process to vary these views such that matches either get stronger and stronger or reach some maximum match which is far from a strong match.

Then there is motion of the camera, where fingerprinting and Thingerprinting hyper-diverge and the latter becomes radically superior to the former. A quick wave of a camera with subsequent predictable changes in the object's SIFT/SURF point parallax—AND the object's profile—can rapidly separate true objects (matching a given non-culled candidate) from false positive candidates. A low level of seeing why this is the case is by simply considering five pseudo-independent signature matching tests performed from five slightly different view angles and with slightly different "noise" on the sensor. It clear to see that more tests beget better results, but, the deeper point is that image-draped 3D model projected signatures change in predictable ways IF a given object is being viewed by a camera, and where one view might give a borderline false-positive reading, another 2 degrees away and yet another 4 degrees away will probably not.

The game of fingerprint (and Thingerprint) detecting and identifying an object is a game of throwing out false leads and honing in on the closest match between a presented view or views of an object, and that object's stored signature. If that signature's sophistication is advanced and the probing process is enhanced, the result is unequivocal increases in true detection against false detection, with the former having the obvious commercial goal of identifying Coke cans in near-pitch-black caves.

More

Look at some object around you right now. What is its optical signature, its fingerprint? This section provides one definitive answer to that question. This answer is deliberately geared toward extreme examples of what an optical signature of an object might be. This is done so that even though virtually all applications may never need to reach these extremes, they can nevertheless be referenced to this "ideal case," and any limitations due to differences from the ideal can be better discussed.

The definition of the ideal optical signature of an object, also known as an object's fingerprint and/or the singular "thingerprint," can be described as a purely theoretical matter, but this disclosure will immediately begin with its empirical manifestation. The old art and science of human fingerprinting is the inspiration for this approach: they are inherently empirical whilst theory can play post hoc. The following recipe for an empirically-derived optical signature measuring set-up will function on objects up to 20 centimeters in size (less than or equal to 20 cm being its largest axial extent). Its basic principles can then be explicitly extrapolated up to buildings and mountains and down to nanofabricated widgets.

We begin by positing a modest size darkroom where somewhere in its center is a programmable, precision 360 degree turntable. The turntable is mechanically designed such that it will be able to hold and rotate a wide variety of objects. It may have some additional accessory holders to accommodate some range of object sizes and shapes. Its programmable position states would be granular to at the very least 1 degree steps, though 10 degrees will be used for certain storage and execution time estimates.

Next piece of equipment is a very modest quality telescope with a clear aperture size of just over 20 centimeters. This telescope will create what is known as collimated light, i.e., it is in fact a collimator as known in the optical industry. Again, the quality of this telescope/collimator can be very modest (low cost).

Next piece of equipment is a tunable narrow band light source, tunable across the visible spectrum, but not so narrow band as to produce coherent light. We can make do with narrow band being defined as 10 nanometers for the time being, and the instantaneous band of light can be tuned from 405 nanometers to 695 nanometers in 10 nanometer steps. Its light can be fiber coupled from the light source itself to the input focal plane of the collimator. This combination set-up of the light source, the fiber and the collimator ought to be able to fit inside a 1 cubic foot package. Let's call this whole package the planar light source.

Next piece of equipment is a great arc linear-motion stage with a radius of perhaps a meter. The center of the great arc will be placed roughly 10 centimeters above the center of the turntable. The motion stage and the arc will have a mechanical coupling capability and structural strength to be able to hold the planar light package. The range of motion of the stage will be from directly above the turntable, to roughly 60 degrees below the table.

The reason that the great arc does not go directly below to "negative 90" degrees is to emphasize the practicality and realism of the set-up being described. Note that the phrase " . . . virtually all applications may never need to reach these extremes . . . " was used in the first paragraph of this section. This was deliberately not "all" because one specific application can use the set-up described in this section: research which pushes the envelope on false positive mitigation during object signature matching. There will be much more described on this false positive mitigation topic, but for this early stage in the empirical set-up description, it can be assumed that the set-up being described here will be utilized at the very least in cutting edge research. Those practiced in the art of the optical calibration arts will surely be able to push even the specifications of this section (e.g., 1 nanometer bandwidths instead of 10; many other examples pretty much everywhere that example numbers are offered).

It should also be noted that the primary reason our example here goes only to negative 60 degrees angle below the turntable is because presumably the mechanical coupling to the turntable and the turntable itself will occlude light illuminating objects from these lower angles. [Not to worry though, objects where "the bottom" of the object also needs its object-signature contribution added to the whole of the object-signature need only be turned on their heads and a second run of the procedures of this entire section repeated. Any un-sampled part of the object from the first run can then be stitched into the first run's signature after the second run on the upside-down object is complete, where this "stitching" of one hemisphere onto the other is a straightforward data merging operation].

Back to the great arc, the planar light package is attached to its stage, and its stage will of course be programmable, and will be capable of angular movement steps at least as good as one degree, and the planar light package will have its planar light pointed toward the center of the arc which is also a few centimeters above the turntable. The combination of the planar light package and the arc will be referred to variously as the planar illumination system or arc. Many optical engineers and technicians are well familiar with these types of programmable illumination set-ups.

Next piece of equipment is a monochrome camera (with lens). Nothing too special but it does need to have reasonable calibration on its linearity between light sensed and digital numbers out. It also needs to have a well-defined spectral response curve. The camera/lens will be mounted on its own great arc motion system very similar to the lighting package set-up. Its radius can be either inside or outside the lighting arc radius, there are pros and cons for both. Additional to the great arc for the camera is that rather than having this great arc be fixed in space, the whole arc itself rests on its own full 360 degree turntable. When the camera is placed onto its mounting stage, pointing toward the same center point that the lighting is pointed toward, it then will be able to view an emplaced object from all directions. It too will be limited in its motion toward the floor and under an object, and clearly there will be issues involved with occlusion of viewing an object if the camera arc is larger than the lighting arc, when the camera "goes behind" the lighting arc. The step precision of the camera latitudinal arc and its equatorial mount can all be in the degree or so range, perfectly acceptable.

The empirical set-up described to this point is thus capable of monochromatic lighting of small objects from all directions, with a camera reading the scatter of that lighting from the object from all directions. This arrangement can be called a spectral bi-directional reflectance function measurement set-up or SBDRF measurement set-up (those practiced in BDRF surface measurements should immediately note that even the polar dependence—about the surface normal—of the BDRF is inherently included in this arrangement; those not practiced in BDRF might want to look at the Wikipedia entry for basic information on the BDRF subject). In short, once this set-up performs "a run" on an object, the data thus generated, along with certain data processing, can produce the object's optical signature or fingerprint or thingerprint as defined in this disclosure. This "run" will next be described. [The "second run" on the bottom of an object will be treated as a trivial and secondary consideration when talking about an objects "complete signature" or fingerprint; this second run is assumed in the "ideal case"].

The summary of the data collection aspect of a run is to cycle through all bands of light, all illumination angles on an object, and all viewpoints, including every combination of those three elements, taking a snap with the camera at each and every combination. This may at first sound intractable but that is where the step sizes come in, as well as a bit more of a detailed treatment of how the camera and the lighting can work together for superb efficiency.

The granularity of the measured SBDRF for any given surface element of an object will be a direct function of the step sizes mentioned above. Step sizes on the object turntable and the equatorial mount of the camera, step sizes on each of the latitude arcs for lighting and camera alike, and step sizes on the light bands. Sampling theory over a sphere notoriously involves the issue that one has smaller and smaller actual "equatorial steps" as one moves up in latitude towards a north pole. In general, one can use the cosine of the latitude (measured in degrees from the equator or the turntable plane) to multiple the total number of equatorial steps around the globe, i.e., if a run samples a full 36 times when say the camera is moving around the equator, it needs to only step 18 times at the 60 degrees north or south location of the latitude arc.

Back of the envelope numbers might look like: 36 equatorial steps for both lighting and camera, and only 16 steps for the latitude of both lighting and camera. Then of course 30 steps for the 10 nanometer light bands. These numbers can't be too bad? Combination-wise that gives 36 squared times 16 squared times 30 or just under 10 million combinations. Ouch. At one snap a second, that is 115 days per object! This empirical SBDRF thing even at 10-ish degree sampling can be intractable after all.

But as stated early on in this section, virtually all non-research applications need not nearly go to these extremes. And even for research programs one can improve these numbers quite a bit and still get close to the ~10-ish degree sampling level (a level itself which is pretty fine for BDRF studies, but, once the discussion on specular reflections is had, this level or better can be somewhat useful).

Keeping with the "ideal but realistic" set-up being described thus far, a few simple things can begin chip away at the one-third of a year per object run problem. For starters, swept-band lighting sources such as can be found commercially, cycling through the entire visible band once per second, should be specified, and the camera then made to synchronize with the band-switching [in other words, the full 30 bands of light can be swept in synchrony with a 30 frame per second camera]. Ignoring the need to physically move the camera between each view sample, this gets our 115 days down to only 4 days! And it will also be found that even for very high end research, the "good" information rapidly diminishes when the camera is angularly separated from the lighting angle by more than 90 degrees. So, assuming one does make the equatorial sampling a bit coarser nearer the poles, and generally coarsens the camera sampling as a function of angular separation from the lighting angle, 1 to 2 days per object (depending on exactly how these are accomplished) is finally within a reasonable range for high end research truly needing 10 degree-ish SBDRF sampling. Moving this sampling requirement to 20 or even 30 degrees will witness 4× and 9× less object-run-time accordingly. This stage of the description of the object signature measurement set-up might be called the very edge of the "practical ideal."

But as stated, virtually all real applications of object signatures will require a great deal less time-per-run than even this. Imagining we are dealing with high and medium end commercial packaging, a one minute run does not seem unreasonable as a target. But before discussing how this can be accomplished, there are several descriptions needed to close the loop on how a full object signature is created and stored; these last few paragraphs have only touched upon the raw data collection part of an object registration (a run). The words "rotaregister" and "rotaregistration" are here both introduced, attempting to encapsulate this process of measuring an object's optical signature.

Let us assume now that a raw data collection run has happened (4 days or whatever), and one is now sitting there with no less than 10 million images of the same dang object. The worst obsessive parents with their newborns are many orders of magnitude less than this. What's to be done with all these images?

The next thing to do is to create as high of a grade as possible "3D model" of the object based on any and all of the images. Those practiced in the art of stereoscopic 3D reconstruction of objects from just two viewpoints will recognize that this general problem has been solved decades ago. Here we have many viewpoints in many bands of light. The task is to create an in-the-round 3D model of the object. The simplest approach to this is just running a whole bunch of simple stereo-3D-creation algorithms on many of the pairs of images say 30 degrees apart, all over the globe of the object, then just average all the answers together to slowly form a singular in-the-round object. This is clearly glossing over tremendous amounts of details, but this problem is a great one for undergraduate students learning about shape-creation from multiple viewpoints and really doesn't need a great deal of attention here. Besides, even if poor algorithms are used to create this 3D model of the object, we shall see that the implications are that only the detection level and false positive level of fingerprint detection are affected. So this disclosure will leave this 3D model creation phase of "the object run" as an exercise for undergraduates accordingly. Or intellectual exercise be damned—just buy an off-the-shelf package. (Autodesk's 123D Catch, which takes multiple photo views of an object as input, and produces a corresponding 3D model as output, is one such product. Hypr3D is another such package. Many other such tools are identified at the Wikipedia article for Photogrammetry.)

The initial and resulting form of this model does merit further discussion.

3D models that may be used in the creation of object's fingerprint come in many forms, and can include point clouds, triangular or other polygon meshes (whether generated directly or estimated based on a point cloud set), NURBS surface models, wireframe models, etc. For purposes of illustration, this disclosure will use a simple connected triangle mesh as its preferred form for one aspect of storing an object's fingerprint. "Connected" connotes that each of the 3 edges of each surface triangle typically hooks up with another edge of another triangle. Each triangle also has an outward side, representing its surface as it were. Triangles are inherently 2 dimensional structures of course, and these triangles will exist in three dimensional space. So what "three dimensional space" might that be? [Transparent or semi-transparent surfaces will not be discussed at this stage of the description but ultimately they can be included in "lists of surfaces" as well.]

Figure 5:
FIG. 5 is an image of a Winston Churchill mug, used to facilitate a discussion of a three-dimensional space in which to orient 3D models of physical objects.

Clearly it needs to be a 3 dimensional space related to the object itself. The object needs to have a center, and something akin to a top and a front. The rest falls out from there. This sounds like a job for a Winston Churchill beer mug (FIG. 5) to help us with.

Each and every object essentially has an arbitrary "center." Center-of-gravity is a common choice for defining a center for an object, but we will steer clear of this definition as we don't want weighing equipment in the darkroom. So, for this disclosure we will arbitrarily define an object's center as that point "in" the object which is half its height above the center of the turntable, where "height" is defined as the highest point on the object above the plane of the turntable. Pretty simple, really.

So with our Winston Churchill beer mug which has a highest point above its base of 12 cm, this center point is 6 cm high right where some beer ought to be (but we will look at this example when no beer is present). Its exact position is a function of how exactly it is placed on the turntable, also essentially arbitrary.

So we have an origin defined, the center, [0,0,0] in a new object-defined 3-space. Next up is determining up. Pretty simple, it'll be up, or the n-vector for north, represented by a vector n-hat which represents a "1" in whatever units we eventually choose. Winston's nose will arbitrarily become the g-vector for Greenwich, the g-hat vector with length 1, Greenwich in honor of his country and that they have squatting rights on the concept of arbitrary equatorial reference points. Then finally one of his two ears will need to define a chirality for the space, allowing us to know which way is east or toward his left ear, so we'll call the vector from the center to that ear the e-vector, giving rise to the e-hat vector. So we now have the n, g and e vectors defining directions in this space uniquely associated with the center of the Winston mug, replete with the standard metric system to be applied to the hat vectors.

The previously discussed full (minus "the bottom" of the object seated on the turntable) now fits into this specific 3 dimensional space. Having chosen connected triangles as our preferred surface model, any object will now generate a finite list of surfaces, where the number of surfaces will almost always approach and exceed one million assuming a reasonably high density camera is used and objects are sized in the mug range. Best practices would argue that the general surface sizes of the generated (by the mesh-from-many-views operation, see previous paragraphs) triangles are on the order of the projected pixel sizes of the camera's pixels. For this discussion, we will assume that our Winston Churchill mug will have 20 million surface triangles generated.

Each of these triangles will have a surface-normal vector associated with it. These will be yet new vectors, 20 million new individual surface normal vectors in the Winston case, each with a two dimensional vector where one vector can use the theta notation tracking its angular value within the g-e vector plane, and another being representable by the phi notation and represents the angular component in the n-vector direction above and below the g-e plane. The surface normal of each surface will be the vector about which the SBDRF will be defined for each and every surface. Such SBDRF functions themselves have a rotational degree of freedom which needs arbitrary orientation, where in our case we will reference all SBDRF functions to the projected n-vector onto the triangle plane, making this vector be like 12 o'clock on a clock, travelling then clockwise. This level of subtlety is required only when asymmetric SBDRF's are truly a measurable phenomenon, where for applications that can make due with symmetric SBDRF functions, this orientation of the clock is not necessary and the BDRF function becomes a 90 degree function only, for angles from the surface normal to the surface plan. These concepts are all quite familiar to optical scientists, engineers and technicians who routinely deal with measuring surface reflectance properties (i.e. BDRF measurements).

Each of these triangles will have an SBDRF measured for it. "Measured" in this case is really a data processing step turning data from those 10M images into estimates for each triangle's SBDRF, where the angular sampling step for the BDRF portion of the estimate becomes a function of the angular step sizes of the camera and light source. This may sound a bit confusing in words, but in practice it is not so difficult once the basic sampling geometries are grasped. (See, e.g., U.S. Pat. No. 8,215,553, for related information.)

The spectral component of the SBDRF is simply associating measurements within individual bands, such that all measurements in say the 450-460 nanometer band all will combine together to come up with BDRF (no S) estimates of the object only for that band [e.g., one could call it the BDRF-455 signature, then have a total of 30 of these for all bands].

Assuming now that we are working within only one color band of the "S," the simplest way to begin assigning BDRF values to each surface is to simply "average" many samples of output pixel values of camera shots that were within a pixel or two of the surface in question. Each camera value would be a weighted (by proximity of the pixel to the surface itself) addition to the running average AT A PARTICULAR POINT in the BDRF-"off normal" and "clockwise" space introduced earlier. The light source angle and the camera angle, combined with the surface angle, all combine to determine exactly where a given camera pixel output value might "average in" to a growing estimate of all the SBDRF's. Again, in words, this is all a bit complicated but once the geometry of the estimation averaging is understood, it can be seen that this approach to building SBDRF's is fairly conventional. Presaging discussions on lowering false positive detections, it is the devil in the details of how SBDRF's are calculated where, being a bit dramatic and notional, these details might be the difference between 4 9's (i.e., 99.99%) false positive rejection and 5 9's (99.999%), it can be that important. This is an apology therefore for why the details of SBDRF measurements are explained here: they will ultimately roll up to N-9 false positive aspirations.

For now taking the simpler route of simple averaging, the end result is that all 20 million triangles representing Winston will have their own surface normal and their own SBDRF's associated with them. Taking the assumption that BDRF's will be sampled on say a 36 by 18 grid, and that their averaged estimated values get compressed into 2 bytes or 16 bit formats, this finally gets us to a data size description of an object's optical signature: 20M times 36 times 18 times 2 times 30 (the bands) bytes in Winston's case, or just under 1 Terabyte! Now there is a great answer for at least the size of some given object's optical signature, in the "practical ideal" case . . . how much might it be for what you were looking at?

The operative signature itself is then the averaged values of all surface's SBDRF discrete elements plus the 3D model information which includes the location of each of the 20M triangles and their surface normals. This is one form of optical signature contemplated by this disclosure (and might be termed a "holistic" optical signature). There are a variety of known triangle-mesh methods known which can efficiently encode this model information, but suffice it to say it will add another few Gigabtyes to a final composite optical signature, replete with model triangle values and SBDRF values for all these triangles. Why should a signature for an object be any less complicated and beefy; most objects are complicated and their spectral properties can speak volumes.

It has been repeated many times that this section has pushed the envelope on what might be called "the practical ideal empirical optical signature of an object." Enormous opportunities for simplification exist where it will be seen that fast object detection and identification, tempered by false positive mitigation, defines the rules of the game when applying these simplifications.

Adding a Co-Located Point Source Lighting to the Object Rota Registration Run

There are advantages to also putting an LED or other type of non-collimated or "point source" lighting directly next to the lens of the camera, and routinely supplementing rotaregistration runs as described above (using planar lighting) with the more point-like lighting given by a co-located LED or equivalent. The similar 30 bands of light across the spectrum should be attempted (finer for more exacting work, much coarser for consumer-application-oriented work).

All turntable positions around the full 360 degrees, along with all camera positions from −60 to +90, could have a 30-band set of image captures from the camera, taken while the appropriate LED is being lit. This would make for 36 times 16 times 30 images for a whole set, using the ten degree norm previously described. These images could "supplement" the holistic signature described above. It would be a kind of "special case" supplement coinciding closely but not exactly with how modern cameras very often have very close LED lighting associated with them. Applicant's related filing on spectrally-enhanced LED lighting (see U.S. patent application Ser. No. 13/840,451 (filed Mar. 15, 2013) and Ser. No. 14/201,852 (filed Mar. 8, 2014)) for common cameras is of direct relevance to the desire to supplement the optical signature data with this co-located lighting signature. For many practical applications involving common cameras with this kind of LED lighting, it will be found in practice that the detection and false positive mitigation during matching can be greatly enhanced by the combination of active LED lighting of objects with different bands of light, then referencing the co-located lighting signature rotaregistered in accordance with this disclosure.

Four Levels of Simpler and/or More Economic RotaRegistration of Objects

There are many practical limitations of the previously described Grand-Daddy of empirically derived optical signatures of objects, dominated primarily by "huge cost" in both money and time commitment. Re-iterating, this was deliberate so that the fuller principles of exemplary embodiments could be explained.

This section first summarizes, and then discusses in detail, what could be called four increasing levels of cost reduction (where "cost" is still interpreted broadly including time and complexity of implementation), all still practicing basic aspects of the disclosure but using certain known but acceptable approximation s and limitations in so doing. It should be emphasized, and an entire later section will describe in more detail, that the primary trade-offs in reducing the cost of rotaregistration will be in detectability of objects and false positive increases. These are sweeping generalizations as those practiced in the arts of positive object identification know, but these generalizations are reasonably accurate and the section that covers false positives will examine why these generalizations are not too bad.

The four levels of cost reduction are 1) same set-up as earlier but limiting the camera's range of motion to a great arc, slightly offset (by maybe 5 degrees) from the lighting great arc (in other words, the camera arc does not need to be, itself, on a turntable); 2) Utilizing a turntable on only the object, and no "great arcs" on the lighting or the camera, having less sophisticated "static" lighting (no motion on the direction of lighting), and just arraying one or a few cameras around the object; 3) "SpinCam" registration of virtually any object, including people, using a mobile camera or hand-held camera; and 4) "Wave at it" registration where just a very small motion of a camera around an object, or even a simple "gestural instruction" through the movement of a camera "at a thing," will automatically signal intent of registering something and grab at least two views of the thing in the process, preferably several views. A fifth inherent level of thing registration (yet another way to describe a "run" and the four above cost-cutting approaches to such) involves capturing pictures of an object from multiple viewpoints, followed by merging, stitching or otherwise combining the imagery (e.g., as described in any of U.S. Pat. Nos. 8,160,400 and 8,483, 510, US Patent App. Pub. No 2009/0192921, and/or U.S. patent application Ser. No. 14/218,660) to obtain a multi-view representation of the object. Imagery captured from different viewpoints may be captured at the same time or at different times, by the same camera or by different cameras. In one embodiment, combining imagery captured from multiple viewpoints can be facilitated if each image is associated with additional information. Such additional information could include information describing a location of the camera when the image was captured (e.g., in terms of latitude, longitude, altitude, etc.), information describing an orientation of the camera (e.g., in terms of azimuth angle, elevation angle, etc.), information describing when an image was captured by a camera, information describing the camera parameters set when the image was captured (e.g., focal length, f-stop, pixel size—when capturing imagery with a digital camera, etc.), or the like or any combination thereof. A sixth inherent level of thing registration involves capturing a single picture of an object of course, with subsequent "object outline sleuthing" and perhaps even morphology estimation, but applicant believes this is where thing registration—as an inherently multi-view activity—begins to merge with the cutting-edge of the very mature art of "image fingerprinting" and the vast array of work that has been done on affine projections, etc., where "single images" and single-image matching drive the underlying processes.

These four levels of registration are quickly seen to be radically-steeped in their "cost reduction" with "cost" interpreted broadly. Whereas the description of rotaregistration of the earlier sections of this disclosure were explicitly correlated to the probable application of advanced R&D, the new four levels above will all have their unique mappings to probable applications. As a first exceedingly non-exhaustive stab at what these application correlations might turn out to be, level 1) might apply to higher end, expensive and counterfeit-prone objects, being prime candidates to utilize still-laboratory grade rotaregistration with a double great arc set-up; 2) Gladson, LLC and Carvana (an online vendor of used automobiles) are two existing commercial efforts which do not create explicit "view signatures" of common product packages and objects like cars, but they do illustrate that this vast market of "things" are economically viable candidates to be placed onto turntables with arrays of cameras gathering data, at least creating 3D models in the process; 3) The iPhone app "SpinCam," by SpotMetrix (www<dot>SpinCam<dot>net) has already proven that normal folks will be willing to take the time to walk a personal camera around pretty much anything or group of things, with people being a primary thing; 4) and finally, applicant is not aware of any current commercial evidence that folks will be willing to simply make a gesture "toward" an object and thereby register that object, annotating it in the process, but the energy spent in describing this capability and reducing it to practice is evidence that investments are being made in the bet that they will be willing to do this.

With regard to the cost reduction level 1 of largely following the laboratory principles of registration yet limiting the motion of the sampling camera to a great arc, and not a great arc on its own turntable, applicant believes there is not a great deal of "raw information" lost in this simplification and that the "practical ideal" may even apply to this simplified set-up. Optical theorists and researchers well know that common surface BDRF's are very often highly symmetric functions. They also know that issues such as the details of how specular reflections differ from one surface to another, and the ratios of specular reflection to diffuse scatter, all can be nicely modeled and that a fixed-dual—great-arc arrangement (i.e. not turntables on either arc) to empirically sample an object can get very close to "predicting" what the full 2-axis camera sampling arrangement would give (the one where the camera arc is on a turntable). Cutting edge R&D however, knows this as well, but prefers the full set-up to at the very least verify these predictions, but more importantly to log exactly where and how such predictions fail. So, bottom line, most if not all real-world market applications including very high end and high cost object registration may be able to make do with a fixed double great arc registration set-up, saving a bit of equipment cost but more importantly, object registration times, cutting the time to register an object down by at the very least another order of magnitude (getting the previous "day or two" down to hours and even minutes with continued ingenuity and efficiencies).

With regard to level 2—where only the object has a turntable and fixed lighting and one or more fixed cameras are taking pictures—much of the physical basis for this set-up already exists in current commercial arts, most notably illustrated by Gladson's and ItemMaster's package imaging set-up, and even more notably with Gladson's partnership with Red Dot Square, where they will even be producing 3D models for these packages. This disclosure unabashedly teaches to use these established data capture approaches as a baseline, tweak the lighting to a more analytic form if possible, either ditch the RGB sensor or make better use of it according to U.S. patent application Ser. Nos. 13/840,451 and 14/201,852, and by all means add a few more cameras, maybe four or five, arrayed at different "latitudes" on the objects, with at least one getting reasonably close to viewing the top of the object. Then, by all means either use the 3-D models commercially generated by Red Dot Square, or better yet, use 3D models better geared toward compact object signature storage, where the SBDRF's of each surface element can be recorded as per the prescriptions of this technology. Lighting direction vectors will be more difficult to assess and hence custom approaches to measuring actual SBDRF's will be an area of attention for the practitioner, where "Lambertian" scattering can always be a default assumption on surfaces, then the actual measurements will either confirm this ultra-generic BDRF model (the Lambertian model), or, measure perhaps some slight anomalies from this model using information from the lighting angles and exact placements of cameras. The point being made here is that for the sake of making the optical registration process as simple as a turntable with some generic lighting and one or more cameras, loss of fidelity of the optical signature must be assumed and accepted, but for many if not most commercial applications it will be quite tolerable mainly because it will be very cheap in equipment and time.

With regards to level 3, the salt-of-the-earth SpinCam registration of an object, again, the physical form of collecting the data is already in place via the "SpinCam" smartphone app (as well as other smartphone apps such as "Camera3D" by Application Technology Co. Ltd., "Trimensional" by Trimensional LLC, etc.). As with the Gladson/ItemMaster/Carvana level 2, one should beef up this application in several ways to turn it into an actual object signature registration procedure. One important first step in this beefing up is to include the best kind of auto-3D-modeling algorithms one can develop either alongside the processing of the raw data capture of a spin, or, as software algorithms applied to captured "spins" as they are called. "Spins" today are simply collections of captured pixel values. As stated in the earliest disclosure sections, anytime there are multiple views of the same static object, classic stereoscopic algorithms can be applied to begin to build a 3D model of something. Doing this very well is the job of a professional engineer, the likes of which are employed by Autodesk, Hypr3D, and their competitors, but doing it reasonably well is simply an advanced under-graduate term project. The most challenging part of creating a 3D model from Spin captures is defining the outline of an object and motion, blur and motion-blur of the captured data. And this is just on static objects. Treating this, however, as a solvable problem at least to some level of precision, once a model is made, the issue of the static-ness versus the dynamism of a "spun object" is a huge practical issue. Suffice it to say that all bets are off for truly dynamic objects, such as a person who moves as the camera is spun around them. At least for pseudo-static objects, even with a person who stands reasonably still during a spin capture, a decent 3D model of that object can then form the basis for Lambertian model estimations of each object surface element, their normal, and their reflectance-projection properties. Tops of objects, just as bottoms on turntable held objects, will suffer in terms of their sampling coverage, but this is just a consequence of the "very cheap" way that spin registrations represent such objects. If you want it really, really quick and cheap, do a common camera spin registration.

Finally, the fourth level of getting super cheap and quick is a gestural wave at an object. The act of the wave does two simple things: motion sensing in the camera tells an object registration app that, OK, this person just "did a wave," so find a dominant singular object generally centered in the field of view that is there across the five to ten+ frames captured during the waving. This is gesturing to trigger the intent to register, but the gesture itself ensures a few different angle views of an object in question. It is these multiple angle views that can then create a "Relief" of the object in question, again utilizing classic 3D stereoscopic algorithms, constrained by the challenge of finding the inherent outline of the object in question. There is no question that the final quality of implementation of this type of object signature registration will require top notch professional engineers to design and accomplish, especially given the need to "isolate a singular object" being waved at, BUT, similarly to both levels 2 and 3, many of the enabling principles of this approach can still build on commercial packages, or even be built around an undergraduate term project once one is liberal on the expectations of quality of result. The final "signature" outcome can remain the same: a list of surfaces, each with its 3D location and surface normal stored, along with its surface reflectance properties (e.g., SBDRF) recorded. Very poor quality of execution will then be a negative issue for quick detection and false positive mitigation, and vice versa with excellent execution.

The resulting signature file can effectively be the same across all five levels of object signature registration procedures; it is the inherent quality and breadth of information that differs. Repeating, this disclosure will later discuss how quality and breadth generally trade off against detectability and false positives during the recognition process.

Snapping a Picture (or Pictures) of an Object, and Matching to its Thingerprint

The history of human fingerprint recording and matching is nearing a century of age in its science and practice. The core practice of creating a large database of recorded human fingerprints, along with the equally important practice of recording an "instance" of a human fingerprint and then trying to "match it" against all the human fingerprints in the database, is quite mature.

The last decade or more of technology has seen the same maturing of "fingerprinting" applied to images and, with a stretch of that term, to audio as well. Same drill: create a large database of fingerprints then try to do a "match" of some instance of a fingerprint with that database. More recently, this general notion has been applied to "images of objects," where it is known that there is one or more images of a given object in a database, then some instance of a photo of that object ought to be able to "match" one of the stored images. Typically this will involve extending the allowed geometric distortions that need to be applied to the instance of the photo (or the database image) in order to achieve some threshold of a positive match, e.g., one must affine transform some data to enable a match.

Both for human fingerprint matching and for image/audio matching then, there is this core need to define some feature set applying to both stored records and new instances, the need to understand that some form of transformation of the stored record and/or the new instance needs to be applied, leading to a correlation metric determining whether or not any stored record "matches" the new instance. Matching an instance of a sampled "object" against a large database (also referred to herein as a "signature database") of stored "object signatures" follows this same procedure. However, in the case of object fingerprint or "thingerprint" matching, it will be seen that whole new levels of fast detection and false positive mitigation can be achieved using thingerprints and their associated matching procedures.

The primordial object recognition procedure shares features with human fingerprint matching, image matching and audio matching: 1) obtain query data generated as a result of empirically sampling an object (e.g., by taking one or more pictures of the object); 2) extract, from the query data, on or more sets of features which can be quickly mapped to corresponding feature set(s) associated with a suitably small subset of object signatures (also referred to as "candidate signatures," "candidate objects," "candidate matches," or simply "candidates") stored in the super-large signature database; 3) then hone in on the sub-set of candidate matches by applying geometrical transformations to the candidate signatures thereof to see which is the best candidate closest to the empirical sample; and 4) declare a match or no match based on a similarity metric. Just as human fingerprint matching must sometimes deal with such issues as wrapped fingerprints on shell casings, and image fingerprinting must sometimes deal with such issues as steeply angled Coca-Cola brand logos, there is a vast array of specific approaches that can be employed, especially in the "geometric transformations" category. As will be seen, object signature matching will tie this category of geometric transformations fully into the 3 dimensional realm, critically including "sleuthed viewpoints" as a kind of three-dimensional projective analog to traditional two-dimensional affine transformation that has underpinned much of image fingerprint matching of late.

An exemplary embodiment for this aspect of the present disclosure samples an object a) using a "high end LED-enhanced camera" (e.g. as described in U.S. patent application Ser. Nos. 13/840,451 and 14/201,852) or b) using a common camera to take a picture of the object, where the former is geared toward sophisticated high-worth objects and the latter toward everyday objects such as product packages. The power of taking multiple pictures beyond just one, and doing so from slightly different angles, will be shown to have large benefits in fast detections and false positive reduction. For example, query data representing imagery of an object captured from multiple viewpoints can be processed by known techniques to separate the sampled object from its surroundings much more effectively than would be possible by processing query data representing imagery of an object captured from a single viewpoint. The next sections describe how we take one and then multiple pictures an object, and proceed to find a matching object signature stored in a signature database containing hundreds, thousands, millions, etc., of object signatures (e.g., each indexed according to an object identifier that identifies an object represented by the object signature).

Coarse View-Rendering the Signature Database to Produce a Stage-1 Fast-Search Database A preliminary step in setting up for arbitrary matching between sensed objects and the large database of object signatures is to create a speed-tuned, filtered version of the full data in the signature database (e.g., a "fast-search database"), aimed at very rapid filtering of early stage match searching. This optimized sub-database concept is well known in both human fingerprinting, image fingerprinting and audio fingerprinting arts.

With thingerprinting, essentially arbitrary parameters need to be determined, then later "empirically optimized," which render some spherically distributed views of every object represented in the signature database, e.g., at a 10-40 degree great-arc (say 30 degrees, for discussion's sake) spacings from each other, here giving 12 equatorial views of an object, plus perhaps 5-12 (say 10) each at the two 30 degree latitude view angles, 3-8 (say 6) each at the two 60 degree angles, and perhaps two at the from-above 75 degree front-and-back angles. Emphasize "arbitrary" at first, to be refined in practice. This gives 46 classic images (also referred to herein as "view images") to represent a single object, with the aim being very fast first stage searching, described next.

In one embodiment, an image to be treated as a "view image" is an image of an object, captured by a camera that is present at some viewpoint relative to the object (e.g., as described by viewpoint coordinates such as azimuth angle, elevation angle, and/or distance) during the registration process. Any captured image of an object (regardless of whether or not the view image is a "view image") can be stored within a database such as signature database (e.g., in association with an object identifier identifying the object depicted in the view image, in association with its corresponding viewpoint coordinates, etc.). Within the database, each view image may be indexed by a view image identifier. Viewpoint coordinates associated with each view image, or with any other sub-set of captured images of the object, (also referred to herein as "recorded viewpoint coordinates") may also be stored in the signature database (e.g., in association with an object identifier identifying the object in the view image). Within the database, each set of recorded viewpoint coordinates may be indexed by a viewpoint identifier.

Recorded viewpoint coordinates may be used to locate a virtual viewpoint relative to an object signature corresponding to the object. A "virtual" view image may then be obtained from the virtual viewpoint (e.g., by projecting a 2D image of the object signature onto a virtual plane from a virtual viewpoint described by viewpoint coordinates corresponding to the recorded viewpoint coordinates). In one embodiment, a virtual view image of the object signature can also be obtained by projecting a 2D image of the object signature onto a virtual plane from a virtual viewpoint that does not correspond to the recorded viewpoint coordinates. The viewpoint coordinates of such a virtual viewpoint can be calculated or otherwise derived from the recorded viewpoint coordinates. As with captured images of objects, virtual view images can also be stored within a database such as signature database (e.g., in association with an object identifier identifying the object represented by the object signature from which the virtual view image is projected, in association with its corresponding viewpoint coordinates, etc.). Likewise, each virtual view image may be indexed by a view image identifier, and viewpoint coordinates associated with each virtual view image may be stored in the signature database (e.g., indexed by a viewpoint identifier, and in association with an object identifier identifying an object represented by the object signature from which the virtual view image is projected).

Thus, to summarize the above, a "view image" can refer to an actual view image (i.e., an image of an object actually captured by a camera present at some viewpoint relative to the object during the registration process) or can refer to a virtual view image (i.e., an image obtained by projecting a 2D image of an object signature onto a virtual plane from a virtual viewpoint relative to the object signature). Moreover, the virtual viewpoint can correspond to recorded viewpoint coordinates (describing where the image was actually captured by a camera) or can correspond to some other viewpoint coordinate where no image was captured by the camera. Stage 1 fast searching/detection, aimed at reducing search spaces on candidate objects by numerous orders of magnitude, is no less than utilizing every best practice possible in the image and icon recognition library. Note that this entails processing each view image in accordance with one or more suitable feature extraction algorithms (e.g., color histogram, FAST (Features from Accelerated Segment Test), SIFT, PCA-SIFT (Principal Component Analysis-SIFT), F-SIFT (fast-SIFT), SURF, ORB, etc.) to generate one or more reference image features. Generally, view images are generated for each object represented by an object signature in the signature database. Accordingly, at least one set of reference image features is produced for each object represented by an object signature in the signature database. In one embodiment, each set of reference image features can be linked to (or otherwise associated with) a corresponding object signature stored in the signature database. These reference image features can be stored in the fast-search database, or can be processed to data forms optimized for extremely fast search and initial matching, e.g., their scale-rotation invariant properties can be extracted (e.g., Fourier Melin, and log-polar techniques, as detailed in U.S. Pat. No. 6,590,996), and then these data representations can be stored in the fast-search database. In one embodiment, each reference image feature, and/or its associated data representation, is stored within the fast-search database so as to be associated with the viewpoint coordinates at which the corresponding view image was captured.

But "stage 1" needs to be emphasized, and what is most interesting about stage 1 in thingerprinting is that classic false positive thresholds can be greatly relaxed over current art image fingerprinting, because exceedingly more precise further stages are ahead. Image fingerprinting is also often "staged," in that some coarser forms of information about an image (e.g., dominant color) can be used in initial candidate sorting, followed by more detailed signature information being brought to bear on next stages of sorting, but in thingerprinting stage 1, this type of staging is eminently acceptable and encouraged but it is only a kind of first stage refinement here. But again, emphasis must be placed on the opportunity to greatly increase matching thresholds in stage 1, thereby allowing many candidates to "pass" stage 1 detection all with the ultimate goal of greatly increasing true-positive detection rates, a massive practical problem for current-art image fingerprinting. (If this weren't a huge problem, then nearly every commercial object on the planet would be near-instantly recognized.)

Reviewing, stage 1 filtering might have, as an input, query data representing an image depicting an oblique view of an object-of-interest (e.g., a Wheaties box), with one or more feature sets extracted therefrom (e.g., using one or more of feature extraction algorithms of the likes noted above) to generate one or more query image features. In one embodiment, the feature extraction algorithm(s) may be applied roughly around the sampled object to coarsely "frame" the object and thus begin a marginal amount of noise reduction due to non-object image data. A preliminary matching process is then performed by querying the fast-search database to identify reference image features that are sufficiently similar to the query image feature(s). The object signatures associated with the identified reference image features are flagged or otherwise identified as a preliminary sub-set of candidate signatures to be processed according to the profile tuning of Stage 2. Thresholds can be very liberally high such that, perhaps, a few thousand candidate signatures are identified as a result of the detection of stage 1.

Generally, the preliminary matching process is performed such that at least some view images associated with the identified reference image features depict an image of a candidate object from a viewpoint that is similar to the viewpoint from which the object is depicted in the image represented by the query data (also referred to as a "query viewpoint"). For example, if one views a Wheaties box from some query viewpoint, many similar Wheaties boxes, other cereal brands, and perhaps rice boxes and whatnot, will all pass through stage 1 detection where the matched views have viewpoints that are similar to the query viewpoint.

To facilitate efficient object recognition, it can be helpful to associate the preliminary sub-set of candidate signatures with a single representative viewpoint (also referred to herein as a "preliminary candidate viewpoint"). Viewpoint coordinates associated with the preliminary candidate viewpoint can be determined by identifying the viewpoint coordinates associated with each candidate match in the preliminary sub-set, and then examining these identified viewpoint coordinates for geometrical clustering to determine a geometrical mean of the identified viewpoint coordinates. The geometrical mean of these clustered viewpoint coordinates is then set as the viewpoint coordinates of the preliminary candidate viewpoint. Instead of identifying the viewpoint coordinates associated with each candidate signature in the preliminary sub-set, only the viewpoint coordinates associated with the top N candidate signatures in the sub-set (e.g., where N is 3 or 10 or 30, etc.) are examined for geometrical clustering to determine the aforementioned geometrical mean.

Stage 2 Profile Tuning—Honing the View-Angles Whilst Filtering the Candidate List Another Couple Orders of Magnitude—all Vite Vite Vite A user takes a picture of a Wheaties box from a 70 degree angle about its waist, and from a 45 degree angle from above. This would be a very difficult case for even the best "affine correctable" image matching approaches where "the image to be matched" is defined as the front of the Wheaties box as stored in an image matching database such as the fast-search database, as opposed to the signature database.

Given the very liberal thresholds set in stage 1 thingerprint matching, however, there was a match between this image and several of the nearby view images of the box, say, two of the ones at 30 degrees from above and one of the 60 degree stored signatures. The first stage may have also let through hundreds of other box-like and even non-box objects as well, including similar Wheaties boxes with different people on the front. Stage 2 processing's goal is to whittle the stage 1 candidate matches from a few hundreds/thousands down to perhaps a single- to two-digit list of candidate matches. This stage is accomplished through profile tuning.

Figure 6A:
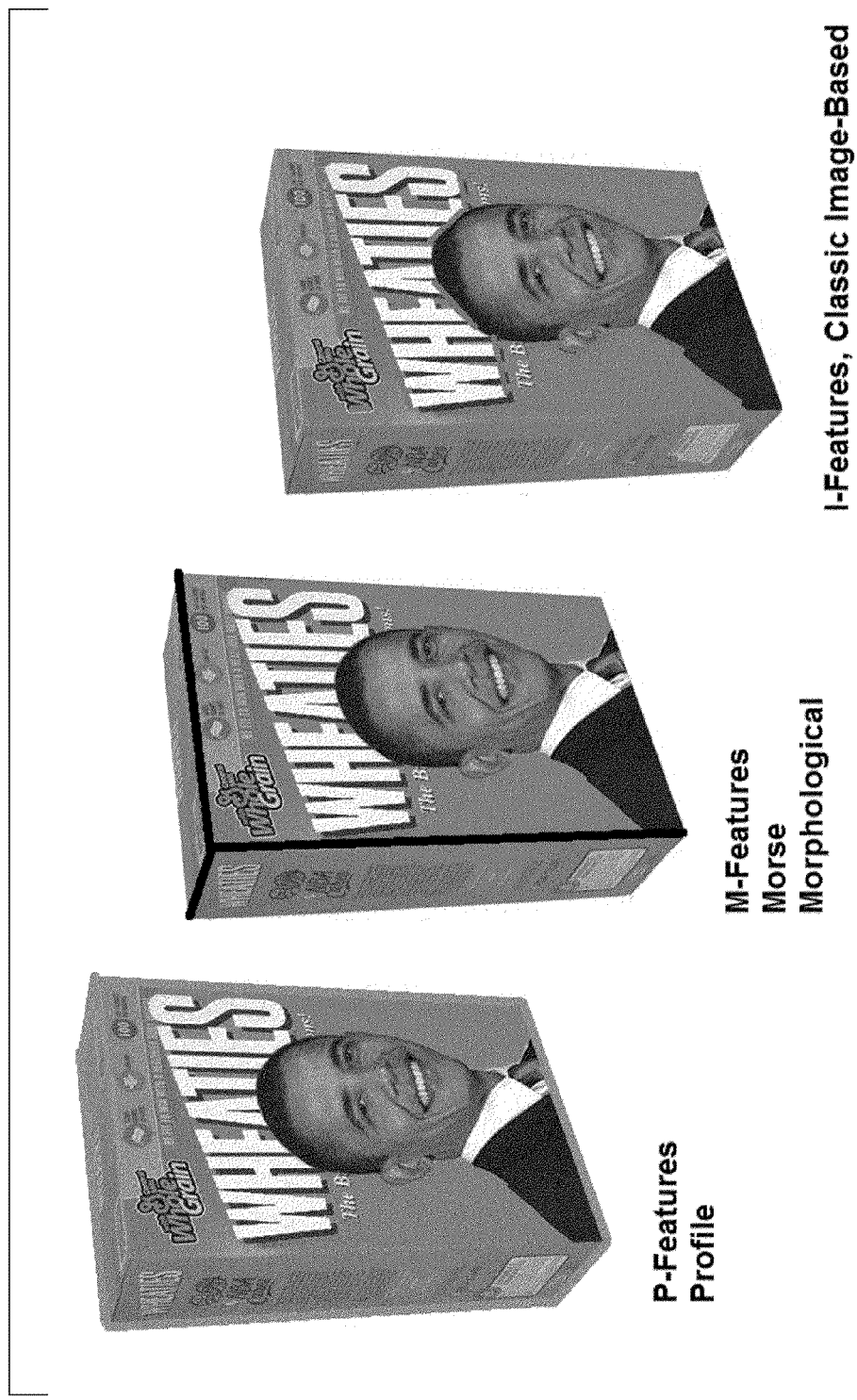
FIG. 6A shows, as an exemplary object, an oblique view of a box of Wheaties cereal, presented three separate times with each image having P-Features, M-Features and I-Features of the object overlaid thereon.
Figure 6B:
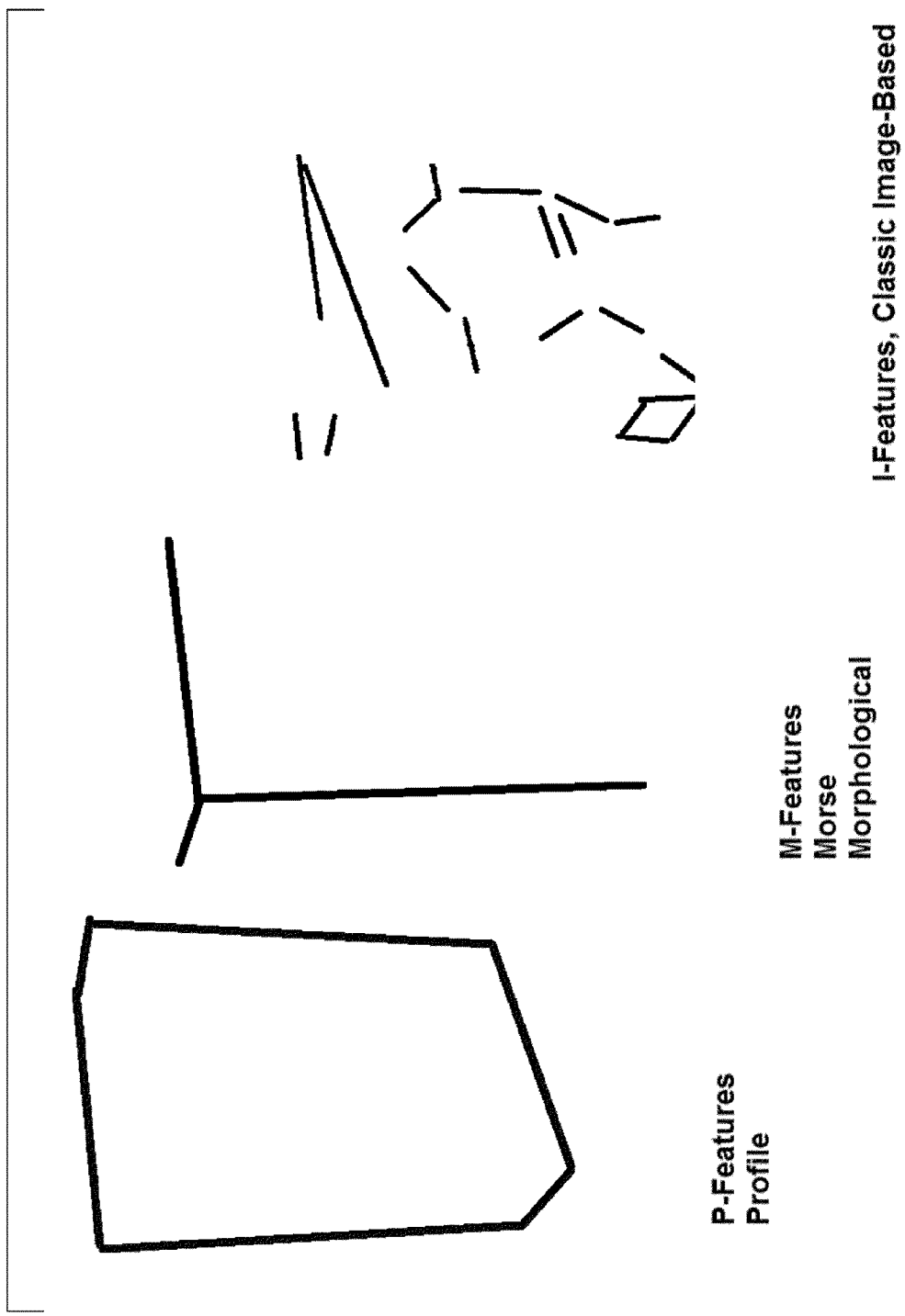
FIG. 6B shows the P-Features, M-Features and I-Features shown in FIG. 6A, but without the view of the box.

FIG. 6A shows a Wheaties box, presented three separate times with each image having P-Features, M-Features and I-Features of the object highlighted (somewhat difficult to see in black and white half-toning, but separately shown in FIG. 6B).

P-Features are profile features of the object, which are a function of both the physical extent of the object and a selected viewpoint onto the object. Thus, the P-features associated with a selected viewpoint onto an object can be represented as a 2D outline of the object, projected onto a virtual plane from the selected viewpoint. In FIGS. 6A/6B, the M-features and I-Features will be discussed further in stage 3 matching, but for now we can note that they are Morse/morphological features for "M," defining 3-dimensional aspects of an object which reduce to classic "features" within some particular view or image of an object, and "image" of "I" features, being just that: classic image-based "features" as current art image fingerprinting likes to call them (e.g., SIFT points—shown as bold lines in FIG. 6B for ease of presentation). These I-features can be the same as the image features discussed above in connection with the reference and query image features. Once a preliminary candidate viewpoint is associated with a submitted image of an unknown object, a precise rendering of the thingerprint creates some P-M-I set of image features, constrained by the profile features, to then be matched against the instance input, similarly constrained to the profile features. This is philosophically related to finding rotation parameters for unknown human fingerprints, then doing a match against a stored fingerprint, and philosophically similar to finding a scale, rotation and affine transformation on a query image being matched against stored image fingerprints. With the thingerprint, however, we now have viewpoint-angle unknowns which need sleuthing/estimating, with then subsequent profile feature clipping of the image features represented in the query data, all adding accuracy to an eventual matching operation with subsequent match-no-match metrics being applied.

(In connection with Morse/morphological features, see, e.g., Milton, "Morse Theory," Princeton University Press, 1963, ISBN 0-691-08008-9; and Zomorodian, "Topology for Computing," Cambridge Monographs on Applied and Computational Mathematics, 2005.)

Back to stage 2, stage 1 has presumably identified a relatively small preliminary sub-set of candidate signatures (e.g. a sub-set of 1000 candidate signatures) representing objects which might possibly match the input instance image of the unknown object. A general goal of stage 2 might be reducing the number of candidate signatures within the preliminary sub-set down another two orders of magnitude (e.g., to 10 or so). Practitioners of identification approaches know that the staging of filtering is more of an empirical art form than an exact science, so these target numbers are merely guides and each application must find its own tuning and thresholds. Indeed, even stage 2 here might be stage 3 in some instances, where stage 2 might be a more refined non-linear affine image signature match routine, where still using just an image signature and standard SIFT/SURF approaches might suffice for a stage 2. The goal in practical implementations is speed of filtering, making sure that true-positives, a.k.a. correct identifications, do not get thrown out at various stages. The stage 2 here described, that of profile tuning, posits that by focusing in on the P-features of a stored thingerprint, a very fast set of tests can be applied where two aspects of the identification challenge are tackled in one stroke: refinement of the matching criteria that can weed out false positives from actual correct identifications, and, refinement of the preliminary candidate viewpoint to more closely correspond with the viewpoint of the input instance image of the unknown object.

One may accomplish this stage 2 by processing the query data (or the feature set(s) extracted therefrom) in accordance with one or more suitable edge detection algorithms (e.g., Canny, Canny-Deriche, Differetial, Sobel, Prewitt, Roberts cross, etc) to generate one or more query profile features. It will be appreciated that Profile features associated with each candidate match (also referred to as "reference profile features") can also be obtained via one or more suitable techniques as will be known to the artisan. Some examplary techniques that may be employed are disclosed in Choi, Changhyun, Alexander J B Trevor, and Henrik I. Christenson, "RGB-D edge detection and edge-based registration," Intelligent Robots and Systems (IROS), 2013 IEEE/RSJ International Conference on. IEEE, 2013; Sun, Yiyong, et al., "Triangle mesh-based edge detection and its application to surface segmentation and adaptive surface smoothing," Image Processing. 2002. Proceedings. 2002 International Conference on. Vol. 3. IEEE, 2002; Bahnisch, Christian, Peer Stelldinger, and Ullrich Köthe, "Fast and accurate 3d edge detection for surface reconstruction," Pattern Recognition. Springer Berlin Heidelberg, 2009. 111-120; and Ao-Yu, Wang, Tang Min, and Dong Jin-Xiang, "A survey of silhouette detection techniques for non-photorealistic rendering," Multi-Agent Security and Survivability, 2004 IEEE First Symposium on. IEEE, 2004.

In one embodiment, reference profile feature(s) are generated for each registered object as part of the registration process. That is, reference profile features are generated based on imagery of an object captured by a camera present at a set of viewpoints actually visited by the camera the registration process. In another embodiment, reference profile feature(s) are generated for each registered object that is represented within the preliminary sub-set of candidate signatures. In such an embodiment, the reference profile feature(s) are generated "on-the-fly", meaning that the reference profile feature(s) are obtained from a set of virtual viewpoints relative to the candidate signature of an object—rather than from the object itself. In this embodiment, the virtual viewpoints can correspond to recorded viewpoint coordinates (i.e., describing viewpoints where images were actually captured by a camera during the registration process) or can correspond to other viewpoint coordinates where no image was actually captured. Viewpoints from which the reference profile features are obtained (whether actual or virtual) can be set at a finer angular resolution than the viewpoints from which the view images were obtained for Stage 1 processing (e.g., to continue with the example given above with respect to stage 1, reference profile features can be obtained from viewpoints taken at 5 degree increments in various directions, rather than from viewpoints taken at 30 degree increments). The reference profile feature(s) associated with each viewpoint can be stored (e.g., within a database such as the signature database, in association with an object identifier identifying an object represented by the object signature from which the reference profile feature was obtained and indexed by a corresponding reference profile identifier), in association with corresponding set(s) of viewpoint coordinates (e.g., which may be indexed by a viewpoint identifier).

Regardless of how the reference profile features are generated, reference profile features associated with the candidate matches are obtained, first from a viewpoint corresponding to the preliminary candidate viewpoint determined in Stage 1 match, and then from one or more additional viewpoints (e.g., determined by offsetting, tweaking or otherwise "tuning" the preliminary candidate viewpoint at 5 degree increments in various directions). A profile feature matching process is then performed to identify certain of the reference profile features obtained from the preliminary candidate viewpoint and each tuned viewpoint, for all candidate matches in the preliminary sub-set from stage 1, that bear a sufficient similarity to the query profile feature(s). Candidate signatures associated with the identified reference profile features are flagged or otherwise identified as a revised sub-set of candidate signatures to be further processed in a subsequent Stage 3 of the procedure.

If stage 1 yields a preliminary sub-set containing, e.g., 1000 candidate signatures, it would be desirable for these stage 2 profile tuning matching processes to be quite fast (e.g., a few tens of milliseconds on cloud-side servers) to boil the preliminary sub-set of candidate matches down to a revised sub-set (e.g., containing ~10 candidate matches). Generally, each reference profile feature identified as a result of the profile feature matching process is obtained from a viewpoint (relative to its corresponding candidate match) that, at least, roughly corresponds (and, at best, at least substantially corresponds) to the query viewpoint. Thus, in cases where the sampled object is not a boxlike object (or, likewise, does not generally resemble a sphere, cube, a cone, a tube, or other simple shape) the profile feature matching process can adequately distinguish, in the preliminary sub-set, between candidate matches that represent objects having a shape corresponding to the sampled object and those that do not. In cases where the sampled object has a simple shape (e.g., the Wheaties box shown in FIG. 1) however, the profile feature matching process will be better capable of estimating the query viewpoint than of further discriminating "the true box" from others just like it. Thus, stage 2 can also include a small dose of I-feature matching and/or M-feature matching during the actual interim match correlations, allowing for assistance in the thresholding process aiming to boil the preliminary sub-set of candidate matches down to a suitably small revised sub-set. In general, however, the viewpoint coordinates are the primary "tuned" parameters in stage 2. Obtaining reference profile features from multiple viewpoints (whether actual or virtual) around a candidate signature, and relative to an initially-estimated preliminary candidate viewpoint, has the effect of applying a series of projective geometrical transformations to projected 2D outlines of registered objects to determine which registered objects represented within the sub-set of candidate signatures have profile features that sufficiently correspond to the outline of the sampled object as depicted in the imagery represented by the query data.

It will be appreciated that, from the series of projective geometrical transformations, parallax information (information describing the displacement in apparent position of certain regions of the profile features of candidate signatures upon viewing the candidate sigantures from different viewpoints) can be obtained. In the event that the query data represents imagery of an object captured from multiple viewpoints, parallax information derived from the query profile data can be compared with parallax information derived from the reference profile features to enhance the correlation match between the query and reference data.

Stage 3: The Thingerprint Identification Decision

Stage 3 object matching of this embodiment will represent the final stage of identification, culminating in a decision that a given image-instance matches a stored thingerprint, or, the instance found no such match. Those practiced in identification problems including human fingerprint matching, image and audio matching, etc., all know that "stages" can be indefinitely nuanced and sub-staged and can contain a variety of correlation operations, non-linear parameter tuning, etc. This is the same exact case in thingerprint matching, there should be no constraints applied to attempting to refine "geometric parameters" generally applied to stored thingerprint data, followed by match-correlation operations attempting to find a supra-threshold value of positive identification between query data representing an image depicting a sampled object and a stored thingerprint. Having said all this, there still is a functional need to boil all these various choices into a single stage that should be specified to operate within some very short time scale, again usually a few tens of milliseconds on the revised sub-set of candidate matches surviving the stage 2 filtering.

This disclosure's stage 3 posits refining the view angles associated with the revised candidate viewpoint onto its corresponding candidate match down to the single degree level (on the full spherical choices of view angles) and, optionally, with a modicum of "distance" estimation thrown in (e.g. estimating a virtual camera as 4 feet away from the candidate match), possibly even generic lighting angles (e.g. estimating that broad ceiling lighting is bathing an object with essentially white light), and definitely including "crop" operations on the rendered views of a candidate match in the revised sub-set, and also the query data, where only image features represented in the query data "on or inside the P-features" of the candidate match in the revised sub-set (and its current viewpoint coordinates) is used during a final match-correlation metric formulation.

Using human-fingerprint matching and image/audio fingerprint matching as philosophical guides, the practitioner of thingerprint matching refines a virtual 3D viewpoint onto a stored object-model (the thingerprint), placing that virtual viewpoint to the point where a correlation-match is optimized between a given view of a candidate match and a cropped (according to the P-features) section of the sampled object represented in the query data. At this optimized virtual viewpoint, a "rendered view" of the candidate match is extracted, possibly with lighting-correction filters applied during the rendering, and then the full-array of "feature correlation approaches" including such well known methods such as "bag of features" or further SIFT or even classic image correlation can be applied between the instance image and the thus-rendered view-data. (In the non-image-correlation cases, appropriate "feature extraction" operations are also performed). Said more plainly, the final operation in stage 3 is the creation of the most similar view possible onto each candidate match in the revised sub-set, guided by the query data, with then a subsequent and final decision on a match versus no-match, using appropriate thresholding values for the typically-multiple feature and correlation tests applied.

Those practiced in identification arts understand that a "final decision" most often is a weighted summation of various indicator values of these final tests as well as estimations of error sources such as the estimated amount of "blur" in the instance image (more generically, the imputed information content of the instance-image). Thus, a decision of match versus no-match will very often be accompanied by some confidence metric in presenting the decision. In the stage 3 of this disclosure (as well as in an embodiment discussed with respect to the stage 2, where I- and/or M-feature matching is applied to facilitate identifying a suitably small revised sub-set of candidate matches), estimations of features belonging to the P, I and M classes of features can additionally be utilized in weighted sums of confidence and final metrics, e.g. I-features may have a different weight than P-features, derived usually from massive regression testing on millions of objects and billions of individual tests. An exemplary score is a polynomial equation, such as:

$$\text{Score} = aKp^d + bKi^e + cKm^f$$

where a, b, and c, are weighting factors, Kp, Ki and Km are match-metrics for the P, I and M classes of features, respectively, and d, e and f are corresponding exponential factors—again determined by regression testing.

The New Power of a Moving Camera Finding a Match to an Object

Certainly at the intuitive level, and after some detailed discussion following at the more analytic level, it should be clear that most cameras can move and take more than one image of an object, very often from slightly different angles on an object, and with such movement, greatly enhance the ability to positively match that object and, inherently, weed out false-positive matching as well. The core principle of more-data generally begetting better-results is a rock solid baseline for this generic statement, but in the case of thingerprint matching it goes well beyond just having twice the data, or ten to a hundred times the data in the case of a short video clip of an object.

In the thingerprint matching case, multiple views from multiple angles will invoke the full power of P-feature matching, placing a potent new constraint on object identifications which at the very least can separate objects with subtly different spatial dimensions. True, the same size box of Wheaties as a box of Cheerios may not be able to take advantage of these multiple viewpoints, but that is where very precisely tuned "pose estimates" onto the I-features of the stored thingerprint come into play at stage 3 decision-times (and I-features already came into play during stage 1 anyhow).

A moving camera also will produce some hierarchy of motion blur in the individual frames and other kinds of diversity in the underlying information content of the now-set of instance images. Perhaps one frame had the head of a child in between a camera and the Wheaties box, 9 other frames didn't. The moving camera also introduces the concept of a one to two second object-recognition session, where the motion-sensors on cameras and camera-carrying devices can play two roles: they can indicate that a user wants an object recognition event to take place through sensed gestures, and, the data from the motion sensors can be used as additional input to thingerprint matching stage 3, where the motion of the sequence of matched views should correlate well (to the coarse level of the noise on the motion sensors) to the measured values of the sensors themselves (i.e., the motion of the "best" virtual viewpoint on a positive-ID object should generally mimic the motion of measured values of the camera).

Motion of a camera is also of great value in situations where an object is particularly difficult to identify with one very quick and perhaps blurry image of it as a starting point. UX design, i.e. user experience design, teaches us that many challenges can be solved through feedback to a user. Let's take the case of a spent and crumpled potato chip bag, one that a given user just finished and enjoyed immensely. The user may point their camera at such an object and simply expect miracles of instant engineering wonders in its instant identification, but, alas, version X.Y of vendor Z's object recognition app just isn't quite up the super-crumpled bag "edge case" as one might call it back at the engineering ranch. UX design procedures can glean from stage 3 submitted results that there were many close calls to several non-box-like "bags," often of the chip-like persuasion (indicating also that stage three does not need to simply report robot-binary yes-no decision but can certainly provide—at least to enquiring applications—much more details). UX design then can call out feedback to a user something like "hey, you seem to want us to figure out what exact bag of something, we think chips, you are pointing at . . . could you help us help you please, uncrinkle bag a touch and give it another go . . . " All this is emphatically lay-language in its engineering execution details, but the point made in this section is that the ability for a camera to "move around," supplemented by brilliance in UX design, offers up intangible benefits toward the ultimate goal of object recognition.

The Role of Ambient Lighting, its Effects on Matching and False Positives

The issue of ambient lighting has already been alluded to in previous sections. One can see from the detailed description of "a thingerprint," that at least for the lab-level and object-turntable-level of object rotaregistration, the stored data is largely "lighting agnostic," in that the stored data describes surface attributes and generic reflectance data, all which can have any "virtual view" with accompanying "virtual lighting" applied to render proferred "view images" to match against image-instances. Obviously a "white light" generic model for lighting a virtual object is a proper starting point for rendering view images, but this section very briefly explains that more sophistication can be applied to the issue of lighting, with the goal being increases in matching efficiency and decreases in false positives.

In short, any knowledge (or sleuthability) of lighting during the capture of image-instances can translate into the rendering operations of at least stage 3 matching. It is also possible to include this kind of information in stage 1 match-filtering, where many current image-fingerprinting companies and academic work has dealt with the generic aspects of lighting, its effects on color and color's role in image-matching and utilizing this extra dimension of information in the overall matching schema.

Normal Cameras Waving at Normal Objects: Reaching the N-9's in Detection and M-9's in False Positive Rejection, all within Less than a Second . . .

This section is partially repetitive to the details already laid out in previous sections. The goal of this repetition here is to condense certain basic messages that otherwise required many pages of details to fully explore. The main idea of this section is that "the gesture" of waving a camera at objects can play a central role in both the registration of objects and the recognition of object. The wave itself becomes an instruction to do one, the other, or possibly even both. The way it would work for "both" is in many applications where an object may actually change quite a bit in its own characteristics. A stretch example here is plants: waving at a small growing oak tree may at one and the same time invoke an object recognition action, identifying that particular tree as one you planted two years ago at such-n-such location, but a user might also have programmed this wave to mean "please register this specific wave, add it to the archive of this object's thingerprint, update its quick recognition feature set and image-set to this one, then give me a green light all that happened. Clever App designers then could even tap into the archive of thingerprints and animate the growth of this particular oak tree to that particular user, very cool stuff.

As indicated in the title of this section, also, is that for any and all applications where false positive rejection is particularly necessary (which, it could be argued, goes for almost all applications to some degree), waving a camera at an object can play a pro-active role in reaching certain defined levels of false positive behavior. In examining a bag from a street vendor, replete with assistance in the lighting of the bag using the imaging techniques described in U.S. patent application Ser. Nos. 13/840,451 and 14/201,852 (discussed earlier as well as later in this disclosure), a user may wait for enough data to be sent to a cloud-side server such that the server sends back a 6 9's level of confidence that this particular bag is indeed what it purports to be. This is an edge-case example of how the time-based act of waving a camera at an object can become a part of the "confidence equation" relative to object identification. It doesn't have to be just counterfeit detection, it can be in any situation where some level of assuredness is desired, such as triggering of augmented-reality icons co-displayed with a viewed object, where they don't appear in full glory until a certain level of true/false positive identification is obtained (think: a kind of hour-glass icon, indicating mid-ID-determination, until some pre-defined confidence level is reached at which time more augmented actions occur).

More Details on Co-Located Structured Illumination and its New Dimension

The last section's quick vignette on examining a bag being sold by a street vendor spoke about sensor-synchronized spectrally-structured light imaging in the process. The disclosure section on supplementing rotaregistration with point-like lighting, and specifically spectral point-like lighting if possible, also gave certain descriptions of the role of spectral light in object recognition. In very short summary, spectral information in a thingerprint and in one or more instance images of an object can be enormously valuable in both rapid filtering of object candidates and certainly in false positive reduction. It is impossible to over-exaggerate this simple point, where the entire art of spectrally identifying chemical species has long attested. Most applications will of course not have the spectral fidelity of a lab spectrometer, but even 5-band or 10-band spectral information can go way beyond "RGB color" methods applied to object recognition. Indeed, RGB color identification is already a differentiator amongst image recognition vendors, some being quite good at this extra information and others paying little attention to it. Those companies which are making strides in using RGB characteristics for identification purposes will easily understand that 4 bands are better than 3, 5 better than 4, etc.

From Thingerprinting to Augmented Things

The last many sections of this disclosure, starting with the request that the reader looks at some object around them and ponders the question of what its optical signature/fingerprint might be, have generally zoomed in on the tasks and descriptions of generating then recognizing object thingerprints. A fair amount of details on actions and variations of action were of course covered. But other sections of this disclosure have explained that there is a larger picture in which thingerprints play a role, that of augmented things. Joining the act of registering an object's thingerprint is the enabled act of authoring associated information with that object. It can be as simple as typing in a name for an object, that's it, all the way to creating a kaleidoscopic interactive bubble explosion experience around an object, intended to be invoked any time a camera looks at some given object and recognizes it. Thingerprinting becomes the identification layer for augmented things, things with inherent 3 dimensions and with an inherent multitude of ways of being viewed.

Thingerprinting as described in this disclosure is argued to be an unequivocal sixth new category of object recognition, adding to and largely intended to supersede several earlier categories: 1) innate object recognition as defined in the image processing literature and industry (See two circular things? What's the dominant color? Could it be a red car?); 2) overt symbology a la barcodes, QR codes, etc.; 3) Icon/Logo recognition both as brands or as symbols such as the Google Goggle product; 4) Image Fingerprinting proper, replete with full-affine and warp capabilities; 5) Digital Watermarked objects; and now 6) Object Signatures or Thingerprint storage and recognition. Proponents of these various approaches to object recognition will rightly extol the wonders and benefits of their home grown version. [It should be here noted that objects which happen to be digitally watermarked will enjoy various "thingerprint" benefits over non-digitally-watermarked objects, not least of which is very fast "local" detection, not requiring the services of "the cloud."]

The good news is that life and the marketplace will continue to churn out winners and losers in the object recognition game, where inevitably all six categories will always have horses in the race.

The Role of P, M and I Features in Local v. Cloud Division of Labor

Applicant's previous patent applications 20110212717 and 20110161076 (referred to here as "ICP," for Intuitive Computing Platform) describe and design a variety of approaches toward the challenge of enabling a user's personal sensing devices such as cameras to recognize and act on "Things." Specifically, there is a great amount of detail on how many different recognition technologies need to co-exist and find ways to cooperate, not simply in sharing some single-thread CPU, but in a much more complicated technical world including many CPU threads, GPU's, internal data buses and quite certainly, wireless channels to "the cloud," where obviously many CPUs can live and perform recognition labor.

This current disclosure particularly highlights the categorization of "visual features" into the P, M and I types as a major tool within an ICP implementation of object recognition. In one initial and concise summary, it turns out that P features, and to some extent M features, better lend themselves to local (user device-side) processing operations over I features. Many current "image recognition" applications that rely on simply stored I-features (e.g., traditional fingerprint-based approaches) are almost always obliged to "fire up channels to the cloud" and ship large quantities of image-pixel-data to the cloud, letting the cloud do all the work as it were. This does not need to be the case when applying Thingerprinting principles to the task of instant object recognition, especially when it comes to early-stage parsing (image processing) of edge-like features and object-profile features—features that can begin to be sleuthed (measured through typical edge-finding operators) even in single images but certainly across a small set of successive images in time, as with the "Wave at it" mode of trying to recognize an object.

Boxlike consumer goods, such as Wheaties boxes, have been discussed extensively so far. Such pseudo-universal forms can have striking and very powerful device-side recognition properties, obviating the need to simply blindly ship pixels to the cloud. Recognition of "probable objects" and some of their low level shape/color/"textness" properties can all be very helpful in the UX timing of feedback to a user, allowing for programmers to begin to display working intelligence as perhaps full positive ID operations continue to happen, those more intense operations perhaps still being "punted to the cloud" because that is where much of the Thingerprint data generally resides, the data required to reach N-9's confidence on object matching.

Again referring to the ICP disclosures, it was shown that underlying pixel data manipulations, which are inherent to all visual object recognition methods, can be shared across recognition modules, where Thingerprint matching can be viewed as one of those modules. Early signs of success in detecting P-features of boxes, or circles, or brand-like framing, etc., can all become inherent triggers to requests for further resources, as described in the ICP disclosures. The results of these operations can also be compressed and sent to the cloud to assist in more focused Thingerprint matching routines as described earlier in this disclosure. The title of this section speaks of "division of labor" and that is precisely the issue when dealing with ever-changing technical capabilities of personal cameras and other user devices, access to wireless channels and the cloud, power usage on portable user devices . . . these issues are the tip of the iceberg when it comes to division of labor. P-feature extraction—or put more technically, "candidate P-feature" generation, since the lowest level image processing deals with initially uncorrelated edges and whatnot—can be a useful early stage processing step not only for Thingerprint registration and/or detection, but for other recognition technologies as well, such as simple barcode detection. Why spew tens of thousands of pixel values to the cloud over a wireless channel when ICP decisions can be made early on where a barcode detector has sensed and read a barcode, giving a user faster feedback? The same situation goes for Thingerprint detection. In particular, P and to some extent M feature "candidates," especially through camera motion, can be early stage triggers and gating function on a more proper use of wireless channels and even local CPU/GPU usage and power draws. Bottom line: Thingerprinting as described in this disclosure not only can play nicely in the ICP architecture, it can become a further tool in device-cloud interaction management usually as driven by user-latency factors but also by simple channel efficiency and power usage.

Autodesk 123D-Catch and Gladson-Red Dot Square Models Qua Proto-ThingerPrints (Autodesk's 123D-Catch tool for computing 3D models from image data, and the similar effort by Red Dot Square using Gladson's product imagery, are presumed to be familiar to the artisan.)

By the very act of moving a camera around an object and subsequently creating a 3D model of that object and then "draping" an image onto that built model, a "proto-thingerprint," as this disclosure will call it, has thus been created of that object. Putting aside various quality issues to be discussed subsequently, a data property of an illustrative stored Thingerprint is as previously stated: a list of surfaces, their orientation in some object-defined space, and some level on information on their reflectance. That's exactly what these current art examples produce. A de minimus addition to this current data which can remove the "proto" and turn this data into an illustrative Thingerprint as described in this disclosure would be to pack the raw information into a more search-optimized form replete with the coarse view rendering utilized in stage one filtering, and some semblance of P-M-I feature parsing more useful in stage 2 and 3 thingerprint detection. These are all just "search packaging" kinds of operations, not really affecting the deepest information content levels of the Thingerprint itself. They are de minimus in that they simply add the additional step of packaging up the data into database forms optimized to sit alongside thousands and millions of objects, with sorting of various attributes then being applied to the individual thingerprint records. (Said another way: a searchable database of thingerprints would not be just a serial packing of native data formats that 123D-Catch and Gladson/Red Dot Square utilize . . . there can be "pointers" to these native data formats in the scaled searchable database, useful in stage 3 viewpoint refinement for example.)

Premeditating, then, that such current art approaches can in fact form the necessary data generation basis for Thing registration, a few quality optimization and quality assurance elements could also be added to these existing procedures, thereby enhancing them to better perform relative to Thingerprint matching. These optimizations are not rocket science. In the case of 123D-Catch, for example, simple UX instructions might be added to instruct users to "get a little above the object with a few camera views" can assist in getting the fuller spherical form of a ThingerPrint, instructions on possible problematic lighting is another UX example, resultant "holes in the model" and/or areas in a generated 3D model which wind up being non-existent or severely degraded can be flagged in the ThingerPrinting storage and P-M-I feature extraction process, providing "weights" (usually quite low weights for poor quality data) to subsequent search procedures . . . this is but a starting list of how 123D-Catch, modified to better serve Thingerprint registration and detection, can slowly remove the "proto" from the word "Thingerprint."

Likewise with Gladson/Red Dot Square: The room for specific improvements aimed toward optimizing Thingerprint registration (and therefore subsequent detection) are even more than the case for 123D-Catch. The Gladson set-up is already of high professional grade, generally conforming to brand-conscious quality standards. What would be nicer is adding in a few more camera angles to the set-up, producing better specular vs. diffuse measurements of surfaces as but one initial example. The earlier section which discussed the many levels of rotaregistration of objects touched upon this area, where the compromises made in going from Lab-level registration to the turn-table only registration can all be examined and "un-compromised" and included back into the Gladson arrangement IF empirical testing and lowering of false positives become the provable benefits. It is really a cost matter, how many engineers spending how much time tweaking the photography set-up, all for what benefits? The Grand-Daddy lab level of spin registration can always be made! But practically speaking, the current Gladson set-up is very far down the road for practical purposes of ThingerPrint detection.

Still More

Certain aspects of the foregoing may be made clearer by discussion of a further exemplary implementation. This implementation does not exploit all the features detailed above, but should further evidence their applicability.

In this exemplary implementation, a smartphone or other camera sensor captures 2D views at increments along an arc or other path around an object. Software in the phone, or elsewhere, processes the captured image information to produce sets of traditional 2D feature points.

The 2D views may be taken at increments of, e.g., 1, 2, 6 or 15 degrees, etc. The position of the imaging system that captures these reference views (e.g., the smartphone) can be determined by reference to position sensors in the device, such as a 3D-magnetometer and a 3D-gyroscope. (If previous knowledge is available about the object geometry and scale, sensor position information may be deduced from the imagery.) The sensor(s) can control the capture of images at these incremental positions, or can flag particular frames in a captured free-running video sequence for feature extraction analysis (e.g., using one or more techniques such as color histograms, FAST, SIFT, PCA-SIFT, F-SIFT, SURF, ORB, etc.) to generate one or more reference image features. The arc may comprise a great circle path (i.e., the shortest line between two points on a sphere centered on the object), although this is not necessary.

Ideally, the sensor would 2D capture imagery from viewpoints uniformly arrayed on the surface of a sphere centered on the object, and produce feature point information for each such view. Practicality precludes this. However, since the sensor captures imagery at a variety of locations along the arced path, information about the object's 3D shape (also referred to herein as "3D object information" or simply "3D information") can be inferred using familiar principles of stereoscopy (e.g., parallax effect evident in comparing two images taken from two viewpoints evidences information about 3D shape). So-called "structure from motion" and "simultaneous localization and mapping" (SLAM) methods, which are familiar to artisans from the great numbers of papers published on these topics, may be employed.

If the camera system provides depth information, such as is provided by time-of-flight cameras, plenoptic cameras, stereoscopic cameras (e.g., such as the TCM9518MD, or as incorporated within the HTC One M8 smartphone, etc.), as is provided by ranging systems such as those associated with the Microsoft Kinect sensor system (as well as other technologies developed by PrimeSense), the Structure Sensor developed by Occipital, Inc., the 3D vision system associated with Google's "Project Tango", etc., then 3D object information is more directly available.

3D object information is also readily obtained if the object is watermarked—such as by a texturing of the physical shape of, or by luminance or chrominance modulation of imagery on, the object. This is because the orientation signals in watermarks enable the pose of an object to be determined. In particular, if the scale of the original watermark is known (e.g., in watermark elements per inch, aka waxels), or if it can be sleuthed (e.g., if there is a feature of known dimension in the same plane as part of the watermark) then the absolute distance from the camera to any point on the object can be determined. If the scale of the original watermark is not known, then relative distances to different points on the object may nonetheless be determined by relative variations in scale sensed from the watermark orientation signals.

Figure 1:
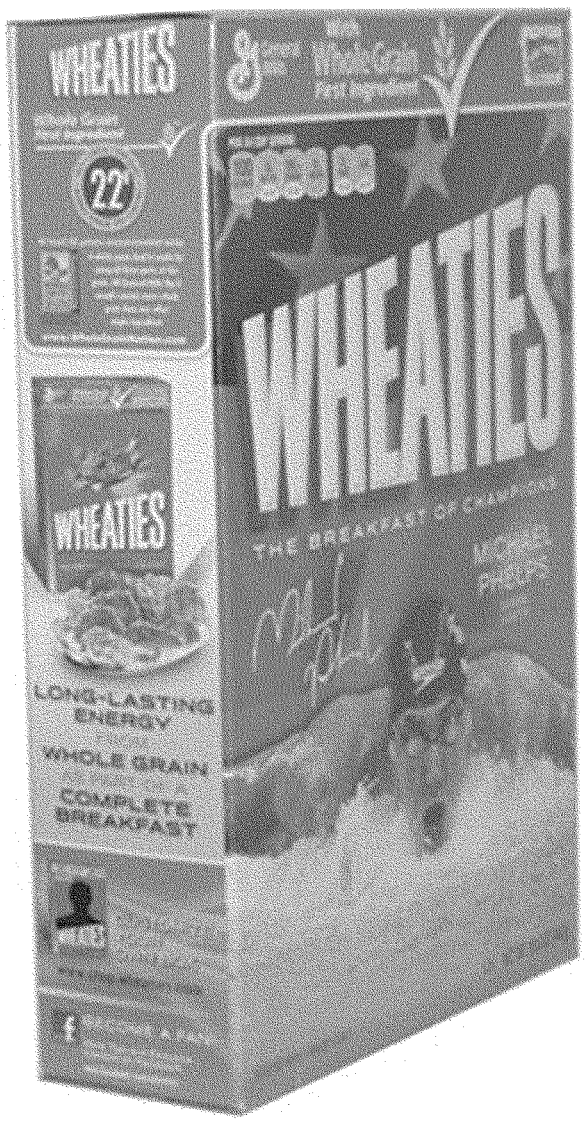
FIG. 1 shows an oblique view of a box-like object showing artwork from General Mills Wheaties cereal.

In the FIG. 1 example, if the different faces of the cereal box are watermarked, their orthogonal planar relationship (and the location of the box corner) can similarly be discerned, by analysis of the orientation signals in the watermarks detected from the two faces.

Thus, a conventional camera, imaging a watermarked object and analyzing the watermark information, is effectively a depth-sensing imager. And as noted, the physical inclination of watermarked surfaces can similarly be determined from the geometrical distortion of the known watermark signal. This capability allows the physical 3D configuration of a watermarked object to be discerned from 2D image data. This is akin to the above-referenced "structure from motion" and SLAM processes for determining 3D shape, but without any requirement of motion. A static image suffices.

Back to reference image features, once 3D information about an object has been produced, 2D views of the object from viewpoints that the camera didn't visit can be created, and corresponding reference image features can be calculated from such created views.

Consider a tea pot, as shown in FIG. 2. A smartphone may capture imagery while traveling an equatorial path around the pot (i.e., an arc in a plane parallel to the base of the pot, and at a vertical position halfway up its height). From this information, the software can create a 3D mesh or other 3D model, of the tea pot that can be rendered to show its 2D appearance from viewpoints both above and below that equatorial arc. (The distance of these virtual viewpoints from the object can be the mean distance from which the physical camera sensor captured imagery.) In this particular embodiment, the software produces a 2D image from the model at viewpoints spaced every ten degrees of longitude around the tea point, and at every ten degrees of latitude, i.e., 1296 views in all. (The virtual viewing distance d is fixed.) From each such 2D view, a set of fingerprint features is extracted and stored.

It will be recognized that 2D images created from viewpoints of the 3D model where the "north pole" of the tea pot would be visible, and also the "south pole," will be lacking image information from these poles, since these regions are not visible from the equatorial locations from which imagery was captured. Such model-based views of the object—including gaps in the polar regions—are nonetheless useful because they provide viewpoint-dependent depictions of other regions of the tea pot for which image information is available.

Just as polar image information is not available from imagery collected along an equatorial path, other image information may be missed if the arced camera path does not extend far enough around the tea pot equator. It is not necessary to travel a full 360 degrees. If the camera is sufficiently spaced from the tea pot, full imagery from equatorial parts of the pot is gathered if the arc even extends slightly beyond 180 degrees in length.

Figure 3:
FIG. 3 is an image of a teapot.
Figure 4:
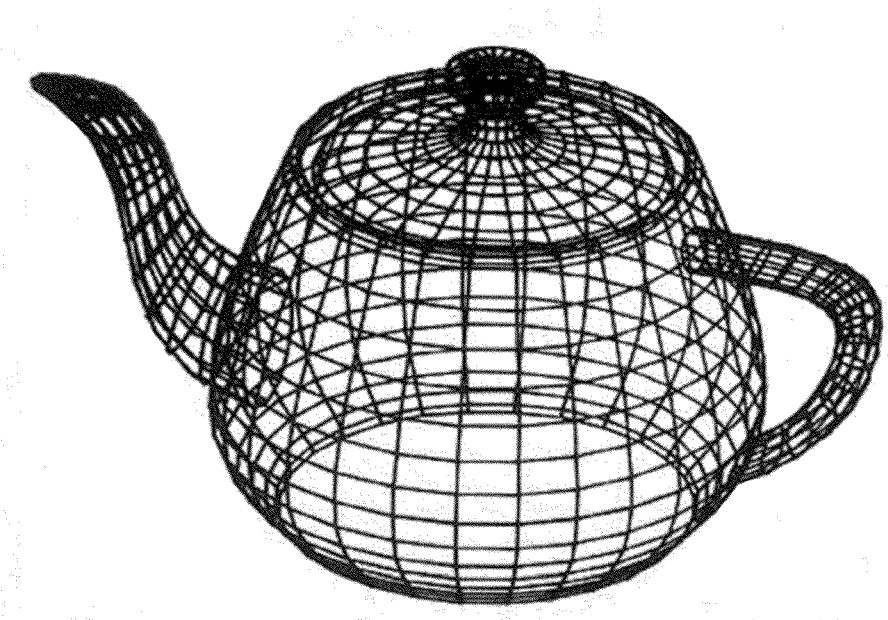
FIG. 4 is a wireframe model of the teapot shown in FIG. 3.

(FIG. 3 shows a famous tea pot—the one used in 1975 by Martin Newell at the University of Utah to develop a tea pot model (FIG. 4) that is widely used as a standard reference object in computer graphics. This tea pot is devoid of graphic features; it has a uniform bone color. As will be evident, the present technology takes shape into account, but also considers visible patterning. This allows, e.g., two tea pots that are identical in shape, but different in ornamentation, to be distinguished and separately identified.)

The reference image features resulting from the above-described process for each object are stored in a database (e.g., in a database such as the aforementioned fast-search database), each identified by its viewpoint coordinates (e.g., azimuth, elevation, and distance). The 3D model itself for each object is also typically stored (e.g., in a database such as the aforementioned signature database). In one embodiment, the reference image features, each identified by its viewpoint coordinates, are stored in the same database as the 3D models (and are stored in association therewith). (In some embodiments, each 3D model can be later recalled for rendering on a user device, draped with imagery and annotations.)

In addition to, or as an alternative to, extracting one or more reference image features from the 2D images produced from the model at each viewpoint, it may be desirable to process one or more view images to capture, derive or otherwise obtain the profile features the object (also referred to as "reference profile features") from at least one actual or virtual viewpoint. The reference profile features of an object can be discerned in various ways. For example, any suitable edge detection algorithm may be applied to a view image of the object captured by a camera. In another example, one may apply 3D edge-finding techniques to the 3D model or object signature of the object, and project a 2D counterpart of that edge onto a virtual camera focal plane at the viewpoint. Reference profile features, or data based on it, is typically stored in the same database as the sets of reference image features—again in association with the viewpoint coordinates and information identifying the object.

The above example involved a smartphone for image capture. In many cases (e.g., packaged retail items), image capture may performed by a service provider such as Gladson, LLC or ItemMaster LLC, employing a robotic photographic studio to capture the requisite imagery. These companies typically also capture physical measurement information from the products they process. As noted, this measurement information aids in producing accurate 3D models. (Gladson is said to photograph and measure thousands of new retail items each week.)

This above processes may be regarded as an enrollment phase of the technology—entering object information into the system (e.g., akin to the registration process described above). The present example involves three other phases: annotation authoring, object recognition (also referred to herein as "object matching"), and presentation of information to user.

In the second phase, annotations are associated with the object information. For example, an author can identify particular locations on the object surface, and define annotations that should be associated with each such location (and optionally the viewpoint perspectives from which the annotation should be made visible to a viewer). The annotations can be referenced to points on a 3D model, or to locations in a digital watermark pattern or a map of image feature points, etc.

The annotations can take the forms of icons, baubles, graphics, links, videos, social tags, etc., as detailed, e.g., in published patent applications 20110212717, 20110161076, 20120134548, and application Ser. No. 14/152,925 (filed Jan. 10, 2014).

In the third phase, an attempt to recognize or match the object is made. This typically involves a user capturing one or more images of the object (i.e., generating the aforementioned query data) using a camera-equipped device such as a smartphone or other mobile phone, a tablet or laptop computer or other handheld electronic device such as a digital camera, a web-cam, a wearable electronic device (e.g., of the likes that may be worn on, or otherwise mounted to, the user's wrist—such as Samsung's Galaxy Gear, the user's arm—such as Panasonic's HX-A500, the user's head—such as Panasonic's HX-A500, Google's Glass, etc., the user's ear—such as Looxcie's LX2 Wearable Video Cam, etc.), etc. Each of such devices may herein be generically referred to as the aforementioned term "user device." In many embodiments, user devices can be provided with the ability to communicate with one or more other electronic devices or networks via any suitable wired technology (e.g., USB, Ethernet, Firewire, phone connector, etc.), wireless technology (e.g., GSM, 3G, 4G, CDMA, Wi-Fi, WiMax, Zigbee, RFID, NFC, Bluetooth, Bluetooth Low Energy, Li-Fi, etc.).

The system software may first try deterministic techniques to identify the object, such as detecting an embedded watermark, barcode or identifying printed text (e.g., by OCR). If one of these is found, the detected watermark or barcode or identified textual information is used to query, e.g., a database registry, to obtain information identifying the object or otherwise relating to the object. The obtained information (or an indication that such information exists) may then be rendered to the user (e.g., visually, audibly, haptically, etc.) via the user device or a different device associated with the user (e.g., which may include a smartphone or other mobile phone, a tablet, laptop or desktop computer, a media player, a wearable electronic device equipped with one or more displays, loudspeakers, haptic actuators, or other output component (e.g., of the likes that may be worn on, or otherwise mounted to, the user's wrist—such as Samsung's Galaxy Gear, the user's arm—such as Panasonic's HX-A500, the user's head—such as Panasonic's HX-A500, Google's Glass, etc., the user's finger—such as Logbar's Ring, the user's ear—such as a hearing aid), or the like or any combination thereof. It will be appreciated that the aforementioned deterministic techniques may, optionally, be applied in the object matching procedure described above (e.g., before performing the Stage 1 fast searching/detection phase of the object matching procedure). If no such deterministic identifier is sensed, the software then undertakes an object identification procedure employing image, profile and/or morphological feature matching techniques. Basically, the user-captured imagery is processed to produce one or more image features, profile features and/or morphological features (also referred to as query image features, query profile features and query morphological features, respectively, and each generically referred to herein as a "query feature" or as "query features"), and the reference image features, reference profile features and/or reference morphological features (each generically referred to herein as a "reference feature" or as "reference features") obtained as a result of the enrollment phase are searched to identify a candidate object having one or more "matching" reference feature sets.

In one exemplary application, a user-captured image is divided into an array of tiled blocks, e.g., numbering between 4 and 400. A visual saliency model is applied to the image to identify portions that may most quickly draw a viewer's attention. One or more query features is computed for the blocks that contain (or span) visually salient portions.

The query feature(s) for a selected one of these blocks is then used as a probe into the database of corresponding reference features for candidate matches. Techniques used in conventional 2D fingerprinting to identify and score matches can be used. This process proceeds to yield a ranked list of pointers to candidate matches. For example, the 3, 10 or 50 best candidate matches in the database to the selected image block fingerprint may be identified. The best match (which may have a score of 87 out of 100) may correspond to an excerpt of image features corresponding to a certain viewpoint (e.g., identified by a viewpoint identifier no. 1125) of an enrolled object (e.g., identified by an object identifier no. 38635). The next-best match (which may have a score of 73) may be with an excerpt of image features for viewpoint no. 843 of object no. 8385. Etc., etc.

The same process is repeated for other visually-salient blocks of the user-captured image. This may result in candidate matches including viewpoint no. 429 of object no. 38635 (score 54), and viewpoint no. 763 of object no. 42015 (score 37), etc.

All these matches serve as votes, for particular candidate matching objects, and for particular candidate matching views of these objects. The score values are summed by object (and sometimes further by view). In the example given above, object no. 38635 was twice identified as a candidate match, once with a score of 87, and once with a score of 54. Object no. 38635 thus has a vote total of 141.

This process continues, considering more blocks of user-captured imagery, until one object starts emerging as the clear best match, by vote count. Known statistical techniques can establish thresholds by which the "clear best match" determination can be made (e.g., less than a 0.1% or 0.01% probability that any object other than the top-voted object is the correct match).

In hindsight, this matching process may be viewed as akin to that employed by Shazam in its audio identification technology, as described in its U.S. Pat. Nos. 6,990,453 and 7,627,477, and in Wang, The Shazam Music Recognition Service, Communications of the ACM, Vo. 49, No. 8, August, 2006, pp. 44-48.

If the process continues beyond a threshold time interval without a single winner emerging (which may be the case, for example, if the actual object was enrolled twice in the database—thus yielding two close candidate matches), the process is terminated. The top vote getter can be identified to the software, with an indication that the process terminated abnormally. (Details of other candidate matches can also be provided.)

Sometimes, all that is required by the user's software is identification of the matching object. Other times, however, it is desirable to determine the user's particular viewpoint of the sampled object as well. Again, a voting procedure can be employed. In this case, the statistics may not cause one candidate to quickly eclipse all others in vote tally if image features are exclusively (or even possibly predominantly) relied upon to identify candidate matches. In part this is due to the fact that the image fingerprint techniques commonly used (e.g., SIFT) are somewhat robust to certain geometrical distortions, so some matches may be found across variations in viewpoints. One way to handle this is to identify the N top vote-getting candidate object viewpoints (e.g., where N is 3 or 10 or 30, etc.), and then examine these for geometrical clustering (e.g., many of the viewpoints have an azimuth angle of about 30 degrees and an elevation angle of about 10 degrees). A geometrical mean of these clustered viewpoints is determined, and this is returned as the viewpoint (with other preliminary candidate viewpoints being discarded as outliers).

In a fourth step, after the object has been identified, the associated annotations are presented to the user using the device display, in conjunction with (e.g., overlaid on) a depiction of the object. If the depiction is live imagery captured by the user device, and the device is moved to another view, the annotations move and/or change accordingly. If the depiction is not based on live imagery but is instead based on a rendering of a 3D model or a series of static imagery (e.g., recalled from the database), then the software UI can permit the user to explore different viewpoints of the object, with the annotations again tracking accordingly.

While many uses of the technology will concern packaged retail objects, some of the most important uses of the technology may stem from user-authored annotations. An example is a grandmother who captures video imagery of family heirlooms and narrates, for each, a bit of its story. The video clips are processed as sweeps depicting each object from different viewpoints. A model is produced, and an extended set of fingerprint data (i.e., corresponding both to the captured image views, and also depictions from other viewpoints as derived from the model) is calculated and stored, to enroll each such the object. The audio clips are then associated as annotations with the different objects. (The annotations may be associated with different locations on, or viewpoints of, the object. E.g., "This side of the tea pot has handprints of my eldest son Romulus when he was a toddler" and "This other side of the tea pot has handprints of his infant brother Remus.") Later, others in the family can capture images or image sweeps from these objects, and be linked to the grandmother's explanations of their place in family history. And the subject tea pot—which may have come from a paint-your-own-pots craft shop, can be distinguished from all other such pots—despite the fact that their shapes may all be identical.

Additional Notes on Specular and Diffuse Reflections

The reflection of light from physical objects is generally classified as being either specular or diffuse. Most materials exhibit a mixture of specular and diffuse reflection. Those of us having the privilege of normal vision have an intuitive connection to these differences in reflective properties, largely summarized by the degree of glossy versus matte appearance of surfaces and everything in between.

In one embodiment, the object signature of any registered object can, depending upon the manner in which the object signature is created, represent an attempt to faithfully model whatever specular and diffuse reflectance effects are associated with that object. Information provided by the object signature regarding the characteristics of the specular and/or diffuse regions of a registered object can then be used in the P-, M- and/or I-feature matching processes of Stages 1, 2 and/or 3, or may be used to facilitate any other suitable or desired object recognition procedure. See, e.g., Osadchy, Margarita, David Jacobs, and Ravi Ramamoorthi, "Using specularities for recognition," Computer Vision, 2003. Proceedings. Ninth IEEE International Conference on. IEEE, 2003.

In another embodiment, the object signature models the exterior of surface of the registered object as a Lambertian (or at least substantially Lambertian) surface. To ensure that imagery depicting objects-of-interest can be reliably recognized using Lambertian object signatures, it may be desirable to remove or otherwise reduce regions of specularly-reflected light (also referred to herein as "specularities") in the captured imagery. In one embodiment, specularities may be removed or otherwise reduced by processing the query data. Exemplary algorithms that may be employed to remove or reduce specularities are described in Mallick, Satya P., et al., "Beyond lambert: Reconstructing specular surfaces using color," Computer Vision and Pattern Recognition, 2005. CVPR 2005. IEEE Computer Society Conference on. Vol. 2. Ieee, 2005; Artusi, Alessandro, Francesco Banterle, and Dmitry Chetverikov, "A survey of specularity removal methods," Computer Graphics Forum. Vol. 30. No. 8. Blackwell Publishing Ltd, 2011; and Yang, Qingxiong, Shengnan Wang, and Narendra Ahuja, "Real-time specular highlight removal using bilateral filtering," Computer Vision-ECCV 2010. Springer Berlin Heidelberg, 2010. 87-100. Other methods of reducing specularity in captured imagery that may be employed here are described in applicant's copending U.S. patent application Ser. No. 14/201,852.

More on Objects and Stored Information

In view of the foregoing, it will be appreciated that many objects (possibly many hundreds or thousands of objects, or more) can be registered or enrolled in accordance with the processes described above. Examples of such objects include furniture (e.g., chairs, desks, tables, stools, etc.), lamps or other lighting fixtures, toys, clothing (e.g., shoes, hats, shirts, pants, gloves, etc.), eyewear (e.g., glasses, goggles, etc.), sports equipment, vehicles (e.g., bikes, cars, trucks, airplanes, boats, etc.), buildings, books, telephones, televisions, mobile phones, smartphones, desktop computers, laptop computers, tablet computers, wearable electronic device (e.g., of the type that may be worn on a user's finger, wrist, arm, head, ear, etc.), batteries, packaged goods (e.g., consumer packaged goods such as a box of cereal, a soup can, a bag of potato chips, a tube of toothpaste, over-the-counter medicines, etc.), animals (e.g., dogs, cats, birds, frogs, etc.), fruits (e.g., apples, grapes, oranges, etc.), vegetables (e.g., peppers, etc.), mushrooms, nuts, trees, shrubs, etc. Objects may also include landforms (i.e., including physical land features such as hills, mountains, plateaus, canyons, loess, valleys, glaciers, etc., as well as seascape and oceanic waterbody features such as bays, peninsulas, seas etc., and sub-aqueous terrain features such as mid-ocean ridges, volcanoes, and the great ocean basins). Stated differently, objects that may be registered or enrolled include natural objects or any objects manufactured by one or more suitable or desired techniques involving injection-molding, compression molding, investment casting, centrifugal casting, machining, milling, sanding or grinding, polishing, computer numerical control (CNC) machining, 3D-printing, etc.

As discussed above, each registered or enrolled object may be associated with one or more items of object information describing inherent attributes of that object (e.g., including object signatures, 3D models, view images, and reference features such as P-features, M-features and I-features. Such information may be stored on, or be accessible via, one or more databases (e.g., the fast-search database, the signature database, or the like or any combination thereof, also collectively and generically referred to herein as an "object registry") in association with related information (also referred to herein as "attribute metadata"). Attribute metadata may include information describing the locations of viewpoints from where view images, reference features, etc., were captured, generated, or otherwise obtained, identifiers identifying one or more items of attribute information, or the like or any combination thereof.

Typically, the object registry is maintained remotely from the user device, but at least a portion of the object registry may be remotely accessed from the user device during the object registration process. In another embodiment (e.g., in which at least a portion of any profile-, morphological- and/or image-feature matching process, or any other portion of an object recognition process, is performed at the user device), at least a portion of the object registry may be transferred to the user device and the transferred portion may serve as the dataset on which the user device can perform its portion of the object registration process. Examples of how the object registry may be segmented, filtered or otherwise partitioned are described below in the section entitled "Search Space Reduction."

In a further embodiment, each registered or enrolled object may also be associated with one or more items of additional information (also referred to herein as "object metadata") relating to that object. Object metadata can be stored on one or more databases associated with the object registry and/or the object metadata can be accessible via a link (e.g., to some other database or website) that is stored within the object registry. Object metadata associated with one or more candidate signatures and/or with associated with a final candidate signature that "matches" the sampled object, can be returned to (or otherwise made accessible to) the user as a result of any object recognition or matching procedure described herein (or as a result of any other suitable or desired object recognition or matching procedure). Results including object metadata may be presented or rendered (visually, audibly, haptically, etc.) to the user (e.g., via the user device or other device associated with the user). In one embodiment, the object metadata can be visually conveyed as an annotation overlaid (e.g., in registration) with an image of the object-of-interest (or corresponding image of the registered or enrolled object) on the user device. The annotation may be in the form of an icon, bauble, graphic, link, video, social tag, etc., as discussed above.

In one embodiment, any item(s) of object metadata retained in the object registry can be returned to the user (or otherwise made accessible to the user). In another embodiment, the particular item(s) of object metadata that are ultimately returned to the user (or otherwise made accessible to the user) can be determined based upon user identification information (e.g., describing an identity of the user when the object-of-interest was sampled, when the result was returned to the user, when the user accessed the result, etc.), temporal information associated with the user (e.g., describing when the object-of-interest was sampled, when the result was returned to the user, when the user accessed the result, etc.), the location of the user (e.g., describing the location of the user when the object-of-interest was sampled, when the result was returned to the user, when the user accessed the result, etc.), or the like or any combination thereof.

In one embodiment, the object metadata includes object identifying information. The object identifying information can, for example, identify the registered or enrolled object in terms of one or more object identifiers such as a serial number, a part number, an international standard book number (ISBN), a universal product code (UPC) number, a global trade item number (GTIN), an electronic product code (EPC), etc. In another embodiment, the object identifying information can identify the object in terms of a planogram identifier (e.g., identifying a planogram associated with the object). It will be appreciated that a planogram is a data structure conveying (e.g., in a list, in a graphical diagram, etc.) the object identifiers, positions, orientations, etc., of objects within a freezer unit, refrigerator unit, produce bin, etc., or otherwise held, stocked, displayed or supported by a rack, shelf, fixture (e.g., comprised of a set of horizontally- or vertically-adjacent shelves), fixture section (e.g., comprised of a set of horizontally- or vertically-adjacent fixtures), or the like or any combination thereof, typically within a retail environment. In another example, the object identifying information can identify the object in terms of one or more semantic descriptors (e.g., at any of various levels of specificity such as textile, fabric, cashmere, gingham, velvet, corduroy, clothing, shirt, shoe, food, cereal, Wheaties, Cocoa-Puffs, soup, minestrone soup, potato chips, barbeque-flavored potato chips, Lay's® Classic Potato Chips, toothpaste, drug, over-the-counter drug, Childrens Tylenol®, dye-free Childrens Tylenol®, animal, dog, Beagle, Siberian Husky, cat, American Shorthair, Persian, bird, Black-Capped Chickadee, Southern Cardinal, frog, Squirrel Tree frog, Long-legged Cricket frog, toad, Southern Toad, Rocky Mountain Toad, fruit, apple, Braeburn, McIntosh, orange, Satsuma, Navel, vegetable, pepper, Bell pepper, Anaheim pepper, Cayenne pepper, mushroom, Chanterelle, Portobello, Blusher (Amanita rubescens), nut, almond, cashew, tree, oak, birch, shrub, automobile, car, truck, Ford Festiva, Toyota Highlander, etc.).

In another embodiment, the object metadata includes certain descriptive information describing certain characteristics, or typical ranges thereof, of the registered or enrolled object such as the object's size, weight, density, volume, color, surface type (e.g., in terms of surface texture, reflectivity—e.g., matte, gloss, etc., etc.), reflectivity, spectral reflectance curve, shape resemblance category (e.g., describing a general shape of the object or some portion thereof, as curved, planar, spherical, tetrahedral or any other type of polyhedral shape, etc.). In another embodiment, the object metadata can include compositional information, describing materials or substances the registered or enrolled object is formed of or otherwise contains as an ingredient or other constituent, etc., (e.g., in terms of specific metals, polymers, fabrics, wood products, animal products, allergenic proteins, hazardous chemicals or other substances, chemical additives, preservatives, or the like or any combination thereof). In another embodiment, the object metadata can indicate that text, signs, symbols, lines, curves, or other visual indicia are visible from the surface object, indicate where such visual indicia are located on the object, indicate the visual indicia present (e.g., as the visual indicia actually located on the object, an image fingerprint thereof, or any other suitable representation), or the like or any combination thereof.

In yet another embodiment, the object metadata includes recycling information. Recycling information can, for example, describe whether the registered or enrolled object contains recycled materials, what percentage of the registered or enrolled object constitutes recycled materials, what component(s) in the registered or enrolled object contain recycled materials, how the registered or enrolled object may be recycled, or the like or any combination thereof. Recycling information can also describe whether or not the registered or enrolled object itself is recyclable (e.g., by graphically or textually conveying one or more recycling codes). Examples of commonly recognized recycling codes include those used to identify recyclable or otherwise reprocessable plastics (e.g., 1 for polyethylene terephthalate, 2 for high-density polyethylene, 3 for polyvinyl chloride, etc.), batteries (e.g., 8 for lead-acid batteries, 12 for lithium batteries, etc.), paper products (e.g., 20 for cardboard, 21 for mixed paper magazines or mail, 23 for paperboard, etc.), metals (e.g., 40 for steel, 41 for aluminum, etc.), organic material (e.g., 50 for wood, 51 for cork, 60 for cotton, 61 for jute, etc.), glass (e.g., 71 for clear glass, 72 for green glass, etc.), composites (e.g., 81 for paper/plastic as might be found in consumer packaging, disposable plates, etc., 84 for paper/cardboard/plastic/aluminum as might be found in juice boxes, gum wrappers, etc., etc.), etc.

In still another embodiment, the object metadata includes advisory information. Advisory information may, for example, describe the manner in which the registered or enrolled object should be stored and/or transported (e.g., in terms of conditions including temperature, humidity, light, vibration, object-orientation, object packing or crating, etc.), used, disposed of, etc. In a particular implementation, the advisory information describes first-aid or other treatment procedures to be taken in the event that the registered or enrolled object (or some substance associated with the object) undesirably contacts skin, eyes, etc., or is otherwise inhaled or swallowed by a person. It will further be appreciated that the advisory information may include any information required or recommended by any administrative or regulatory agency (e.g., the United States (US) Food and Drug Administration (FDA), the US Federal Trade Commission (FTC), the US Federal Communications Commission (FCC), or the like or any combination thereof) to be communicated in association with an object such as a consumer packaged good, consumer electronic device, household appliance, textile product, or the like, or any combination thereof.

In another embodiment, the object metadata includes location information describing where one or more instances of the registered or enrolled object are (or are likely to be, or have in the past been, etc.) recognized or otherwise identified, manufactured, assembled, distributed, stored, sold, bought, used, found, created, repaired, refurbished, disposed of, recycled, etc. For example, location information can be provided as one or more geographic coordinates (e.g., latitude, longitude, altitude, etc.), GPS coordinates, street addresses, etc. Location information can also be provided as one or more zones, regions or other areas around the aforementioned geographic coordinates, GPS coordinates, street addresses, etc., or otherwise associated with a country, a state/province, a city, a residential zoning district, a commercial zoning district (e.g., small-retail, large-retail, office use, lodging, etc.), an industrial zoning district (heavy manufacturing, light assembly, warehouse, etc.), a special zoning district (e.g., airport, sports complex, etc.), a climate zone, a plant hardiness zone, a geologic zone, a time zone, a proximity beacon zone (e.g., as may be associated with a Bluetooth Low Energy technology such as Apple's iBeacon or Qualcomm's Gimbal, a Wi-Fi or Bluetooth technology of the likes provided by Datzing, as may be associated with acoustic technologies such as provided by Sonic Notify, or as described in US patent application publication nos. 2012/0214515 and 2012/0214544, as may be associated with light-based technologies—also known as "Li-Fi" or "light-field communication"—such as provided by Royal Philips, ByteLight, etc.). Location information can also be provided within the context of a planogram (e.g., describing location of one or more instances of the object within a freezer unit, refrigerator unit, produce bin, etc., or otherwise held, stocked, displayed or supported by a rack, shelf, fixture, fixture section, etc., that is identified by a planogram identifier).

Location information can also be provided as one or more semantically-described locations. Semantic descriptors can describe a location in relatively broad terms (e.g., "indoors", "outdoors", "building", "road", "park", "vehicle," etc.), or can describe a location at one or more levels of specificity. For example, a "building" can be semantically described at one level of specificity as "home," "office," "restaurant", "store," "airport," etc., "vehicle" can be semantically described at one level of specificity as "truck," "car," "airplane," "train," etc., etc. A location can be further semantically described at other levels of specificity. For example, "restaurant" can be semantically described at one level of specificity as "coffee shop," "fast-food restaurant," etc., "store" can be further semantically described at another level of specificity as "bookstore," "hardware store", "grocery store," "department store," etc., etc. Further, semantic descriptors can be used to differentiate between locations that might otherwise be identically semantically described. For example, semantic descriptors such as "THE HOME DEPOT" and "LOWE'S" might be used to differentiate between two locations that could otherwise both be semantically described as "hardware store." Semantic locations can also be described to identify specific regions or landmarks associated with a semantically-described location. Likewise, semantic descriptors can be used to differentiate between different areas that are associated with the same location. For example, semantic descriptors such as "frozen-food section," "produce section," "meat section," "spice section", "cereal section," might be used to differentiate between various areas of a location semantically described as "grocery store."

In yet another embodiment, object metadata can include temporal information describing when the object was registered or enrolled, when one or more instances of the registered or enrolled object were recognized (e.g., by any suitable or desired object recognition process) or otherwise identified, manufactured, assembled, distributed, stored, sold, bought, used, repaired, found, created, refurbished, disposed of, recycled, etc. Temporal information can be provided in terms of the time of day, day of week, day of year, week of month, month of year, season, or the like or any combination thereof.

In the event that a registered or enrolled object is a manufactured object (i.e., any object produced or fabricated using physical human labor, machines, tools, chemical processing, biological processing, pharmaceutical formulation or the like or any combination thereof), object metadata can, in one embodiment, include patent information (e.g., identifying what patent(s) protect any aspect of the object), brand information (e.g., graphically or textually conveying the brand name of the object, etc.), supply chain information (e.g., identifying the name and/or contact information of one or more entities such as raw materials supplier(s), material processor(s), manufacturer(s), artist(s), sculptor(s), assembler(s), distributor(s), wholesaler(s), retail seller(s), etc., involved in the manufacture of the manufactured object), and reverse logistics information (e.g., identifying the name and/or contact information of any entity involved in one or more activities such as repair, refurbishment, recycling, disposal, etc., of the manufactured product).

Relatedly, the object metadata can include accountability information (e.g., describing environmental, social and/or economic costs and/or benefits) associated with a manufactured object. Such accountability information can be provided in accordance with such standards or guidelines as those promulgated by the International Organization for Standardization (e.g., ISO 26000, 14001, 14020-14025, TC 207, etc.), U.S. Department of Energy and/or the U.S. Environmental Protection Agency (e.g., EnergyStar, EnergyGuide, Corporate Average Fuel Economy (CAFE), National Ambient Air Quality Standards, etc.), the California Air Resources Board, EU Ecolabel, the Marine Stewardship Council, Friend of the Sea, the Programme for the Endorsement of Forest Certification, the Forest Stewardship Council, the Sustainable Forestry Initiative, the Malaysian Timber Certification System, the Carbon Trust, Carbon Counted, etc., etc.

In one embodiment, the object metadata includes sound information describing sounds that are (or have been, or are likely to be) associated with the registered or enrolled object (or that are, have been, or are likely to be associated with, one or more instances of the registered or enrolled object). Sounds may be associated with an object if they are (or have been, or are likely to be) present within an environment described by any of the aforementioned location information, if they emanate from the object, if they are (or have been, or are likely to be) uttered by any person having any relationship with the object (e.g., as a seller, a buyer, a user, a shopper, a mover, an inspector, etc,). Thus, sounds that may be associated with an object can include music, sound effects, voices, speech, bird calls, street traffic, automobile horns, dogs barking, cats meowing, boxes of cereal rattling, bags of potato chips being crumpled, air passing through an HVAC vent, wine glasses clinking, digitally-encoded audio signals (e.g., as described in U.S. patent application Ser. Nos. 14/054,492 and 13/841,727 and in U.S. Provisional App. No. 61/714,019), or the like or any combination thereof.

Sounds that may be associated with an object include one or more sounds, of any suitable duration (e.g., ranging from a fraction of a section to a minute or longer), that are characterized by at least one frequency within the typical range of human hearing—about 20 Hz to 20 kHz, by at least one frequency in the ultrasonic range—above about 20 kHz, or the like or any combination thereof). Generally, sound information is based on sound captured with one or more microphones of any type. Upon sound capture, the microphone(s) generate corresponding electrical audio signals representing the captured sound. The electrical audio signals may be stored as in an audio file of any suitable uncompressed format, lossy compressed format and/or lossless compressed format. In another embodiment, the electrical audio signals or the audio file may be processed by any suitable technique (e.g., which may involve sampling, filtering, enhancement, compression, perceptual analysis, speech recognition, voice recognition, feature extraction, classification, or the like or any combination thereof) to generate an acoustic signature, acoustic fingerprint, spectrogram, text, or any other acoustic representation of the captured sound.

Optionally, processing can include classifying the acoustic representation using any suitable manual and/or computer-based acoustic classification technique. Thus, an acoustic representation may be classified as belonging to one or more sets, each identified by a corresponding acoustic class identifier. Examples of class identifiers can include "music" "classical music," "jazz music," "dubstep," "human," "voice," "speech," "animal," "dog," "cat," "growl," "vehicle," "bicycle," "car," "engine," "road noise," "horn," "air brake," "restaurant," "shopping cart," "espresso machine," "airport," "bus station," "taxi," etc. Accordingly, sound information may be provided as an audio file, an acoustic representation, an acoustic class identifier, or the like or any combination thereof. In one embodiment, sound information associated with an object can be obtained by capturing one or more sounds actually emanating within the environment that the object is (or has been, or is likely to be) located, by capturing one or more sounds as they actually emanate from the object, by capturing one or more utterances made by a person (or representative of such a person) who has (or has had, or is likely to have) some relationship with the object, etc. In another embodiment, sound information associated with an object can be obtained by processing pre-recorded sounds or otherwise obtaining pre-processed acoustic representations of sounds (e.g., from one or more online sound content repositories such as SoundSnap.com, SoundDogs.com, Freesound.com, etc., music companies, or other suitable content repositories).

The object metadata associated with a particular registered or enrolled object can also include related object information identifying (e.g., by one or more items of object identifying information) any other object that is (or is likely to be, or has in the past been, etc.) related to the particular registered or enrolled object. In one example, an object is related to another object if the both objects were recognized or otherwise identified (e.g., by any suitable object recognition process), manufactured, assembled, distributed, stored, sold, bought, used, found, created, repaired, refurbished, disposed of, recycled, etc., within the same vehicle, store, facility, freezer or refrigerator unit, etc., or held, stocked, displayed or otherwise supported by the same rack, shelf, shelf section (e.g., comprised of a plurality of vertically-disposed shelves), or the like or any combination thereof. In another example, two objects are related if they were both recognized or otherwise identified, manufactured, assembled, distributed, stored, sold, bought, used, found, created, repaired, refurbished, disposed of, recycled, etc., within the same month, week, day, hour, half-hour, minute, etc. In yet another example, two objects can also be related if they were both recognized or otherwise identified, manufactured, assembled, distributed, stored, sold, bought, used, found, created, repaired, refurbished, disposed of, recycled, etc., by the same entity.

Other examples of object metadata that may be associated with a registered or enrolled object can include pricing information (e.g., a manufacturer's suggested retail price, a list price, a recommended retail prices, etc.) associated with an object, or any other information (e.g., including information described in US Patent App. Pub. Nos. 20110212717, 20110161076, 20120134548, and application Ser. No. 14/152,925 (filed Jan. 10, 2014).

Generally, at least some object metadata is generated in conjunction with the registration or enrollment process and stored in association with the registered or enrolled object. Of course, any object metadata may be stored in association with the registered or enrolled object at any time after the registration or enrollment process. In this event, within the database, such object metadata may be further associated with a timestamp or other identifier indicating when the object metadata was associated with the registered or enrolled object.

In one embodiment, the entity from which the object metadata is obtained (i.e., a "metadata sponsor") is the entity that initiated the object registration or enrollment process. In other embodiments, the metadata sponsor is not the entity that initiated the object registration or enrollment process. It will be appreciated that metadata sponsors can include any of the aforementioned entities, as well as other entities such as advertisers, event promoters, marketers, etc., associated with a registered or enrolled object. In one particular implementation in which a registered or enrolled object is a manufactured object, the metadata sponsor may be any of the entities mentioned above in connection with the supply chain information, reverse logistics information, and accountability information. In other particular implementations, metadata sponsors may include the Audubon Society (e.g., providing object metadata relating to objects such as birds, etc.), the Mineralogical Society of America (e.g., providing object metadata relating to objects such as gems or minerals, etc.), the Geological Society of America (e.g., providing object metadata relating to objects such as geological formations, etc.), the U.S. National Park Service (e.g., providing object metadata relating to objects identified as "National Historic Landmarks", etc.), etc. If information transparency is desired, then the identity of the metadata sponsor, or the identity of the entity on whose behalf the object metadata was provided, may also be stored within the database in association with the proffered object metadata.

In one embodiment, object metadata may be provided by the user (e.g., via user engagement with any suitable interface associated with the user device) or may otherwise be obtained from the user device. User-provided object metadata can, for example, include location information (in this case, also referred to herein as "sampled location information") describing a location of the user device when the object-of-interest was sampled. The location of the user device can be determined or otherwise obtained based on information obtained from a GPS module associated with the user device, based on sensed or captured information from beacons (e.g., of any variety employing any of the aforementioned Bluetooth, Wi-Fi, Bluetooth Low Energy, acoustic, or light-based technologies supported by the user device), based on information provided by an inertial navigation system associated with the user device (e.g., including one or more accelerometers, magnetometers, gyroscopes, etc.), or the like or any combination thereof. User-provided object metadata can also include temporal information (in this case, also referred to herein as "sampled temporal information") describing when the object-of-interest was sampled). User-provided object metadata can also include sound information (in this case, also referred to herein as "sampled sound information") describing sound(s) captured (e.g., by one or more microphones associated with the user device) when the object-of-interest was sampled, or the like or any combination thereof. The sampled sound information may be provided as an audio file, an acoustic representation, an acoustic class identifier, or the like or any combination thereof.

In one embodiment, user-provided object metadata includes user identification information. User identification information can identify the user in terms of a unique identifier, a group identifier, or the like or any combination thereof. Examples of unique identifiers include a device identification number associated with the user device, a phone number or an email address associated with the user, an account identifier associated with the user or the user device, etc. A group identifier identifies a group of users having one or more characteristics in common. Examples of characteristics include demographic characteristics (e.g., gender, age, ethnicity, primary language, political affiliation, occupation, location of residence, etc.), consumer characteristics (e.g., including information indicating which stores or websites— or types thereof—from which the user purchases goods or services, indicating one or more factors such as time, environment, cost, and the like, that influence the user's purchasing decisions, etc.), lifestyle characteristics (e.g., including information describing media (including music, videos, games, television shows, movies, web-pages, etc., or types thereof) that the user listens to, watches, reads, etc., information describing venues (including recreation destinations, nightlife locations, sports and entertainment venues, museums, amusement parks, tourist destinations, etc., or types thereof) that the user visits, or the like or any combination thereof. In one embodiment, group identifiers assigned to a user are selected by the user (e.g., via user engagement with any suitable interface associated with the user device). In another embodiment, group identifiers assigned to a user are inferred based on locations the user travels to, objects the user samples, activities the user engages in, etc. In one embodiment, any group identifier can be "active" at all times. As used herein, an "active" group identifier is used to facilitate segmentation, filtering or other partitioning of the object registry. In another embodiment, a group identifier is only active when the user device is present at a location corresponding to the one or more of the user's characteristics, when an event associated with one or more of the user's characteristics is happening, etc.

In another embodiment, user-provided object metadata can include device orientation information that describes an orientation of the user device (e.g., in terms of azimuth angle, elevation angle, etc., which may be measured relative to some reference coordinate system such as the geographic coordinate system, or the like) when the object-of-interest was sampled. In a particular implementation, the device orientation information describes an orientation of an axis of a field of view associated with a camera or other sensor of the user device. Device orientation information can be obtained using any suitably-equipped user device (e.g., a smartphone having one or more sensors such as a 1-, 2- or 3-axis accelerometer, a 1-, 2- or 3-axis gyroscope, 1-, 2- or 3-axis accelerometer, a 1-, 2- or 3-axis magnetometer, etc., and supporting functionality provided by an instrument such as a theodolite, e.g., of the likes provided by the Theodolite application by Hunter Research & Technology, LLC).

In one embodiment, user-provided object metadata such as sampled location information, sampled temporal information, device orientation information, etc., may be automatically recorded, generated, transmitted or otherwise made accessible to an object recognition process (e.g., whenever an object-of-interest is sampled, whenever query data is made accessible to perform an object-recognition process, etc.). In another embodiment, user-provided object metadata such as object identifying information is manually recorded, generated, transmitted or otherwise made accessible to an object recognition process (e.g., via user engagement with any suitable interface associated with the user device, etc.). User-provided object metadata can be stored on the user device, on a remotely located server, within the object registry, or the like or any combination thereof. It will be appreciated that user-provided object metadata can include any other suitable or desired information (e.g., describing what the user thinks of the object, describing what questions the user may have in connection with the recognized object, describing any other aspect of the user's relationship with the instance of the recognized object, etc.), or the like. Such other information can be provided by the user (e.g., via user engagement with any suitable interface such as a touchscreen keypad associated with the user device, etc.).

As will be appreciated, the object registry can contain a potentially vast multitude of registered or enrolled objects. To facilitate activities such as searching, data mining, information retrieval within the object registry, etc., it may be desirable to organize records stored within the object registry according to one or more suitable supervised learning techniques (also known as "classification" techniques), one or more suitable so-called "semi-supervised" learning techniques, one or more suitable unsupervised learning techniques (also known as "clustering" techniques), one or more deep learning techniques, or the like or any combination thereof. Accordingly, object metadata associated with any particular registered or enrolled object can include "similar object information" identifying which other registered or enrolled object(s) is/are sufficiently "similar" to the particular object. A similarity determination can be based upon a comparison of one or more items of any object metadata associated with a particular object with corresponding object metadata item(s) associated with any other registered or enrolled object.

More on Generation and Processing of Query Data to Support Object Matching or Recognition An object can be empirically sampled in any suitable manner to generate the aforementioned query data. In embodiments described above, query data is generated (and, thus, an object is sampled) upon the capture of imagery (e.g., as one or more still pictures, a video clip, etc.) of an object-of-interest. As used herein, an "object-of-interest" corresponds to whatever object is predominantly represented by the query data, whatever object is located at the center (or within some other predetermined area) of the field of view of the captured imagery, whatever object remains within the field of view of the captured imagery for the longest duration (or other predetermined amount of time), whatever object is most in-focus and/or is most in-focus for the longest duration (or other predetermined amount of time), or the like or any combination thereof.

Imagery may be captured using a "high end LED-enhanced camera" (e.g., a camera as described in U.S. patent application Ser. Nos. 13/840,451 and 14/201,852) or any other a multi- or hyper-spectral camera (e.g., when sampling sophisticated high-worth objects), or any other suitable camera (e.g., a digital camera as may be found in a smartphone or other wearable electronic device such as Google Glass, etc.) to sample everyday objects such as product packages (or to sample any desired object). Imagery captured by the above-described cameras will typically contain imagery of an exterior surface of the object. It will be appreciated, however, that the imagery captured can be of the interior of the object using terahertz sensors (e.g., as present in terahertz cameras such as those manufactured by Traycer Systems, Inc. and NEC Corporation, as described in Kaushik Sengupta, Ali Hajimiri, "A 0.28 THz 4×4 power-generation and beam-steering array,"

Solid-State Circuits Conference Digest of Technical Papers (ISSCC), 2012 IEEE International, etc.).

In other embodiments, an object can be sampled (and, thus, query data can be generated) by capturing other data characterizing the exterior structure of the object. Such structural data (e.g., characterizing an exterior surface of the object) may be captured using a camera such as a time-of-flight camera, a plenoptic camera, a stereoscopic camera system (e.g., such as the TCM9518MD manufactured by Toshiba, or as incorporated within the HTC One M8 smartphone, etc.), etc., using 3D sensor systems such as those used in the Microsoft Kinect sensor system (as well as other technologies developed by PrimeSense), in the Structure Sensor developed by Occipital, Inc., in the 3D vision system associated with Google's "Project Tango", or the like or any combination thereof. It will be appreciated that an object may be sampled by contemporaneously capturing both imagery and structural data. It will further be appreciated that structural data (whether captured from one or multiple viewpoints) can be processed by known techniques to effectively separate the sampled object from its surroundings.

Typically the capture of imagery/or and structural data (and, thus, the generation of query data) is performed by a user device, suitably equipped with one or more of the aforementioned cameras and/or 3D sensors. (Query data generated by a user device is also referred to herein as "user device query data.") However, query data can also be generated by one or more suitably-equipped ambient devices (i.e., devices other than the user device) disposed within an environment (i.e., an indoor environment, an outdoor environment, or the like or any combination thereof) surrounding an object-of-interest and each having a field of view that encompasses the object-of-interest.

Exemplary ambient devices include cameras or other sensors may be placed or otherwise disposed in or on (or mounted to) one or more suitable structures such as floors, walls, ceilings, poles, shelves, retail product displays, desks, benches, kiosks, lamp-posts, cell-phone towers, street lights, etc. Ambient devices may have a fixed view, or may be provided with any suitable pan, tilt, and/or zoom capability. Examples of ambient devices may include cameras or other sensors of the likes found in retail stores, casinos, amusement parks, etc., cameras installed in ATM machines, traffic cameras, red-light cameras, etc. In the event that fields of view of multiple ambient devices overlap, imagery captured by the ambient devices can be processed in any suitable or desirable manner (e.g., as described in any of U.S. Pat. Nos. 8,160,400 and 8,483,510, US Patent App. Pub. No 2009/0192921, U.S. patent application Ser. No. 14/218,660) to generate merged, stitched and/or panoramic imagery of the object-of-interest and/or the environment surrounding the object-of-interest. In one embodiment, the processing can be performed (e.g., using any suitable superresolution technique) such that the resolution of the resultant imagery is higher than that captured by a single ambient device.

Query data output by an ambient device (also referred to herein as "ambient device query data") can also include ambient device identifying information (e.g., a unit identifier identifying the ambient device). Similar to the inclusion of user-provided object metadata within user device query data, ambient device query data can also include object metadata such as sampled location information (in this case, describing a location of the ambient device when ambient device query data was generated), device orientation information (in this case, describing an orientation of the ambient device when ambient device query data was generated), sampled sound information (in this case, describing sound(s) captured by one or more microphones disposed at a location associated with the sampling ambient device and/or describing sound(s) captured by one or more microphones having a sensing range that overlaps with a field of view of the sampling ambient device; and, optionally, describing sound(s) when the ambient device query data was generated), sampled temporal information, etc. Further, similar to user identification information, the ambient device identifying information can also be associated, as object metadata, with objects within the surrounding environment that can be (or have previously been) sampled by an ambient device identified thereby.

In one embodiment, one or more ambient devices can be controlled to generate query data associated with an object-of-interest in response to a signal (also referred to herein as an "initiation signal") transmitted by a signaling device worn or otherwise carried by the user. In this case, the initiation signal represents a request to initiate an object recognition process or session. The initiation signal may be transmitted (e.g., automatically) in response to the generation of user device query data, or may be transmitted absent generation of any user device query data. Generally, the initiation signal includes certain of the user identification information (e.g., the device identification number of the user's device, a phone number associated with the user or the user device, an email address associated with the user, an account identifier associated with the user or the user device, or the like or any combination thereof). Results of an object recognition process or session can then be returned to the user (or otherwise made accessible to the user) based on the user identification information.

The signaling device may be provided with one or more LED torches, lamps, lights, etc., RF antennas, loudspeakers, or the like or any combination thereof to generate and transmit any suitable initiation signal (e.g., as one or more visible- or infrared-light signals, radio-frequency signals as may be used in communication technologies such as WiFi, Bluetooth, Bluetooth low energy, etc., audible or ultrasonic sound signals, or the like or any combination thereof). In one embodiment, the signaling device is structurally or functionally incorporated or embedded within the user device. In such an embodiment, the initiation signal can include any generated query data, as well as any of the aforementioned user-provided object metadata. In another embodiment, however, the signaling device not the user device (i.e., is incapable of generating query data) and, optionally, includes a GPS module or one or more other technologies enabling it to determine or otherwise obtain its location (e.g., based on information from any of a variety of beacon technologies as discussed above, based on information provided by an inertial navigation system associated with the user device, based on information provided by one or more ambient devices, one or more ambient sensors, or the like or any combination thereof). In this embodiment, the signaling device may, or may not, be communicatively coupled to the user device.

One or more ambient sensors (e.g., including any suitable camera, 3D sensor system, RF antenna, microphone, MEMs pressure sensor, acoustic vector sensor, or the like, or any array or other combination thereof) may be provided within the environment surrounding the object-of-interest to capture initiation signals and output electrical signals corresponding to the captured initiation signals as ambient sensor data. Ambient sensors may be placed or otherwise disposed in or on (or mounted to) one or more suitable structures such as floors, walls, ceilings, poles, shelves, retail product displays, desks, benches, kiosks, lamp-posts, cell-phone towers, street lights, etc. Insofar as an ambient device can include any suitable camera or 3D sensor system, it will be appreciated that an ambient device may also function as the above-described ambient sensor (e.g., to capture initiation signals and output the same in the generated ambient device query data).

Ambient sensor data output by each ambient sensor can also include sensor identifying information (e.g., a unit identifier identifying the ambient sensor). Sensor identifying information and ambient device identifying information may be stored in a table or other data structure conveyed by a tangible media such as semiconductor memory such (e.g., a volatile memory SRAM, DRAM, or the like or any combination thereof, a non-volatile memory such as PROM, EPROM, EEPROM, NVRAM (also known as "flash memory"), or the like or any combination thereof), magnetic memory (e.g., a floppy disk, hard-disk drive, magnetic tape, etc.), optical memory (e.g., CD-ROM, CD-R, CD-RW, DVD, Holographic Versatile Disk (HVD), Layer-Selection-Type Recordable Optical Disk (LS-R), or the like or any combination thereof), or any similar component or any combination thereof.

In one embodiment, the location (e.g., an absolute location, a relative location, or the like or any combination thereof) of each ambient sensor, and of each ambient device, can also be entered into and stored within the data structure (e.g., in association with the corresponding sensor and ambient device identifying information) by any suitable technique. Similarly, the location and extent within the environment of the field of view for the ambient devices may also be entered and stored within the data structure (e.g., in association with the corresponding ambient device identifying information) by any suitable technique. Likewise, the location and extent within the environment of the sensing range for any ambient sensor may be entered and stored within the data structure (e.g., in association with the corresponding sensor identifying information) by any suitable technique.

It will be appreciated that, in addition to capturing imagery and/or structural data associated with an object-of-interest, ambient devices can also capture imagery and/or structural data associated with the environment surrounding the object-of-interest. Insofar as an ambient sensor can include any suitable camera or 3D sensor system, it will be appreciated that an ambient sensor can also capture imagery and/or structural data associated with the environment surrounding the object-of-interest. Such data generated by ambient devices and/or ambient sensors can be processed (e.g., by a computer associated with one or more of the ambient devices and/or ambient sensors) using any suitable technique to generate a model (e.g., a 3D model) of the environment surrounding the object-of-interest, which may include one or more objects other than the object-of-interest. Further, information describing the location and extent of the various fields of view and/or sensing ranges of ambient devices and/or ambient sensors can be used facilitate generation of such a model.

In the embodiments described herein, an object-of-interest is identified by processing the ambient sensor data and/or ambient device query data at a first computer communicatively coupled to the ambient sensors and/or ambient devices (e.g., via wired or wireless technology). In other embodiments, however, the identification processing can be partially or completely performed by one or more computers other than the first computer, but that are nevertheless communicatively coupled to the first computer, to the ambient devices and/or to the ambient sensors via any suitable wired and/or wireless technologies. Examples of such other computers include a computer physically located within or otherwise proximate to the environment surrounding the object-of-interest, a computer located remotely relative to the environment surrounding the object-of-interest, a computer or other processor (e.g., image signal processor, graphics processing unit, etc.) associated with or otherwise incorporated or embedded within the user device, or the like or any combination thereof.

Provided as described above, the aforementioned ambient device(s), ambient sensor(s) and computer(s) can be considered to constitute at least part of an "ambient object recognition infrastructure", which can assist a user in performing object recognition or matching processes with respect to objects the user encounters in indoor or outdoor environments, such as retail stores (e.g., grocery stores, consumer electronics stores, department stores, clothing stores, craft stores, hardware stores, etc.), airports, zoos, amusement parks, casinos, hotels, flea markets, exhibitions, etc. Some exemplary embodiments and scenarios in which the ambient object recognition infrastructure can facilitate the generation of query data will now be discussed in greater detail below.

A process for identifying an object-of-interest within ambient device query data can begin with the monitoring of sensor data and/or ambient device query data (e.g., at the first computer) to determine whether an initiation signal has been transmitted. Upon determining that an initiation signal has been transmitted, the sensor data and/or ambient device query data is processed (e.g., at the first computer) to identify an object that the user has indicated as the object-of-interest. A user may indicate an object as an object-of-interest in many ways.

In one embodiment, a user indicates that an object is an object-of-interest by generating user-device query data representing at least a portion of the object-of-interest. In this embodiment, the initiation signal can include sampled location information and/or device orientation information. The first computer can then extract the sampled location information and/or device orientation information from the transmitted initiation signal and use the extracted information (e.g., by reference to the aforementioned data structure and/or model of the surrounding environment) to identify which ambient device(s) have a field of view that encompasses the location described by the sampled location information and/or that overlaps with an estimated field of view captured within the user-device query data. If any ambient device is identified, then the query data generated by that identified ambient device is processed to identify or otherwise discern the object-of-interest indicated by the user device query data. If multiple ambient devices are identified, then the query data generated by those multiple identified ambient devices can be further processed to generate a merged, stitched and/or panoramic representation of the indicated object-of-interest.

In another embodiment, a user indicates that an object is an object-of-interest by making a gesture (e.g., by pointing to the object-of-interest, by touching the object-of-interest, etc.). In this embodiment, the initiation signal can include sampled location information. The first computer can then extract the sampled location information from the transmitted initiation signal and use the extracted information (e.g., by reference to the aforementioned data structure and/or model of the surrounding environment) to identify which ambient device(s) have a field of view that encompasses the location described by the sampled location information. If any ambient device is identified, then the query data generated by that identified ambient device is processed to identify or otherwise discern the user's gesture. The discerned gesture is then used (e.g., by reference to the aforementioned data structure and/or model of the surrounding environment) to identify which ambient device(s) have a field of view containing an object indicated by the discerned gesture as the object-of-interest. If multiple ambient devices are identified, then the query data generated by those multiple identified ambient devices can be further processed to generate a merged, stitched and/or panoramic representation of the indicated object-of-interest.

In another embodiment, a user indicates that an object is an object-of-interest by projecting a beam of coherent or incoherent, focused or unfocused, visible or IR light (which may, optionally, be flickered on and off, e.g., as discussed in US patent publication 20130195273, or otherwise structured, so as to form the initiation signal or other coded signal) from the signaling device onto the object-of-interest. In this embodiment, the initiation signal can include the projected beam and/or a portion of the projected beam that is reflected from the object-of-interest. The first computer can then process ambient device query data generated by the ambient devices to identify which ambient device(s) have a field of view that contains the reflected light. If any ambient device is identified, then the query data generated by that identified ambient device is processed to identify or otherwise discern the object-of-interest reflecting the projected beam of light. Optionally, query data generated by the identified ambient device(s) can be processed to estimate (e.g., by reference to the aforementioned data structure and/or model of the surrounding environment) the location of the reflected light and/or the object-of-interest reflecting the projected light beam. Thereafter, and by reference to the aforementioned data structure and/or model of the surrounding environment) any additional ambient device(s) having a field of view containing object-of-interest reflecting the projected light beam. If any additional ambient device is identified, then the query data generated by that additional identified ambient device can be processed to identify or otherwise discern the object-of-interest reflecting the projected beam of light. Ultimately, if multiple ambient devices are identified, then the query data generated by those multiple identified ambient devices can be further processed to generate a merged, stitched and/or panoramic representation of the indicated object-of-interest.

In another embodiment, a user indicates that an object is an object-of-interest by placing the signaling device on or near the object of interest while the initiation signal is emitted, or the like or any combination thereof. In this embodiment, the initiation signal can include a light-based signal (e.g., a visible- or infrared-light signal), a radio-frequency signal (e.g., as may be used in communication technologies such as WiFi, Bluetooth, Bluetooth low energy, etc.), an acoustic signal (e.g., an audible acoustic signal, an ultrasonic acoustic signal, etc.), or the like or any combination thereof. The first computer can then process (e.g., by any suitable technique) ambient device query data generated by the ambient devices and/or the ambient sensor data generated by the ambient sensors to determine, or otherwise estimate a location of the initiation signal source (i.e., the signaling device). Thereafter, the determined location can be used (e.g., by reference to the aforementioned data structure and/or model of the surrounding environment) to identify which ambient device(s) have a field of view that encompasses the determined location of the source of the initiation signal. If any ambient device is identified, then the query data generated by that identified ambient device is processed to determine or estimate, as the identified object-of-interest, an object that is closest to the determined location of the initiation signal source. Optionally, identification of the object-of-interest can be facilitated by processing the query data generated by the identified ambient device(s) with reference to the aforementioned data structure and/or model of the surrounding environment. As with the other embodiments, if multiple ambient devices are identified as having fields of view that contain the object-of-interest, then the query data generated by those multiple identified ambient devices can be further processed to generate a merged, stitched and/or panoramic representation of the indicated object-of-interest.

After identifying an object-of-interest within ambient device query data as described above, an object matching or recognition process can thereafter be performed (e.g., in any manner as exemplarily described herein, or in any other suitable manner). In the event that user device query data representing the object-of-interest is also generated, then the object matching or recognition process can be performed based on the ambient device query data and the user device query data. Optionally, user device query data and ambient device query data representing the user-indicated object-of-interest can be processed to generate a merged, stitched and/or panoramic representation of the object-of-interest, and an object matching or recognition process can be performed based on the merged, stitched and/or panoramic representation of the object-of-interest.

Search Space Reduction

Numerous object recognition techniques, including those described above, can be generally characterized as involving the processing of query data to discern one or more aspects associated with an object-of-interest and thereafter querying an object registry containing information regarding a (potentially vast) multitude of registered or enrolled objects, all in an effort to identify which of the registered/enrolled objects most closely matches the discerned aspects. In some embodiments of the present technology, the total number of records to be searched in an object recognition process can be reduced by reference to one or more items auxiliary information. Such auxiliary information can thus be used to filter out records stored within the object registry that would otherwise represent an invalid or unlikely candidate match. Accordingly, search space reduction techniques using auxiliary information can be employed to identify a sub-set of candidate signatures on which a subsequent object recognition process (or stage or phase thereof) can operation (e.g., similar to preliminary sub-set of candidate signatures discussed above with respect to Stage 1 filtering). It will be appreciated that search space reduction based on auxiliary information can be applied at any suitable or desired stage or phase of any of the object recognition processes described herein, or may be practiced in conjunction with any other desired or suitable object recognition process. Moreover, depending on the extent to which a search space is reduced, the search space reduction techniques described herein may obviate the need to perform conventional object recognition processes such as those described and mentioned herein.

In one embodiment, auxiliary information includes any of the aforementioned object metadata. In another embodiment, auxiliary information includes information that is derived from query data (in this case, the aforementioned I-features can be broadly considered as auxiliary information). In another embodiment, auxiliary information includes information other than the query data, which is generated, derived, sensed, or otherwise captured (e.g., by the user device) upon the sampling of an object-of-interest by a user device. In another embodiment, auxiliary information includes information other than the query data, which is generated, derived, sensed, or otherwise captured (e.g., by an ambient device, an ambient sensor, or the like or any combination thereof) upon the sampling of an object-of-interest by one or more ambient devices.

In one embodiment, the auxiliary information includes sampled location information. The object registry is then queried to identify stored records associated with location information that corresponds to the sampled location information. These identified records define the search space within which a subsequent object recognition process is to be performed. For example, the device location may indicate that the user device is located within a grocery store. The object registry, which may contain stored records associated with bookstores, hardware stores, grocery stores, and department stores, (and/or locations thereof) may be filtered to identify only records that are associated with grocery stores. A subsequent object recognition process may then be performed based on the identified records. In another example, the device location may indicate that the user device is located within the frozen-food section of a grocery store. The object registry, which may contain stored records associated with frozen-food sections, produce sections, meat sections, spice sections, cereal sections, (and/or locations thereof) may be filtered to identify only records that are associated with frozen-food sections, and an object recognition process may then be performed based on the identified records. In yet another example, the device location may indicate that the user device is located within a particular grocery store chain (or within a particular grocery store). The object registry, which may contain stored records associated with different national, regional and/or local grocery store chains (or associated with different particular grocery stores) may be filtered to identify only records that are associated with the particular grocery store chain (or that are associated only with the particular grocery store), and an object recognition process may then be performed based on the identified records.

In another embodiment, the auxiliary information includes location information representing a prediction or estimate of where the user device will be. In one example implementation, the location of the user device can be tracked (e.g., based on information obtained from a GPS module associated with the user device, based on information from any of a variety of beacon technologies as discussed above, based on information provided by an inertial navigation system associated with the user device, based on information provided by one or more ambient devices, one or more ambient sensors, or the like or any combination thereof), and an intended path along which the user device might travel can be estimated based on a history of one or more of the tracked locations. The location of the user device can be tracked over a time period which can be initiated or ended in any suitable or desired manner (e.g., upon user engagement with the user device, upon arrival of the user device at a particular location, upon departure of the user device from a particular location, upon entry of the user device into a zone, upon exit of the user device from a zone, etc.). In another example implementation, a predefined path of intended travel may be generated (e.g., via user engagement with a navigational application supported by the user device to plan a route of travel through an environment, etc.). Once a path is estimated, generated or otherwise obtained, the object registry is queried to identify stored records associated with location information corresponding to a location or range or locations along the path of travel. These identified records define the search space within which a subsequent object recognition process is to be performed, as discussed above.

In another embodiment, the auxiliary information includes user identification information (e.g., including a unique identifier, a group identifier, or the like or any combination thereof), ambient device identifying information, or any combination thereof. The object registry is then queried to identify stored records associated with corresponding user identification information and/or ambient device identifying information. These identified records define the search space within which a subsequent object recognition process is to be performed.

In another embodiment, the auxiliary information includes sampled device orientation information. The object registry is then queried to identify stored records associated with device orientation information that corresponds to the sampled device orientation. These identified records define the search space within which a subsequent object recognition process is to be performed.

In another embodiment, the auxiliary information includes sampled sound information. In the event that the sampled sound information includes an audio file, the audio file can be processed (e.g., at a computer remotely located from the user device, etc.) to obtain one or more acoustic representations or acoustic class identifiers that can facilitate query of the object registry. The object registry is then queried to identify stored records associated with sound information that corresponds to the sampled sound information (or that correspond to any acoustic representations or acoustic class identifiers derived from an audio file associated with the sampled sound information). These identified records define the search space within which a subsequent object recognition process is to be performed. In a related embodiment, the auxiliary information includes sampled sound information describing speech (e.g., uttered by the user) when the object-of-interest was sampled. In such an embodiment, the sampled sound information can be processed (e.g., at the user device or at a remote computer communicatively coupled to the user device) according to any suitable speech processing technique to determine whether the sound information contains speech and, thereafter, attempt to parse the uttered speech. The object registry can then be queried to identify stored records associated with any object metadata (e.g., object identifying information, object location information, related object information, etc.) that corresponds to the speech discerned and parsed from the sampled sound information. These identified records define the search space within which a subsequent object recognition process is to be performed.

In another embodiment, the auxiliary information includes location information representing a prediction or estimate of where the user device currently is (or might in the future be) based upon location information associated with one or more objects that were previously recognized (e.g., according to any object recognition process). As used herein, a "previously recognized object" can, optionally, refer to an object that was recognized (according to any object recognition process) during a prior time period. The prior time period can be initiated or ended in any suitable or desired manner (e.g., upon user engagement with the user device, upon arrival of the user device at a particular location, upon departure of the user device from a particular location, upon entry of the user device into a zone, upon exit of the user device from a zone, etc.). Location information associated with each previously recognized object can be determined (e.g., by reference to the object registry). Thus, the determined location information describes the location of the previously-recognized objects during the prior time period. Thereafter, the object registry is queried to identify any other stored record(s) associated with location information describing a location that is the same as, adjacent to, or otherwise corresponds to location(s) of the previously-recognized objects. These identified record(s) define the search space within which a subsequent object recognition process can be performed.

In another embodiment, the auxiliary information includes object identification information representing a prediction or estimate of what object(s) might be sampled based upon related object information (or similar object information) associated with one or more previously-recognized objects. Related object information (or similar object information) associated with each previously-recognized object can be determined (e.g., by reference to the object registry). Thereafter, the object registry is queried to identify any stored record(s) associated with object identifying information that, in turn, is described by the related object information (or similar object information) associated with the previously recognized objects. These identified record(s) define the search space within which a subsequent object recognition process can be performed.

In another embodiment, the auxiliary information includes information derived by processing (e.g., at the user device or at a remote computer communicatively coupled to the user device) portions of the query data that do not represent the aforementioned object-of-interest. In one implementation, the query data is processed to identify one or more objects surrounding the object-of-interest and perform an object recognition process on the identified objects. In this case, the object recognition process could be performed at a higher level of abstraction than the object recognition process that would typically be performed to recognize the object-of-interest. For example, the query data would be processed to estimate whether an identified surrounding object was a tree (as opposed to determining the genus or species of the tree), to estimate whether an identified surrounding object was a car (as opposed to determining the make or model of the car), etc. In another implementation, the query data is processed to estimate a spatial relationship between an identified surrounding object and the object-of-interest and/or estimate a spatial relationship between different identified surrounding objects. In another implementation, the query data is processed to estimate a size of the identified surrounding object relative to the object-of-interest. In another implementation, the query data is processed to estimate any colors, textures, shapes, etc., associated with the identified surrounding object. In another implementation, the query data is processed to discern the presence of visual indicia as described above. The object registry may then be queried to identify any stored record(s) associated with object identifying information, location information, descriptive information, related object information, similar object information, etc., that corresponds to the aforementioned auxiliary information that was discerned, estimated or otherwise recognized by any suitable technique. These identified records define the search space within which a subsequent object recognition process is to be performed. For example, the query data may be processed as described above to whether any of the auxiliary information indicates that the field of view captured by the query data represents a planogram (or portion thereof) (e.g., with the object-of-interest located in the center of field of view). In this example, the object registry may be queried to ascertain any object metadata associated with the object-of-interest based upon (e the object-data may be is a store shelf containing a retail items, with the object-of-interest arranged in the middle of the captured field of view.

In another embodiment, the auxiliary information includes information derived by processing (e.g., at the user device or at a remote computer communicatively coupled to the user device) portions of the query data that represent the object-of-interest. Similar to the embodiment discussed above, the query data can be processed to estimate a size of the object-of-interest, any colors, textures, shapes, etc., associated with the object-of-interest, or any of the aforementioned visual indicia associated with the object-of-interest. The object registry may then be queried to identify any stored record(s) associated with object identifying information, location information, descriptive information, related object information, similar object information, etc., that corresponds to the aforementioned auxiliary information that was discerned, estimated or otherwise recognized by any suitable technique.

In another embodiment, the auxiliary information includes information derived by processing (e.g., at the user device or at a remote computer communicatively coupled to the user device) the query data to estimate ambient lighting conditions within the environment surrounding the object-of-interest. Based on the estimated lighting conditions, object metadata such as location information (e.g., describing an estimate as to whether the object-of-interest is located indoors, outdoors, etc.) and/or temporal information (e.g., describing an estimate as to what time of day the object-of-interest was sampled) may be estimated (e.g., at the user device or at a remote computer communicatively coupled to the user device). The object registry may then be queried to identify any stored record(s) associated with location information and temporal information that corresponds to the aforementioned estimated information. These identified records define the search space within which a subsequent object recognition process is to be performed.

Hybrid P-Features

P-features have been described above as profile features of an object (whether an object-of-interest or an object that has been registered or otherwise enrolled), each of which is a function of both the physical extent of the object and the particular viewpoint onto the object. The aforementioned P-features can be used to identify a set of candidate matches in an object-recognition process. As will be discussed in greater detail below, the generation of P-features can be modified somewhat to derive one or more hybrid P-features associated with an object (whether an object-of-interest or an object that has been registered or otherwise enrolled), which can be used to facilitate search space reduction activities of the likes discussed above. Generally, the difference between a P-feature and a hybrid P-feature can be appreciated by reference to FIGS. 7 and 8.

FIG. 7 illustrates a P-feature associated with the teapot shown in FIG. 2. In FIG. 7, the P-feature (700) can be obtained by projecting a silhouette of the teapot (or a 3D model thereof) onto a 2D plane (e.g., situated parallel to the Z-axis and perpendicular to the X-Y plane) from a viewpoint (e.g., situated on the Y-axis within the X-Y plane) and, optionally, identifying the edge of the silhouette.

Figure 8:
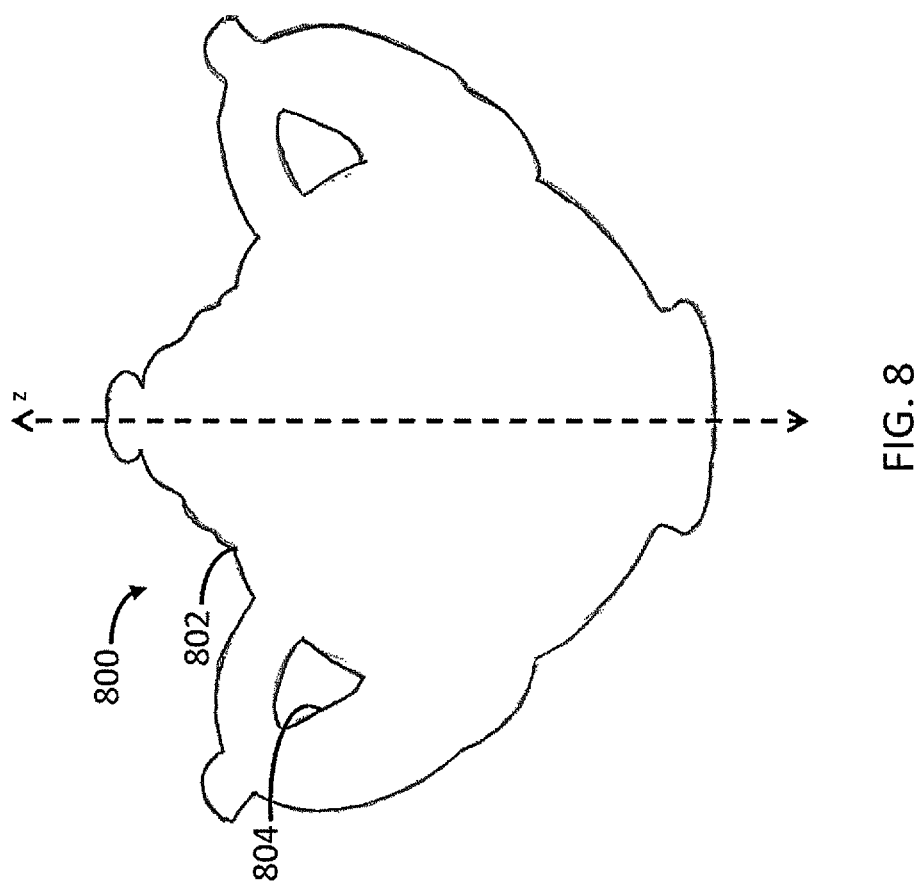
FIG. 8 illustrates a hybrid P-feature associated with the teapot shown in FIG. 2.

FIG. 8 illustrates a hybrid P-feature, also associated with the teapot shown in FIG. 2. In FIG. 8, the hybrid P-feature (800) can be obtained by accumulating multiple silhouettes of the teapot (or a 3D model thereof, each projected onto a stationary 2D plane situated parallel to the Z-axis and perpendicular to the X-Y plane) from a viewpoint (e.g., situated on the Y-axis within the X-Y plane) as the teapot rotates (e.g., 180 degrees) about the Z-axis. Alternatively, the silhouettes may be projected each time the teapot has incrementally rotated (e.g., 2 degrees, 5 degrees, 10 degrees, 20 degrees, etc.) for a suitable or desired number of incremental rotations about the Z-axis. It will be appreciated that the act of rotating the object (or the 3D model thereof) has the same effect as projecting silhouettes onto different 2D planes from different viewpoints and then merging the projected silhouettes together. A hybrid P-feature may be stored (e.g., in the object registry, in association with a corresponding registered or enrolled object), or otherwise represented, as one or more equations (e.g., one or more polynomial equations, etc.) describing one or more lines or curves that approximate the edge(s) of the accumulated or merged silhouettes (illustrated in FIG. 8 by outer line 802 and, optionally inner lines 804) at one side of the Z-axis (the rotation will generate a symmetric silhouette about the Z-axis).

Generally, a hybrid P-feature will be suitably helpful in search space reduction if the object does not have a "regular shape" or rich texture. That is, it is preferred (though not necessary) to derive hybrid P-features from irregularly-shaped objects. As used here, an object's shape can be considered to be "regular" if it is generally polyhedral in shape (or spheroid, ellipsoid, etc,). Thus, the shapes of objects such as computer monitors, telephones, staplers, teapots, etc., can be considered to be "irregular." Any suitable technique may be applied to determine whether an object has a regular or irregular shape. For example, a technique such as the Random Sample Consensus (RANSAC) method may be applied to a 3D model generated (again, by any suitable technique) for the object, deciding whether all or most of the cloud points from the 3D model reside on one or multiple regular shaped surfaces.

To derive a hybrid-P feature for an object, the 3D model of the object may be analyzed to identify a reference plane associated with the object (e.g., using the RANSAC method). Generally, the reference plane (also referred to herein as a "primary reference plane") corresponds to the dominant plane of the 3D model (i.e., largest plane or, in the case of a point cloud set, the plane containing most of the points in the point cloud set). If the model does not have a dominant plane (e.g., if the model represents an object such as a tri-pod), then the primary reference plane corresponds to a plane defined by at least three coplanar points spanning the largest area on a tangent plane associated with the model. Thus, to expand upon the example given above with respect to FIG. 8, the primary reference plane associated with the 3D model of the teapot shown in FIG. 2 may be in a plane (e.g., an X'-Y' plane, defined by an X' axis parallel to the X-axis and a Y' axis parallel to the Y-axis) that is parallel to the X-Y plane, and located at the bottom of the 3D teapot model.

After identifying the primary reference plane, a reference axis is identified. The reference axis is the axis about which the 3D model is rotated when the silhouettes are projected. Alternatively, the reference axis is the axis about which the viewpoints are distributed when the silhouettes are projected. Generally, the reference axis is perpendicular to the reference plane, and extends through the 3D model. In one embodiment, the reference axis can be identified so as to extend through an estimated central axis of the 3D model. For example, if the 3D model is described by a point cloud set and the reference plane is determined to extend in the X'-Y' plane, then the points in the cloud are averaged by their X'- and Y'-coordinates to yield an average X'-coordinate and an average Y'-coordinate. A line containing the average X'- and Y'-coordinates, and perpendicular to the primary reference plane is then set as the reference axis. Thus, to expand upon the example discussed above, the reference axis associated with the 3D model of the teapot shown in FIG. 2 may be the Z-axis.

After identifying the reference axis, a viewpoint (e.g., characterized by one or more viewpoint coordinates such as azimuth angle ($\theta$), elevation angle ($\Phi$), and distance (d)) onto the 3D model is selected. The viewpoint may lie on the reference axis, may lie within the reference plane, or may be located anywhere between the reference axis and the reference plane. A 2D silhouette of the 3D model is then projected onto a 2D plane from the selected viewpoint. To obtain a hybrid P-feature, multiple silhouettes of the 3D model (each projected onto a stationary 2D plane situated parallel to the reference axis and perpendicular to the reference plane) from the selected viewpoint may be accumulated as the 3D model rotates (e.g., 30 degrees, 45 degrees, 60 degrees, 90 degrees, 120 degrees, 180 degrees, etc.) about the reference axis (or each time after the 3D model has been incrementally rotated, for a suitable or desired number of incremental rotations). In another embodiment, the multiple silhouettes may be projected from different viewpoints within a plane parallel with the reference plane. The multiple silhouettes may then be merged together. The hybrid P-feature may be stored or otherwise represented, as one or more equations (e.g., one or more polynomial equations, etc.) describing one or more lines or curves that approximate the edge(s) of the accumulated or merged silhouettes.

The procedure discussed above describes how to form a so-called "primary" hybrid P-feature (i.e., a hybrid P-feature derived through a relative rotation of the 3D model and the viewpoint about a reference axis—also referred to as a "primary reference axis"—that is perpendicular to the reference plane). Primary hybrid P-features derived from the sampled object-of-interest and 3D models of registered or enrolled objects can be useful in achieving meaningful search space reduction. For example, auxiliary information describing a primary hybrid P-feature can be compared with primary hybrid P-features derived from registered or enrolled objects. Records associated with primary hybrid P-features derived from registered or enrolled objects, which sufficiently correspond to the primary hybrid P-features included in the auxiliary information, can be identified. These identified records then define the search space within which a subsequent object recognition process is to be performed.

Further improvements in search space reduction can be achieved by deriving one or more additional hybrid P-features from the sampled object-of-interest and 3D models of registered or enrolled objects. To derive one such additional hybrid P-feature (e.g., a "secondary" hybrid P-feature), a secondary reference axis can be identified, and multiple silhouettes can be projected via relative rotation of the 3D model and the viewpoint about the secondary reference axis. The following discussion on how to identify the secondary reference axis is provided with the assumption that the 3D model of the object is a point cloud set (it will be appreciated, however, that these same principles may also be applied to 3D models of other types). To identify the secondary reference axis, the points in the point cloud set of the 3D model are projected onto the reference plane (e.g., the aforementioned X'-Y' plane) and principal component analysis (PCA) is then performed to identify a first principal component that accounts for the largest amount of variability in the projected cloud points. The first principal component thus may be represented as a line or vector that extends within the reference plane along a direction in which there is the largest possible variance in cloud point coordinates.

The identified line or vector is then translated so as to extend another estimated central axis of the 3D model. For example, a secondary reference plane perpendicular to the secondary reference axis can be identified, and points in the cloud can be projected onto the secondary reference plane and then the point coordinates can be averaged to yield a set of averaged point coordinates. A line containing the set of averaged point coordinates, and perpendicular to the secondary reference plane is then set as the secondary reference axis. Thereafter, the secondary hybrid P-feature is derived by accumulating or merging multiple silhouettes projected via relative rotation of the 3D model and the viewpoint about the secondary reference axis Like the primary hybrid P-feature, the secondary hybrid P-feature can be stored or otherwise represented as one or more equations (e.g., one or more polynomial equations, etc.) describing one or more lines or curves that approximate the edge(s) of the accumulated or merged silhouettes. It will be appreciated that the above-described process used to identify a secondary reference axis may be modified to identify one or more other reference axes (e.g., a tertiary reference axis orthogonal to the secondary reference axis, within the primary reference plane, etc.), and one or more other hybrid P-features derived using these other reference axes.

Further Notes

At a high level, image analysis problems may be tackled in various ways. One is by machine learning/artificial intelligence. In such approaches, a classifier may be trained to take a raw image as input, and provide text labels as output. So called "Deep learning" is of this type, in which neural nets are provided a vast corpus of content (e.g., millions of hours of YouTube video), and learn to discern patterns. (See, e.g., the Wikipedia page for Deep Learning, and publications concerning the "Google Brain" or "Artificial Brain," e.g., Coates et al, Deep learning with COTS HPC systems, Proc. 30th Int'l Conf. on Machine Learning, 2013, and references cited therein.)

A different approach to image analysis problems is by computer vision/image processing. Such techniques tend to be bottoms-up, e.g., analyzing pixels, discerning meaningful/useful features, applying segmentation/registration, etc., to get a better understanding of the image.

At a high level, much of the present technology is of this latter sort. However, principles from the former can also be employed.

For example, a further aspect of the present technology involves the grammar and language of objects. Human evidential reasoning about objects naturally includes more and more detailed observations based not only on image descriptions (2D or 3D), but also on purpose/intent of the object, motion, attachment, context, etc. This may come from deep learning concepts, and can be augmented with expert knowledge provided the natural language concepts overlap with human perception.

(The reader is presumed to be familiar with natural language processing, and techniques by which knowledge can be extracted from text and other language constructs. See, e.g., U.S. Pat. No. 7,383,169.)

As speech understanding systems become more adept and broadly available, object-based languages can take advantage of those technologies to rapidly sift through information extracted from images.

More particularly, the present technology can make use of the relationship and description of objects, rather than simply their high level recognition. For example, rather than relying on a learned "face" result, a recognition module can discern an eye, part of a nose, and an ear and conclude—as we might—that there is a "face" there, even though it would not register as a "face" based on a deep learning template. The module would look at the eye, for instance, and deduce that an eye is used for seeing and therefore must be associated with an animal/human. (It may further see a nose in a wrong position relative to the eye and conclude that it is a Picasso painting—which would probably not trigger a "face" detection.)

An operative notion is to create a grammar of relationships between objects and intent, rather than simply a deep learning dictionary with isolated words.

Feature Extraction

As noted, implementations of the detailed technology can employ robust feature descriptors (e.g., SIFT, SURF, and ORB) derived from imagery, to perform object identification.

Generally speaking, such techniques rely on locations within imagery where there is a significant local variation with respect to one or more chosen image features—making such locations distinctive and susceptible to detection. Such features can be based on simple parameters such as luminance, color, texture, etc., or on more complex metrics (e.g., difference of Gaussians). Each such point can be represented by data indicating its location within the image, the orientation of the point, and/or a feature vector representing information associated with that location. (A feature vector commonly used in SURF implementations comprises 64 data, detailing four values of luminance gradient information for each of 16 different square pixel blocks arrayed around the interest point.)

Such image features may comprise individual pixels (or sub-pixel locations within an image), but these technologies typically focus on 2D structures, such as corners, or consider gradients within square areas of pixels.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are robust to image scale, rotation and affine transformation. They are also robust to changes in illumination, noise, and some changes in viewpoint. In addition to these properties, they are distinctive, relatively easy to extract, allow for correct object identification with low probability of mismatch, and are straightforward to match against a (large) database of local features. Object description by a set of SIFT features is also robust to partial occlusion; as few as three SIFT features from an object are enough to compute its location and pose.

The technique starts by identifying local image features ("keypoints") in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient is calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with σ 1.5 times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints of different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with σ1.5 times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25% to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure is Bonato et al, "Parallel Hardware Architecture for Scale and Rotation Invariant Feature Detection," IEEE Trans on Circuits and Systems for Video Tech, Vol. 18, No. 12, 2008. Another is Se et al, "Vision Based Modeling and Localization for Planetary Exploration Rovers," Proc. of Int. Astronautical Congress (IAC), October, 2004.

Published patent application WO07/130,688 concerns a cell phone-based implementation of SIFT, in which the local descriptor features are extracted by the cell phone processor, and transmitted to a remote database for matching against a reference library.

While SIFT is perhaps the most well-known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005); and SURF (c.f., Bay et al, "SURF: Speeded Up Robust Features," Eur. Conf. on Computer Vision (1), pp. 404-417, 2006; as well as Chen et al, "Efficient Extraction of Robust Image Features on Mobile Devices," Proc. of the 6th IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008. A feature vector commonly used in SURF implementations comprises 64 data, detailing four values of luminance gradient information for each of 16 different square pixel blocks arrayed around the interest point.)

ORB feature-based identification is detailed, e.g., in Calonder et al, BRIEF: Computing a Local Binary Descriptor Very Fast, IEEE Transactions on Pattern Analysis and Machine Intelligence, Vol. 34, No. 7, pp. 1281-1298; Calonder, et al, BRIEF: Binary Robust Independent Elementary Features, ECCV 2010; and Rublee et al, ORB: an efficient alternative to SIFT or SURF, ICCV 2011. ORB, like the other noted feature detection techniques, is implemented in the popular OpenCV software library (e.g., version 2.3.1).

Still other fingerprinting techniques (as well as other relevant subject matter) are detailed in patent publications 20090282025, 20060104598, WO2012004626 and WO2012156774 (all by LTU Technologies of France).

Yet other fingerprinting techniques are variously known as Bag of Features, or Bag of Words methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

All of the above-described methods can be applied to characterize the P, M and I features noted herein.

CONCLUDING REMARKS

Having described and illustrated the principles of our inventive work with reference to illustrative examples, it will be recognized that the technology is not so limited.

For example, while the embodiments detailed above are described primarily in the context of supporting an object-recognition process, it should be understood that principles detailed herein are applicable in other contexts, such as the processing of stimuli from other sensors, or from combinations of sensors to support other processes relating to navigation and other location-based services, predictive, anticipatory or intuitive computing (e.g., as described in U.S. Pat. Nos. 8,520,979, 8,385,971, 8,175,617, 8,121,618, 8,447,067, 8,122,257, 8,194,986, 8,503,791, 8,422,994, 8,489,115, 8,256,665, 8,606,021, 8,620,772, and U.S. patent application Ser. Nos. 12/797,503, 12/835,527, 12/855,996, 13/011,618, 13/207,841, 13/275,126, 13/278,949, 13/444,521, 13/465,620, 13/552,302, 13/708,434, 13/774,056, 13/790,607, 13/836,166, 13/964,719, 13/933,874, 13/943,176 and 14/011,383). Many of the detailed principles have still much broader applicability.

For example, while the particularly-detailed example pre-computed the fingerprint data for each of regularly-spaced virtual viewpoints around the object, and stored this data in a database for searching, this is not necessary. Other embodiments can work from stored model data, draped in corresponding imagery.

Similarly, while reference was made to using a visual saliency metric in selecting blocks of user imagery to probe the reference database for candidate matches, other block selection techniques can be used.

One selection technique simply takes blocks from the center of the user-captured image(s), and works out towards the edges (e.g., in a spiraling path)—reasoning that the user is likely to center the camera view on the subject of most interest.

Another uses techniques for prioritizing what image blocks are first processed by a digital watermark decoder. Such techniques are detailed, e.g., in U.S. Pat. Nos. 6,442,284 and 7,013,021, and in pending application Ser. No. 13/750,752, filed Jan. 25, 2013, and Ser. No. 13/804,413, filed Mar. 14, 2013.

Similarly, while reference was made to continuing the object-voting process until one object passes a statistical confidence threshold of being the correct object, in other arrangements simpler methods can be used. For example, once the number of votes for an object reaches five times the number of votes for any other object (or three times the number of total votes for all other objects), then that object can be declared the correct choice.

While reference was made to object recognition using a single image captured by the user, the user may capture several images. The process detailed above can be repeated for the different images, and the votes from all can be summed to identify the object. If the several user images are all from viewpoints that are spatially clustered, then the votes from all can similarly be summed to determine the user's viewpoint.

If the viewpoints are spatially dispersed, e.g., resulting from a sweep of the user's camera in an arc that spans a great circle path of more than 30 degrees around the object, then the system may respond in different ways, depending on configuration. In one arrangement, the system does not try to determine a particular viewpoint; it simply identifies the object—using votes from all the different views in reaching its decision. In another, the system assesses viewpoint candidates for each user-captured frame in the set, and identifies a mid-point of the sweep. In yet another, the system assesses viewpoint candidates for each user-captured frame, and then outputs information detailing the best guess as to the geometry of the user's sweep.

While reference was made above to object recognition using, as an input or query, imagery (e.g., as one or more captured images or video clips), the input or query can also be provided as one more other surface representations including a point cloud set, a triangular or other polygon mesh, a NURBS surface model, a wireframe or any other suitable computer-aided design (CAD) model, or the like or any combination thereof.

In some embodiments of the technology, a local server could be the first place to search for matching features. Using small cells is one significant change in the infrastructure for next generation mobile communications, due to their advantages in extending service coverage and/or increasing network capacity. In the meantime, future mobile base stations will be able to run applications locally, pushing the computing/data storage much closer to the users. Then inside each small-cell, each mobile device will capture images/audios and/or extract features and then send to the mobile base station as queries. Since these images/audios are captured from geographically close locations, the queries will tend to be similar, with many repeats and redundancies. The mobile base station can cache the searching results locally and significantly reduce the searching time, compared to sending the query to the cloud.

Further, when features are extracted from a single mobile device as queries, they are limited to such a single instance of the object, and therefore the retrieved results could be limited. Sometimes the queries could be augmented by re-use the retrieved results, even false positives, in order to get a broader scope of retrieved results. For example, when taking a picture of a landmark building in a rainy day, the user may also like to see the same building in a sunny day by querying for similar pictures. Strictly sticking to the features from a rainy day picture may not satisfy this request. On the other hand, augmenting the queries with those pictures taken in a sunny day but shared the same structural properties could fulfill this task. (A related principle has been discussed in Chum et al, Total Recall: Automatic Query Expansion with a Generative Feature Model for Object Retrieval, International Conference on Computer Vision (ICCV) 2007, in connection with expanding image retrieval results, and also has been used in building recommender systems.

In systems employing this aspect of the technology, two different types of false positives may be defined, with one being the retrieved results from the target object but under different imaging conditions, and the other being retrieved results from a totally different object. Currently, there exists no single low level image features that can accommodate the imaging variations completely; some of them can handle scale, rotation, perspective at most. With the help of the detailed P, M and I features, a hierarchical feature set can be used to reject the false positives of the second type.

While reference was made to software on a smartphone that performs certain of the detailed functionality, in other embodiments these functions can naturally be performed otherwise—including by operating system software on the smartphone, by a server at a social networking service, by another smartphone or computer device, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S III phone, manufactured by Samsung, the Motorola Droid Razr HD Maxx phone, and the Nokia N900), and Windows 8 mobile phones (e.g., the Nokia Lumia 920).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, one or more ultrasound emitters, one or more loudspeakers, touch or other gesture sensors, a camera, an ambient light sensor or other optical sensor, a compass sensor, a 3D magnetometer, a 3-axis accelerometer, a 3-axis gyroscope, one or more microphones, a temperature sensor, a pressure sensor, an ambient humidity sensor, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The processes and system components detailed in this specification may be implemented as instructions for computing devices, including general purpose processor instructions for a variety of programmable processors, including microprocessors (e.g., the Intel Atom, ARM A5, and nVidia Tegra 4; the latter includes a CPU, a GPU, and nVidia's Chimera computational photography architecture), graphics processing units (GPUs, such as the nVidia Tegra APX 2600), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

The present technology can be used in connection with wearable computing systems, including headworn devices. Such devices typically include display technology by which computer information can be viewed by the user—either overlaid on the scene in front of the user (sometimes termed augmented reality), or blocking that scene (sometimes termed virtual reality), or simply in the user's peripheral vision. Exemplary technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

While many of the illustrative embodiments made reference to digital watermarking for content identification, in most instances fingerprint-based content identification can be used instead.

The techniques of digital watermarking are presumed to be familiar to the artisan. Examples are detailed, e.g., in Digimarc's U.S. Pat. No. 6,590,996 and in published application 20100150434. Linking from watermarks (or other identifiers) to corresponding online payoffs is detailed, e.g., in Digimarc's U.S. Pat. Nos. 6,947,571 and 7,206,820.

The assignee's U.S. Pat. No. 8,215,553, pending patent application Ser. No. 13/842,282, filed Mar. 15, 2013, Ser. No. 13/789,126, filed Mar. 7, 2013, Ser. No. 13/425,339, filed Mar. 20, 2012, Ser. No. 13/651,182, filed Oct. 12, 2012, and Ser. No. 13/684,093, filed Nov. 21, 2012, and published applications 20100228632, 20110212717, 20110161076, 20120284012, 20120218444, 20120046071, 20120300974, 20120224743, detail other technologies that are related to the presently-described technologies (e.g., concerning smartphone apps, mobile imaging, etc.). Likewise copending provisional application 61/818,839, filed May 2, 2013 (attached).

For example, application Ser. No. 13/842,282 details how an image sensor in a portable device can be mounted on a MEMS-actuated pedestal, and moved in a cyclical fashion synchronized with the frame captures, so as to counteract motion blur.

Writings on The Internet of Things include the book of the same title written by Yan, et al, published by CRC Press in 2008, and the paper Atzori et al, The Internet of Things—A Survey, Computer Networks 54.15 (2010) 2787-2805. The latter document is attached.

The artisan is presumed to be familiar with visual saliency, and methods for its determination. Examples are detailed, e.g., in Hou, et al, Saliency detection—A spectral residual approach, Computer Vision and Pattern Recognition, 2007, and Achanta, et al, Saliency detection using maximum symmetric surround, 17th IEEE International Conference on Image Processing, 2010.

This specification has discussed several different embodiments and examples. It should be understood that the methods, elements and concepts detailed in connection with one embodiment, example or implementation can be combined with the methods, elements and concepts detailed in connection with other embodiments, examples or implementations. While some such arrangements have been particularly described, many have not—due to the large number of permutations and combinations. Applicant recognizes and intends that the concepts of this specification can be combined, substituted and interchanged—both among and between themselves, as well as with those known from the cited references and prior art. Moreover, it will be recognized that the detailed technology can be included with other technologies—current and upcoming—to advantageous effect. Implementation of all such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the inventor intends be incorporated into embodiments of the present technology, and into which the technologies and teachings detailed herein be incorporated by reference.

To provide a comprehensive disclosure, while complying with the statutory requirement of conciseness, applicants incorporate-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

We claim:

1. A method employing one or more computer processors to perform acts including:
    storing, within an object registry, model data and object metadata corresponding to a plurality of physical reference objects, the model data for each physical reference object including data characterizing plural non-coplanar surface regions of different extents and locations, and hybrid-P feature data, the model data also including, for each of several different physical reference objects, multiple sets of feature information, each set of feature information being associated with a particular viewpoint towards a physical reference object;
    obtaining query data representing a physical object-of-interest, wherein generation of the query data is initiated by a user, and said query data includes object profile data representing an edge of a silhouette of the physical object-of-interest;
    performing an object recognition process on the query data, the object recognition process including processing the query data, in conjunction with the stored model data, to determine whether the object-of-interest corresponds to any of the plurality of physical reference objects, said object recognition process including identifying plural sets of said feature information that may correspond to the query data, thereby identifying a first candidate set of plural physical reference objects that possibly match said physical object-of-interest, and performing a clustering operation on viewpoints associated with said identified plural sets of feature information, to determine a preliminary candidate viewpoint towards a matching physical reference object;
    the object recognition process further including, for each of said first candidate set of physical reference objects, obtaining reference object profile data corresponding to said preliminary candidate viewpoint, and for one or more additional viewpoints; and
    performing a profile matching operation to identify certain of said obtained reference object profile data that correspond to the object profile data representing the physical object-of-interest, thereby identifying a second candidate set of physical reference objects that possibly match said physical object-of-interest, said second candidate set being smaller than said first candidate set; and
    upon determining that the object-of-interest corresponds to at least one of the physical reference objects, transmitting a result to a user device associated with the user, the result including object metadata associated with the at least one of the physical reference objects determined to correspond to the object-of-interest;
    wherein the hybrid-P feature data is based on an accumulation of multiple profiles of the reference object from multiple viewpoints.

2. The method of claim 1, wherein the query data is obtained from the user device.

3. The method of claim 1, wherein the query data is obtained from a camera-equipped ambient device distinct from said user device.

4. The method of claim 1, wherein said object metadata associated with at least one of the physical reference objects determined to correspond to the object-of-interest includes object identifying information identifying the reference object.

5. The method of claim 1, further comprising identifying model data corresponding to a sub-set of the plurality of physical reference objects based on auxiliary information, wherein processing the model data comprises processing the identified model data to determine whether the object-of-interest corresponds to any physical reference object within said sub-set of the plurality of physical reference objects.

6. The method of claim 1 wherein said act of performing an object recognition process includes three stages or operation, (b), (c) and (d), wherein stage (c) is performed after stage (b) and before stage (d), and wherein:
stage (b) is based on said hybrid P-feature data;
stage (c) is based on M-feature data; and
stage (d) is based on I-feature data.

7. The method of claim 6 wherein stage (c) is based on the hybrid P-feature data, as well as on said M-feature data.

8. The method of claim 6 wherein stage (d) is based on the M-feature data and said hybrid P-feature data, as well as on said I-feature data.

9. The method of claim 6 wherein the object recognition process includes a stage (a), wherein stage (a) is performed before stage (b), and wherein stage (a) includes match searching based on color histogram data.

10. The method of claim 1 wherein performing the object recognition process includes receiving, at the user device, stored model data transmitted from a retail store, enabling the user device to recognize retail objects at said retail store.

11. The method of claim 1 in which said act of obtaining query data includes obtaining data from first and second cameras, the first camera comprising part of the user device, the second camera comprising an ambient camera.

12. The method of claim 11 in which said generation of the query data is initiated by a user gesture indicating the physical object-of-interest, wherein the method includes, in response to said gesture, and in response to sampled location or user device orientation information, identifying an ambient camera to serve as said second camera—from among plural ambient cameras.

13. The method of claim 1 that includes sensing object data from one of said plurality of physical reference objects while illuminating such physical reference object with an optical system that produces collimated illumination, said physical reference object having a maximum dimension of N centimeters, and said optical system having an aperture greater than N centimeters.

14. The method of claim 1 wherein said optical system includes a light source that is tunable across the visible light spectrum.

15. The method of claim 1 wherein said model data for one of said physical reference objects defines more than 1 million planar surface components in a mesh form.

16. The method of claim 1 wherein said object recognition process includes sleuthing a projective viewpoint of the query data relative to the model data for one of said physical reference objects.

17. The method of claim 1 wherein said feature information comprises color histogram information.

18. The method of claim 1 that further includes:
for each physical reference object in said second set, determining a viewpoint that most closely corresponds to said query data, and generating a match score employing match metrics for profile, Morse, and image features associated with said reference object and said determined viewpoint; and
identifying, as a final match to said physical object of interest, a physical reference object for which said match score is best.

19. The method of claim 18 in which said match score takes the form of a polynomial equation:

$$aKp^d + bKi^e + cKm^f$$

where a, b, and c, are weighting factors, Kp, Ki and Km are match-metrics for the profile, image and Morse features, and d, e and f are corresponding exponential factors.

20. The method of claim 1 in which the act of obtaining query data includes obtaining query data across five different spectral bands.

21. The method of claim 1 in which said model data includes data characterizing reflectance for each of said surface regions.

22. The method of claim 1 in which:
the act of obtaining query data includes applying a visual saliency model to imagery of the physical object-of-interest to identify visually-salient portions thereof; and
the act of performing an object recognition process includes examining the stored model data to identify physical reference objects having portions that may be candidate matches to said visually-salient portions.

23. The method of claim 1 wherein said object metadata transmitted to said device comprises information about recycling the physical object-of-interest.

24. The method of claim 1 wherein said object metadata transmitted to said device comprises information identifying a location at which an instance of said physical object-of-interest was previously recognized.

25. The method of claim 5 in which the auxiliary information comprises information about a location of the user.

26. The method of claim 5 in which the auxiliary information comprises information about a location of the user, wherein said sub-set of physical reference objects comprises objects the user may encounter at said location.

27. The method of claim 5 in which the auxiliary information comprises information predicting or estimating a future location of the user, wherein said sub-set of physical reference objects comprises objects the user may encounter at said future location.

28. The method of claim 5 in which the auxiliary information comprises information about audio in an environment of the user, wherein said sub-set of physical reference objects comprises objects associated with said audio.

29. The method of claim 5 in which the auxiliary information comprises information about a previously-recognized physical object.

30. The method of claim 5 in which the auxiliary information comprises information about ambient lighting conditions within an environment of the physical object-of-interest.

31. The method of claim 1 wherein the hybrid P-feature data is based on an accumulation of multiple profiles of the reference object derived from multiple images of said object, captured by a fixed camera while said object rotated around an axis.

32. The method of claim 1 wherein the hybrid-P feature data represents a hybrid silhouette of the reference object that does not match any real physical silhouette of the reference object.

* * * * *